United States Patent
Azernikov et al.

(10) Patent No.: US 11,842,484 B2
(45) Date of Patent: Dec. 12, 2023

(54) TEETH SEGMENTATION USING NEURAL NETWORKS

(71) Applicant: James R. Glidewell Dental Ceramics, Inc., Newport Beach, CA (US)

(72) Inventors: Sergei Azernikov, Irvine, CA (US); Fedor Chelnokov, Khimki (RU); Andrey Tolstov, Moscow (RU); Sergey Nikolskiy, Columbia, TN (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 19 days.

(21) Appl. No.: 17/140,739

(22) Filed: Jan. 4, 2021

(65) Prior Publication Data
US 2022/0215531 A1 Jul. 7, 2022

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/20081* (2013.01);
(Continued)

(58) Field of Classification Search
CPC .................... G06T 7/0012; G06T 7/11; G06T 2207/20081; G06T 2207/20084; G06T 2207/20152; G06T 2207/30036
(Continued)

(56) References Cited

U.S. PATENT DOCUMENTS 7,187,790 B2  3/2007  Sabol et al.
7,490,085 B2  2/2009  Walker et al.
(Continued)

FOREIGN PATENT DOCUMENTS

EP  1368986 B1  12/2011
EP  3671531 A1  12/2018
(Continued)

OTHER PUBLICATIONS

US 11,182,981 B2, 11/2021, Long et al. (withdrawn)
(Continued)

*Primary Examiner* — Van D Huynh
(74) *Attorney, Agent, or Firm* — Charles Fowler

(57) ABSTRACT

A computer-implemented method and system of digitally segmenting teeth in a digital model comprises generating a panoramic image from a 3D digital model of a patient's dentition, labeling, using a first trained neural network, the panoramic image to provide a labeled panoramic image, mapping the labeled panoramic image to corresponding coarse digital surface triangle labels in the 3D digital model to provide a labeled 3D digital model, and segmenting the labeled 3D digital model to provide a segmented 3D digital model. A computer-implemented method and system of generating a panoramic image comprises determining, using a trained neural network, digital tooth bounding region(s) corresponding to digital teeth from a 2D depth map of a patient's dentition, connecting digital tooth bounding region(s) by a spline, determining sampled digital surface points from the sampled spline points; and determining associated digital surface points corresponding to each sampled digital surface point.

21 Claims, 46 Drawing Sheets

(52) U.S. Cl.
CPC .............. *G06T 2207/20084* (2013.01); *G06T 2207/20152* (2013.01); *G06T 2207/30036* (2013.01)

(58) Field of Classification Search
USPC ........................................................ 382/128
See application file for complete search history.

(56) References Cited

U.S. PATENT DOCUMENTS

| | | | |
|---|---|---|---|
| 7,860,300 B2 * | 12/2010 | Siltanen | A61B 6/14 709/200 |
| 8,068,580 B2 | 11/2011 | Lang et al. | |
| 9,818,186 B2 | 11/2017 | Kim et al. | |
| 9,865,176 B2 | 1/2018 | Tran | |
| 10,278,584 B2 | 5/2019 | Glinec et al. | |
| 10,438,363 B2 | 10/2019 | Kim et al. | |
| 10,542,944 B2 | 1/2020 | Petersilka | |
| 10,755,409 B2 | 8/2020 | Salah et al. | |
| 10,932,890 B1 | 3/2021 | Sant et al. | |
| 10,984,529 B2 | 4/2021 | Carter et al. | |
| 10,997,727 B2 | 5/2021 | Xue et al. | |
| 11,000,349 B2 | 5/2021 | Willers et al. | |
| 11,007,040 B2 | 5/2021 | Azernikov et al. | |
| 11,026,766 B2 | 6/2021 | Chekh et al. | |
| 11,049,248 B2 | 6/2021 | Salah et al. | |
| 11,051,914 B2 | 7/2021 | Kopelman et al. | |
| 11,109,945 B2 | 8/2021 | Saleh et al. | |
| 11,116,466 B2 | 9/2021 | Mandelkern et al. | |
| 11,164,045 B2 | 11/2021 | Paik et al. | |
| 11,189,021 B2 | 11/2021 | Shah et al. | |
| 11,191,508 B2 | 12/2021 | Mandelkern et al. | |
| 11,194,312 B2 | 12/2021 | Cramer et al. | |
| 11,232,573 B2 | 1/2022 | Brown et al. | |
| 11,238,586 B2 | 2/2022 | Minchenkov et al. | |
| 11,250,580 B2 | 2/2022 | Meyer et al. | |
| 11,270,523 B2 | 3/2022 | Long et al. | |
| 11,278,375 B2 | 3/2022 | Wang et al. | |
| 11,291,404 B2 | 4/2022 | Schnabel et al. | |
| 11,291,532 B2 | 4/2022 | Azernikov et al. | |
| 11,399,792 B2 | 8/2022 | Mandelkern et al. | |
| 11,403,813 B2 | 8/2022 | Katzman et al. | |
| 11,423,697 B1 | 8/2022 | Wucher et al. | |
| 11,517,272 B2 | 12/2022 | Unklesbay et al. | |
| 11,534,272 B2 | 12/2022 | Li et al. | |
| 11,534,275 B2 | 12/2022 | Wey | |
| 11,568,656 B2 | 1/2023 | Mohan et al. | |
| 11,589,955 B2 | 2/2023 | Medvinskaya et al. | |
| 11,589,957 B2 | 2/2023 | Carrier, Jr. et al. | |
| 11,622,843 B2 | 4/2023 | Nikolskiy et al. | |
| 2004/0122702 A1 | 6/2004 | Sabol et al. | |
| 2004/0122703 A1 | 6/2004 | Walker et al. | |
| 2004/0122719 A1 | 6/2004 | Sabol et al. | |
| 2007/0047794 A1 | 3/2007 | Lang et al. | |
| 2009/0019552 A1 | 1/2009 | McLaughlin et al. | |
| 2009/0024416 A1 | 1/2009 | McLaughlin et al. | |
| 2013/0022252 A1 * | 1/2013 | Chen | G06T 3/0031 382/131 |
| 2013/0022255 A1 * | 1/2013 | Chen | G06T 7/149 382/173 |
| 2017/0281110 A1 | 10/2017 | Mandelker et al. | |
| 2018/0028294 A1 | 2/2018 | Azernikov et al. | |
| 2018/0303581 A1 | 10/2018 | Martz et al. | |
| 2018/0360567 A1 * | 12/2018 | Xue | A61C 7/002 |
| 2019/0150724 A1 * | 5/2019 | Elazar | A61B 1/00034 |
| 2019/0282344 A1 | 9/2019 | Azernikov et al. | |
| 2020/0000562 A1 | 1/2020 | Wey | |
| 2020/0013145 A1 | 1/2020 | Ratner et al. | |
| 2020/0022790 A1 | 1/2020 | Fisker | |
| 2020/0027252 A1 | 1/2020 | Ye et al. | |
| 2020/0066391 A1 | 2/2020 | Sachdeva et al. | |
| 2020/0175681 A1 * | 6/2020 | Ezhov | G06T 7/10 |
| 2020/0273248 A1 | 8/2020 | Jorgensen et al. | |
| 2020/0297458 A1 | 9/2020 | Roschin et al. | |
| 2020/0383752 A1 | 12/2020 | Willers et al. | |
| 2020/0402272 A1 | 12/2020 | Xu et al. | |
| 2020/0411201 A1 | 12/2020 | Kearney et al. | |
| 2021/0005017 A1 | 1/2021 | Hollenbeck | |
| 2021/0012884 A1 | 1/2021 | Kim et al. | |
| 2021/0034813 A1 | 2/2021 | Wu et al. | |
| 2021/0059796 A1 | 3/2021 | Weiss et al. | |
| 2021/0073998 A1 | 3/2021 | Brown et al. | |
| 2021/0093421 A1 | 4/2021 | Michaeli et al. | |
| 2021/0100642 A1 | 4/2021 | Weiss et al. | |
| 2021/0100643 A1 | 4/2021 | Weiss et al. | |
| 2021/0106409 A1 | 4/2021 | Ojelund et al. | |
| 2021/0110605 A1 | 4/2021 | Haslam et al. | |
| 2021/0153986 A1 | 5/2021 | Wirjadi et al. | |
| 2021/0158607 A1 | 5/2021 | Katzman et al. | |
| 2021/0174604 A1 | 6/2021 | Long et al. | |
| 2021/0196434 A1 | 7/2021 | Cramer et al. | |
| 2021/0216822 A1 | 7/2021 | Paik et al. | |
| 2021/0236249 A1 | 8/2021 | Nikolskiy et al. | |
| 2021/0251729 A1 | 8/2021 | Schneider et al. | |
| 2021/0255600 A1 | 8/2021 | Faust | |
| 2021/0264611 A1 | 8/2021 | Xue et al. | |
| 2021/0315667 A1 | 10/2021 | Raslambekov | |
| 2021/0321872 A1 | 10/2021 | Saphier et al. | |
| 2021/0338400 A1 | 11/2021 | Murata et al. | |
| 2021/0393375 A1 | 12/2021 | Chekh et al. | |
| 2022/0008175 A1 | 1/2022 | Ojelund et al. | |
| 2022/0028162 A1 | 1/2022 | Katzman et al. | |
| 2022/0130045 A1 | 4/2022 | Kopelman et al. | |
| 2022/0137592 A1 | 5/2022 | Cramer et al. | |
| 2022/0148173 A1 | 5/2022 | Minchenkov et al. | |
| 2022/0165388 A1 | 5/2022 | Chernov et al. | |
| 2022/0189130 A1 | 6/2022 | Long et al. | |
| 2022/0215928 A1 | 7/2022 | Tabak et al. | |
| 2022/0257342 A1 | 8/2022 | Kuo | |
| 2022/0262007 A1 | 8/2022 | Cramer et al. | |
| 2022/0296344 A1 | 9/2022 | Lee et al. | |
| 2022/0304782 A1 | 9/2022 | Derzapf et al. | |
| 2022/0327774 A1 | 10/2022 | Katzman et al. | |
| 2022/0369916 A1 | 11/2022 | Carrier, Jr. et al. | |
| 2022/0378548 A1 | 12/2022 | Salah et al. | |
| 2023/0048895 A1 | 2/2023 | Wucher et al. | |

FOREIGN PATENT DOCUMENTS

| | | |
|---|---|---|
| EP | 3767521 A1 | 7/2019 |
| EP | 3797732 A1 | 9/2019 |
| WO | 2016044465 A1 | 3/2016 |
| WO | 2018069736 A1 | 4/2018 |
| WO | 2018195554 A1 | 10/2018 |
| WO | 2019217764 A1 | 4/2019 |
| WO | 2019204520 A1 | 10/2019 |
| WO | 2019209820 A1 | 10/2019 |
| WO | 2020048960 A1 | 3/2020 |
| WO | 2020173912 A1 | 3/2020 |
| WO | 2020089406 A1 | 5/2020 |
| WO | 2020161245 A1 | 8/2020 |
| WO | 2020182920 A1 | 9/2020 |
| WO | 2021046147 A1 | 3/2021 |
| WO | 2021046434 A1 | 3/2021 |
| WO | 2021058643 A1 | 4/2021 |
| WO | 2021110938 A1 | 6/2021 |
| WO | 2021113501 A1 | 6/2021 |
| WO | 2021210723 A1 | 10/2021 |
| WO | 2021210966 A1 | 10/2021 |
| WO | 2021214212 A1 | 10/2021 |
| WO | 2022131418 A1 | 6/2022 |
| WO | 2022131419 A1 | 6/2022 |

OTHER PUBLICATIONS

International application No. PCT/US21/15820, Notification of Transmittal of the International Search Report and the Written Opinion of the International Searching Authority or the Declaration, dated Jun. 9, 2021, in 17 pages.
Shunping Ji, 3D Convolutional Neural Networks for Crop Classification with Multi-Temporal Remote Sensing Images, Remote Sensing, 2018, 10, 75; doi: 10.3390/rs10010075, www.MDPI.com/journal/remotesensing, pp. 1-17.

(56) References Cited

OTHER PUBLICATIONS

Imagoworks web page, https://imagoworks.ai/#technology, copyright 2021 downloaded on Feb. 18, 2022, pp. 1-8.
H. Wang et al., Multiclass CBCT Image Segmentation for Orthodontics with Deep Learning, Journal of Dental Research, 2021, vol. 100(9), 943-949, International & American Associates for dental Research 2021.
Yin et al., Algorithm of drawing isoline based on improved Delaunay triangle net, Hubei Province Key Laboratory of Intelligent Information Processing and Real-time Industrial System, Wuhan University of Science and technology, 978-1-5090-6161-7/17/#31.00, 2017, IEEE, pp. 1022-1026.
Cowley et al., The Effect of Gingival-Margin Design on the Retention of Thermoformed Aligners, Nov. 2012 JCO, Inc. vol. XLVI, No. 11, pp. 697-702.
Hanchao Li et al., Pyramid Attention Network for Semantic Segmentation, Nov. 25, 2018, in 13 pages.
Jeremy Zhang, UNet—Line by Line Explanation, Published in Towards Data Science Oct. 17, 2019, in 20 pages.
Joseph Redmon et al., You Only Look Once: Unified, Real-Time Object Detection, University of Washington, Allen Institute for AI, May 9, 2016, in 10 pages, http://pjreddie.com/yolo/.
Joseph Redmon et al., YOLO9000: Better, Faster, Stronger, University of Washington, Dec. 25, 2016, in 9 pages, http://pjreddie.com/yolo9000/.
Joseph Redmon et al., YOLOv3: An Incremental Improvement, University of Washington, Apr. 8, 2018, in 6 pages.
Olaf Ronneberger et al., U-Net: Convolutional Networks for Biomedical Image Segmentation, Computer Science Department and BIOSS Centre for Biological Signalling Studies, University of Freiburg, Germany. May 18, 2015.
Pablo Ruiz, ResNets, Harvard University, Aug. 2018, in 8 pages.
Yu-Bing Chang et al., An Automatic and Robust Algorithm of Reestablishment of Digital dental Occlusion, HHS Public Access, IEEE Trans Med Imaging. Sep. 2010; 29(9) 1652-1663,doi: 10.1109/TMI.2010.2049526, in 36 bages.
YOLO Real Time Objection Detection, downloaded from https://pjreddie.com/darknet/yolo/ on Jun. 10, 2020, in 10 pages.

\* cited by examiner

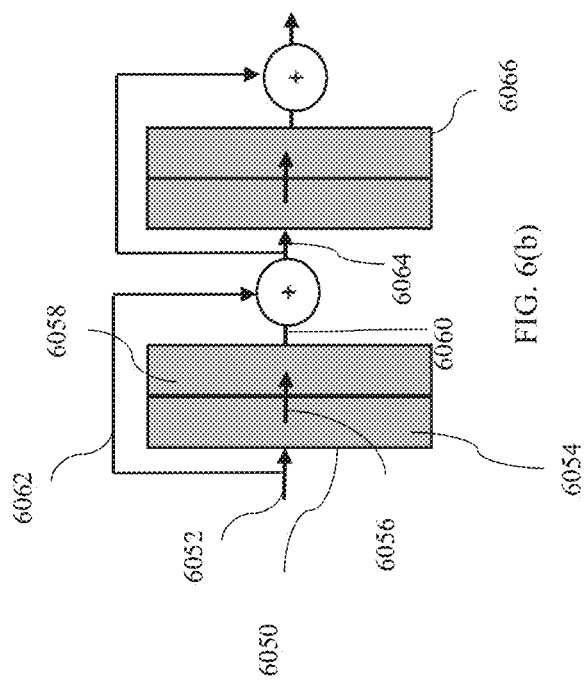

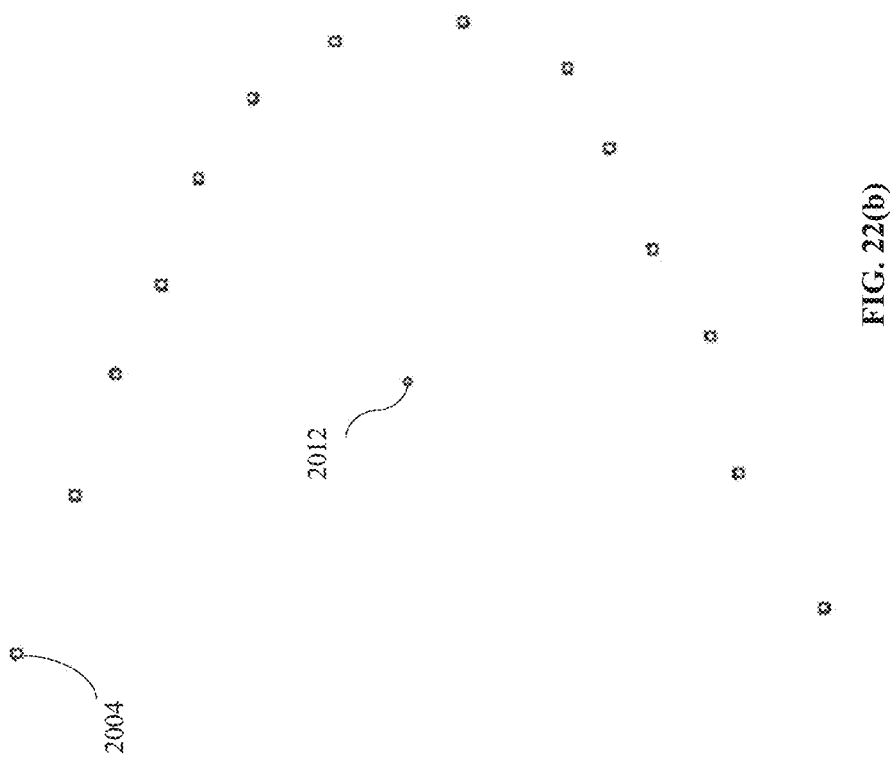

TEETH SEGMENTATION USING NEURAL NETWORKS

BACKGROUND

Specialized dental laboratories typically use computer-aided design (CAD) to design dental prostheses based on patient-specific instructions provided by dentists.

In a typical work flow, the dental laboratories receive information about a patient's oral situation from a dentist. To use the CAD/CAM system, a digital model of the patient's dentition is used as an input to the process. It can be desirable to segment and label individual teeth and the gum area in the digital model. However, labeling teeth and finding precise tooth boundaries and gum boundaries can be challenging. Traditional approaches of manual segmentation can be slow and tedious and prone to error. Recent approaches can be less tedious, but can produce imprecise and/or missing boundaries of teeth and other regions of interest in the digital model.

SUMMARY

A computer-implemented method of digitally segmenting teeth in a digital model includes receiving a 3D digital model of patient scan data of at least a portion of a patient's dentition, generating a panoramic image from the 3D digital model, labeling, using a first trained neural network, one or more regions of the panoramic image to provide a labeled panoramic image, mapping one or more regions of the labeled panoramic image to one or more corresponding coarse digital surface triangle labels in the 3D digital model to provide a labeled 3D digital model and segmenting the labeled 3D digital model to provide a segmented 3D digital model.

A system to digitally segment teeth in a digital model includes a processor, a computer-readable storage medium including instructions executable by the processor to perform steps that can include: receiving a 3D digital model of patient scan data of at least a portion of a patient's dentition, generating a panoramic image from the 3D digital model, labeling, using a first trained neural network, one or more regions of the panoramic image to provide a labeled panoramic image, mapping one or more regions of the labeled panoramic image to one or more corresponding coarse digital surface triangle labels in the 3D digital model to provide a labeled 3D digital model and segmenting the labeled 3D digital model to provide a segmented 3D digital model.

A non-transitory computer readable medium storing executable computer program instructions to segment a digital model, the computer program instructions can include receiving a 3D digital model of patient scan data of at least a portion of a patient's dentition, generating a panoramic image from the 3D digital model, labeling, using a first trained neural network, one or more regions of the panoramic image to provide a labeled panoramic image, mapping one or more regions of the labeled panoramic image to one or more corresponding coarse digital surface triangle labels in the 3D digital model to provide a labeled 3D digital mode and segmenting the labeled 3D digital model to provide a segmented 3D digital model.

A computer-implemented method of generating a panoramic image can include receiving a 2D depth map of patient scan data of at least a portion of a patient's dentition, determining, using a trained neural network, one or more digital tooth bounding regions corresponding to one or more digital teeth, connecting the one or more digital tooth bounding regions by a spline, sampling one or more spline points on the spline, determining one or more sampled digital surface points from the one or more sampled spline points and determining one or more associated digital surface points corresponding to each sampled digital surface point.

BRIEF DESCRIPTION OF THE DRAWINGS

FIG. 6(b) is a diagram of an example of a portion of a ResNet neural network.

FIG. 22(a) through FIG. 22(g) show examples of two point segmentation in some embodiments.

DETAILED DESCRIPTION

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. The actual operations that correspond to these terms may vary depending on the particular implementation and are readily discernible by one of ordinary skill in the art.

Figure 1:
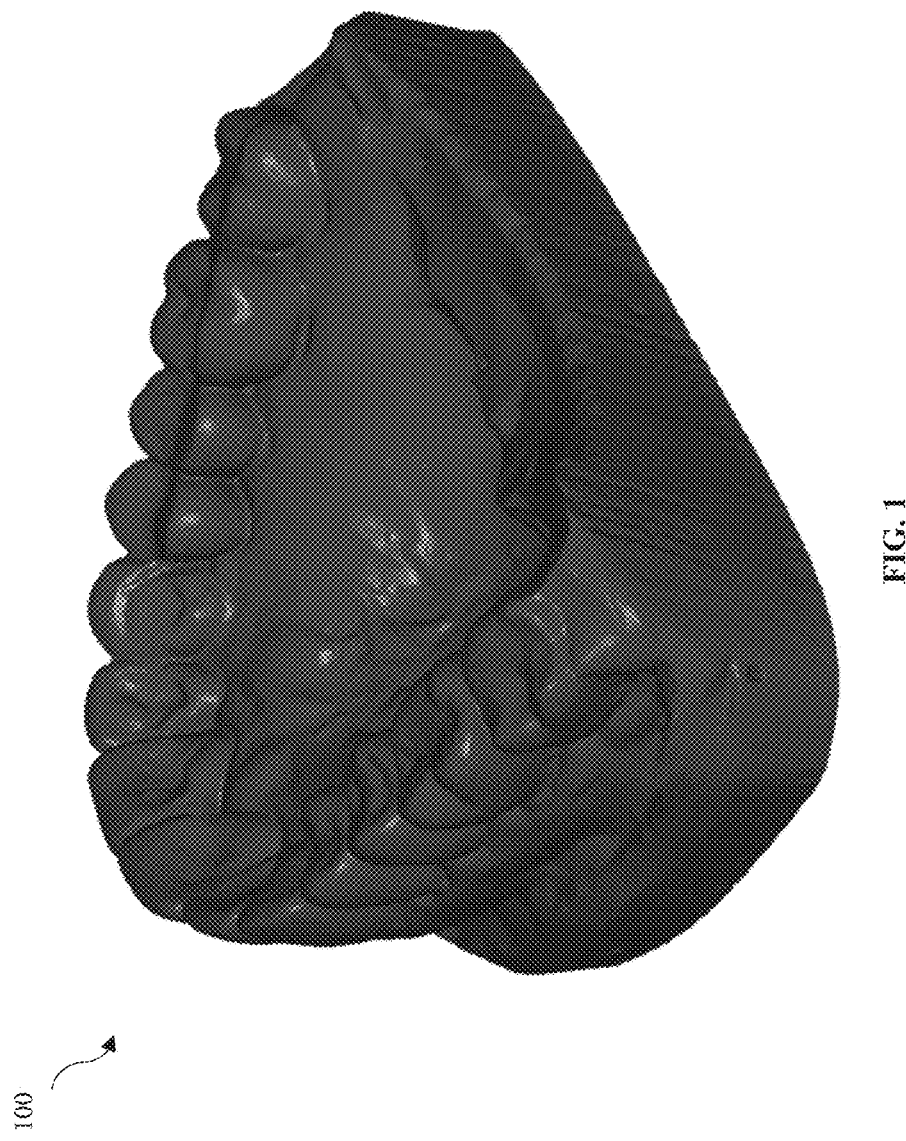
FIG. 1 shows a perspective view of a digital model of teeth and gum.

In some embodiments, the computer-implemented method can include receiving a 3D digital model of patient scan data of at least a portion of a patient's dentition, generating a panoramic image from the 3D digital model, labeling, using a first trained neural network, one or more regions of the panoramic image to provide a labeled panoramic image mapping one or more regions of the labeled panoramic image to one or more corresponding coarse digital surface triangle labels in the 3D digital model to provide a labeled 3D digital model, and segmenting the labeled 3D digital model to provide a segmented 3D digital model. Alternatively, in some embodiments, the computer-implemented method can include receiving the panoramic image, labeling, using a first trained neural network, one or more regions of the panoramic image to provide a labeled panoramic image mapping one or more regions of the labeled panoramic image to one or more corresponding coarse digital surface triangle labels in the 3D digital model to provide a labeled 3D digital model, and segmenting the labeled 3D digital model to provide a segmented 3D digital model In some embodiments, the computer-implemented method can include receiving a 3D digital model of patient scan data of at least a portion of a patient's dentition ("digital model"). FIG. 1 illustrates one example of a digital model 100 that can be generated by scanning a physical impression using any scanning technique known in the art including, but not limited to, for example, optical scanning, CT scanning, etc. The digital model 100 can also be generated by intraoral scanning of the patient's dentition, for example. One example is described in U.S. Patent Application No. 20180132982A1 to Nikolskiy et al., which is hereby incorporated in its entirety by reference. A conventional scanner typically captures the shape of the physical impression/patient's dentition in 3 dimensions during a scan and digitizes the shape into a 3 dimensional digital model. The digital model 100 can include multiple interconnected polygons in a topology that corresponds to the shape of the physical impression/patient's dentition, for example. In some embodiments, the polygons can include two or more digital triangles. In some embodiments, the scanning process can produce STL, PLY, or CTM files, for example that can be suitable for use with a dental restoration design software, such as FastDesign™ dental design software provided by Glidewell Laboratories of Newport Beach, Calif.

Neural Networks

In some embodiments, the computer-implemented method can use one or more trained neural networks. Neural networks are computational models that are part of machine learning. A neural network typically includes nodes organized in layers. The layers of nodes can include, for example, an input layer, one or more hidden layers, and an output layer. A neural network with more than one hidden layer—typically many more hidden layers—is a deep neural network ("DNN"). Information from one layer can be processed and provided to a next layer.

In some embodiments, the DNN can be a convolutional neural network ("CNN"), which is a network that uses convolution in place of the general matrix multiplication in at least one of the hidden layers of the deep neural network. A convolution layer can calculate its output values by applying a kernel function to a subset of values of a previous layer. The computer-implemented method can train the CNN by adjusting weights of the kernel function based on the training data. The same kernel function can be used to calculate each value in a particular convolution layer. One advantage to using a CNN can include learning fewer weights during training. Another advantage of using a CNN can be detecting edge features, for example.

Figure 2:
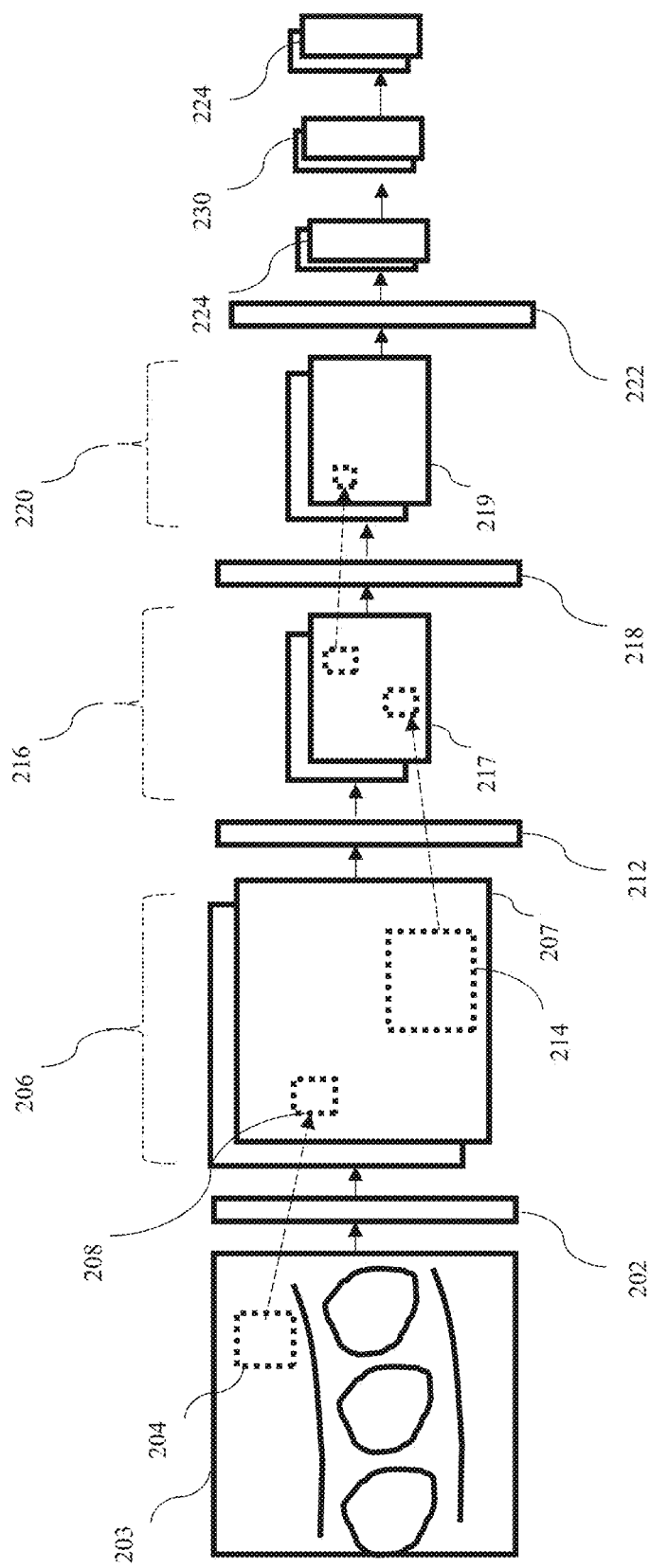
FIG. 2 shows a diagram of an example of a Convolutional Neural Network in some embodiments.

FIG. 2 illustrates an example of a CNN in some embodiments. The CNN can include one or more convolution layers, such as first convolution layer 202. The first convolution layer 202 can apply a kernel (also referred to as a filter) such as kernel 204 across an input image such as input image 203 and optionally apply an activation function to generate one or more convolution outputs such as first kernel output 208. The first convolution layer 202 can include one or more feature channels. The application of the kernel such as kernel 204 and optionally an activation function can produce a first convoluted output such as convoluted output 206. The kernel can then advance to the next set of pixels in the input image 203 based on a stride length and apply the kernel 204 and optionally an activation function to produce a second kernel output. The kernel can be advanced in this manner until it has been applied to all pixels in the input image 203. In this manner, the CNN can generate a first convoluted image 206, which can include one or more feature channels. The first convoluted image 206 can include one or more feature channels such as 207 in some embodiments. In some cases, the activation function can be, for example, a RELU activation function. Other types of activation functions can also be used.

The CNN can also include one or more pooling layers such as first pooling layer 212. First pooling layer can apply a filter such as pooling filter 214, to the first convoluted image 206. Any type of filter can be used. For example, the filter can be a max filter (outputting the maximum value of the pixels over which the filter is applied) or an average filter (outputting the average value of the pixels over which the filter is applied). The one or more pooling layer(s) can down sample and reduce the size of the input matrix. For example, first pooling layer 212 can reduce/down sample first convoluted image 206 by applying first pooling filter 214 to provide first pooled image 216. The first pooled image 216 can include one or more feature channels 217. The CNN can optionally apply one or more additional convolution layers (and activation functions) and pooling layers. For example, the CNN can apply a second convolution layer 218 and optionally an activation function to output a second convoluted image 220 that can include one or more feature channels 219. A second pooling layer 222 can apply a pooling filter to the second convoluted image 220 to generate a second pooled image 224 that can include one or more feature channels. The CNN can include one or more convolution layers (and activation functions) and one or more corresponding pooling layers. The output of the CNN can be optionally sent to a fully connected layer, which can be part of one or more fully connected layers 230. The one or more fully connected layers can provide an output prediction such as output prediction 224. In some embodiments, the output prediction 224 can include labels of teeth and surrounding tissue, for example.

CNNs can be structured and used in different ways. For example, details of an example of a You Only Look Once ("YOLO") network are described in *You Only Look Once: Unified, Real-Time Object Detection*, by Joseph Redmon, Santosh Divvala, Ross Girshick, Ali Farhadi, submitted 8 Jun. 2015, last revised 9 May 2016, v5, the entirety of which is hereby incorporated by reference. Additional details of a YOLO network can be found in *YOLO9000: Better, Faster, Stronger*, by Joseph Redmon, Ali Farhadi, University of Washington, Allen Institute for AI, published 25 Dec. 2016, arXiv, the entirety of which is hereby incorporated by reference. Details of an example of a YOLO network are also described in *YOLOv3: An Incremental Improvement*, by Joseph Redmon and Ali Farhadi, University of Washington, published 2018, ArXiv, the entirety of which is hereby incorporated by reference. A trained YOLO network can receive, for example, a 2D digital model of patient's dentition and output the digital model with a digital bounding box as the digital tooth bounding region around each digital tooth.

A YOLOv3 network (hereinafter, "YOLO network") as described can include one or more convolutional networks that predict multiple bounding boxes and class probability for each bounding box. In some embodiments, the YOLO network can divide an input image into a S×S grid. Each of grid cells can predict B bounding boxes and can determine confidence scores for the bounding boxes. The confidence scores can indicate the model's confidence that the bounding box contains an object as well as the accuracy of the predicted box. Confidence can be expressed as Pr(Object) *$IOU_{pred}^{truth}$, where IOU is intersection over union.

In some embodiments, YOLO can use dimension clusters as anchor boxes to predict bounding boxes. For example, YOLO can predict four coordinates for a bounding box: $t_x$, $t_y$, $t_w$, $t_h$. If a cell is offset from the left top corner of the image by ($C_x$, $C_y$) and a prior bounding box has width $p_w$ and a height $p_h$, the predictions can correspond to:

$$b_x = \sigma(t_x) + c_x$$

$$b_y = \sigma(t_y) + c_y$$

$$b_w = p_w e^{t_w}$$

$$b_h = p_h e^{t_h}$$

where box center coordinates relative to the filter application location are predicted using a sigmoid function (providing σ). In some embodiments, YOLO can predict each bounding box's objectness score by performing logistic regression. The result can be 1 if the prior bounding box overlaps a ground truth object by more than any other prior bounding box. A prior bounding box that is not best but that overlaps a ground truth object by more than a threshold such as 0.5 can be ignored. Other threshold values can be used and can be set in a user configurable file, for example. A prior bounding box not assigned to a ground truth object incurs a loss for objectness, but not coordinate or class prediction. In some embodiments, each box can predict classes within the bounding box by utilizing multilabel classification. For example, independent logistic classifiers can be used. Binary cross-entropy loss for class predictions can be used in training. YOLO can make predictions across scales. For example, YOLO can predict boxes at three different scales. Features can be extracted from the scales. Several convolutional layers can be added to the base feature extractor. The final convolutional layer can predict a 3D tensor encoding bounding box, objectness, and class predictions. The tensor can be N×N×[(number of boxes at each scale)*(4+1+(number of class predictions))]. For example, the number of boxes at each scale can be 3, and the class prediction number can be 80 class predictions. YOLO can obtain a feature map from two layers previous and up-sample the feature map. For example, YOLO can up-sample the feature map by 2×. Another previous feature map can be concatenated with the up-sampled feature map to provide a combined feature map. One or more convolutional layers can be added to process the combined feature map and provide a second tensor of twice the size. The same design can be performed a final time to predict boxes for the final scale. K-means clustering can be used to determine prior bounding box values. For example, 9 clusters and 3 scales can be used and the clusters divided evenly across the scales.

Figure 3:
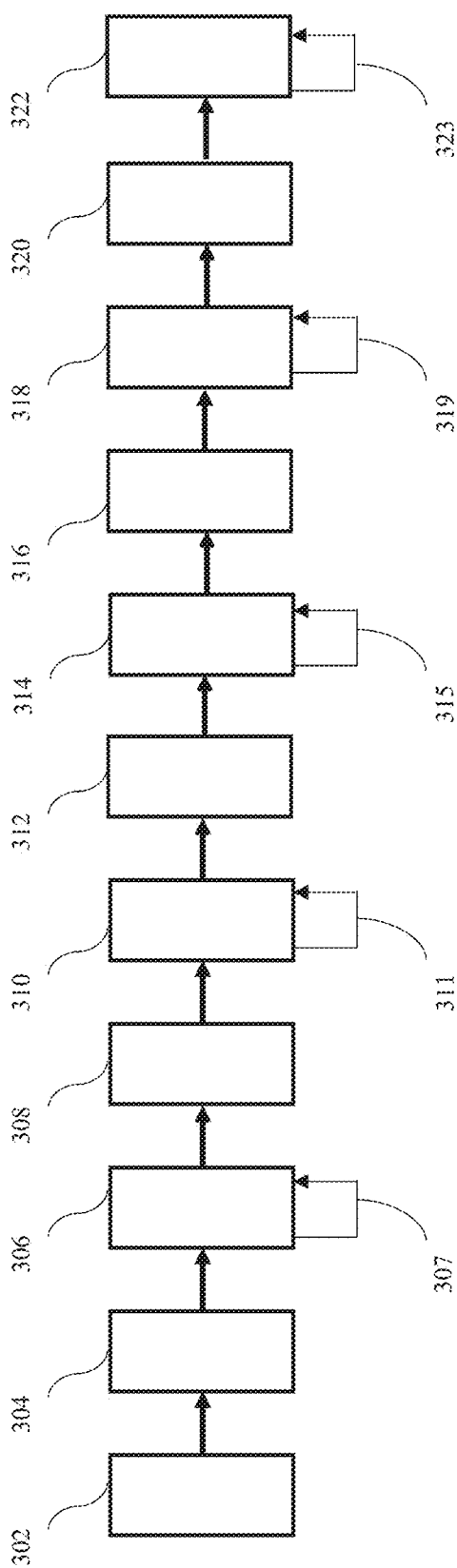
FIG. 3 shows a diagram of an example of at least a portion of a YOLO network in some embodiments.

In some embodiments, YOLO can perform feature extraction using one or more convolution layers. One or more of the convolution layers can optionally include residual operations. FIG. 3 illustrates an example of YOLO feature extraction. The following indicates the operations performed at each layer as an example:

| LAYER REF # | TYPE | FILTERS | SIZE | OUTPUT |
|---|---|---|---|---|
| Layer 302: | convolutional | 32 | 3 × 3 | 256 × 256 |
| Layer 304: | convolutional | 64 | 3 × 3/2 | 128 × 128 |
| Layer 306: | convolutional | 32 | 1 × 1 | |
| | convolutional residual 307 | 64 | 3 × 3 | 64 × 64 |
| Layer 308: | convolutional | 128 | 3 × 3/2 | 64 × 64 |
| Layer 310: | convolutional | 64 | 1 × 1 | |
| | convolutional residual 311 | 128 | 3 × 3 | 64 × 64 |
| Layer 312: | convolutional | 256 | 3 × 3/2 | 32 × 32 |
| Layer 314: | convolutional | 128 | 1 × 1 | |
| | convolutional residual 315 | 256 | 3 × 3 | 32 × 32 |
| Layer 316: | convolutional | 512 | 3 × 3/2 | 16 × 16 |
| Layer 318: | convolutional | 256 | 1 × 1 | |
| | convolutional residual 319 | 512 | 3 × 3 | 16 × 16 |
| Layer 320: | convolutional | 1024 | 3 × 3/2 | 8 × 8 |
| Layer 322: | convolutional | 512 | 1 × 1 | |
| | convolutional residual 323 | 1024 | 3 × 3 | 8 × 8 |

Layer 310 can be performed 2×, Layer 314 can be performed 8×, layer 318 can be performed 8×, and layer 322 can be performed 4×, bringing the total number of convolutions for the entire network to 53 convolutions. The avgpool can be global. Other arrangements and variations are also contemplated in the YOLO network. In some embodiments, a trained YOLO network can receive an image and provide bounding regions around each feature in the image. The features can be defined during training. YOLO training can include minimizing loss functions. The loss function only penalizes classification errors when an object is in the particular grid cell. The loss function penalizes bounding box coordinate errors if a particular predictor is responsible for the ground truth box. For example, if the particular predictor has the highest IOU of all predictors in the particular grid cell.

In some embodiments, the computer-implemented method can use a semantic segmentation network. Semantic segmentation networks can be any neural network that provides per pixel segmentation. Some examples of semantic segmentation networks can include DeconvNet, FPN, DeepLabV3, U-Net, and Pyramid Attention Network.

In some embodiments, the computer-implemented method can use U-Net as the semantic segmentation network, for example. U-Net is a convolutional neural network that can be used for biomedical image segmentation and is described in *U-Net: Convolutional Networks for Biomedical Image Segmentation*, by Olaf Ronneberger, Philipp Fischer, and Thomas Brox, Computer Science Department and BIOSS Centre for Biological Signalling Studies, University of Freiburg, Germany, arXiv, 18 May 2015, the entirety of which is hereby incorporated by reference. Standard CNNs typically include one or more convolution/pooling layers, known as contracting layers. The U-Net architecture can combine the one or more convolution/pooling contracting layers with one or more convolution/up-sampling layers. The U-Net architecture can thus increase resolution output. Localization can be achieved by combining high resolution features from the contracting path with the up sampled output. The U-Net architecture can also include a large number of feature channels to provide context information to higher resolution layers. In some embodiments, the expansive path can be symmetric to the contracting path, thereby providing a U-shaped architecture.

Figure 4A:
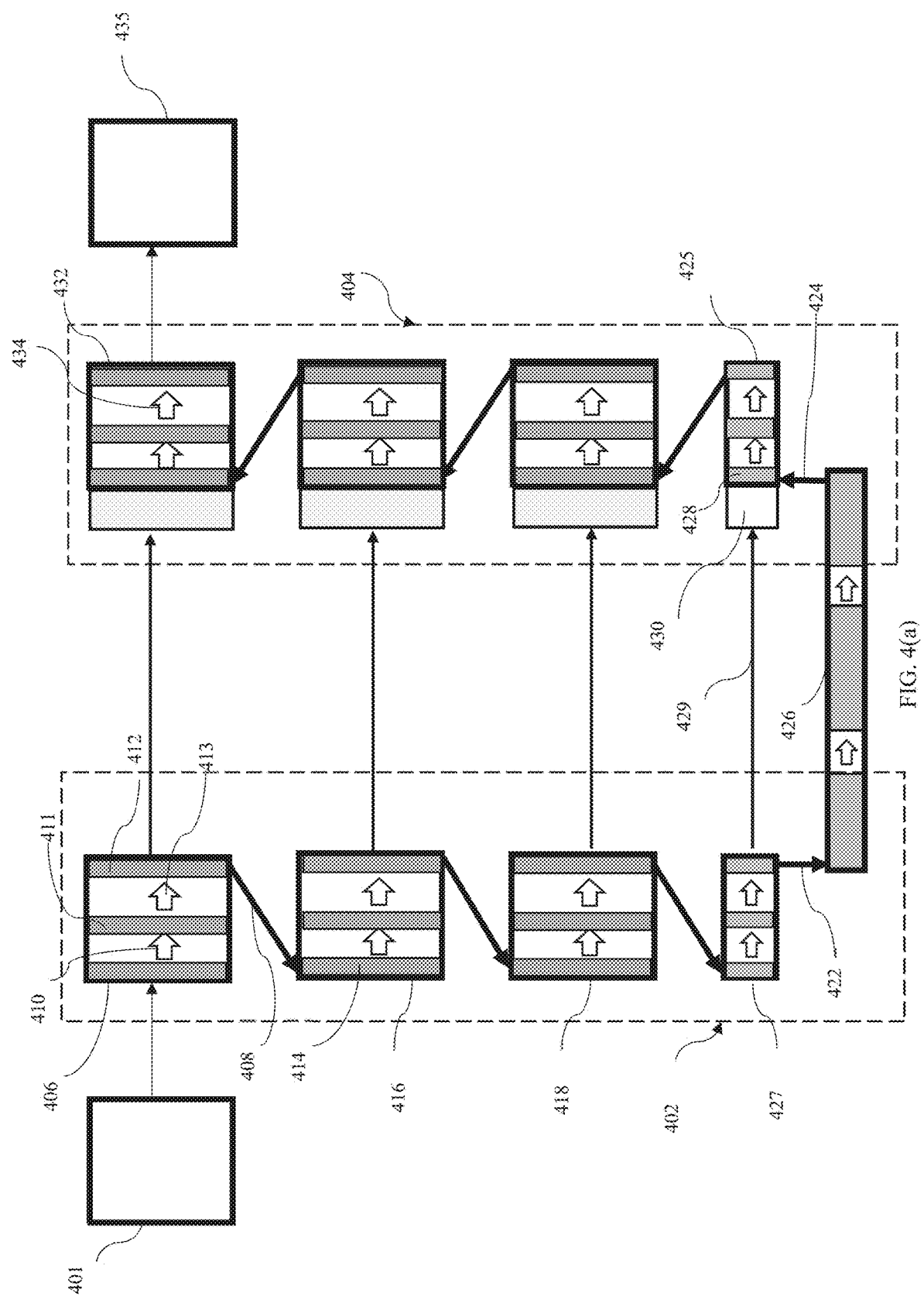
FIG. 4(A) and FIG. 4(B) show diagrams of examples of at least a portion of a U-Net network in some embodiments.

FIG. 4(a) illustrates one example of a U-Net CNN that includes a contracting path 402 and an expanding path 404 in some embodiments. The contracting path 402 can include one or more convolution layers, such as first convolution layer 406. Each convolution layer can perform one or more convolutions, such as first convolution 410. The convolution can utilize a kernel of any size. In some embodiments, for example a 3×3 kernel can be used to perform the one or more convolutions. In some embodiments, each convolution layer can perform two convolutions.

In some embodiments, each convolution can generate a feature map, and each feature map can include one or more feature channels. In some embodiments, each convolution within a convolution layer in the contracting path can maintain the same number of feature channels. For example, the network can receive an input image 401 that can have an image resolution and n number of feature channels. In convolution layer 406, first convolution 410 can provide a n-channel feature map such as first feature map 411, and second convolution 413 can provide an n-channel feature map such as last feature map 412. Both a first feature map 411 and a last feature map 412 can include n-channels. In some embodiments, each convolution can be unpadded. In some embodiments, one or more convolutions can be padded. Each of the one or more convolutions can also be followed by an activation function such as ReLu, or other activation functions known in the art.

The U-Net CNN can also include performing a pooling operation such as first pooling operation 408. The pooling operation in some embodiments can down sample each feature map. The pooling operation can in some embodiments be performed on a last feature map generated after a last convolution in the particular convolution layer. For example, in FIG. 4(a), the first pooling operation 408 can be performed on the last feature map 412, and the result can be a convolution layer input 414 to a next convolution layer 416. The first pooling operation 408 can be any pooling operation known in the art. For example, in some embodiments, the first pooling operation 408 can be a max pooling operation. In some embodiments, the first pooling operation 408 can be an average pooling operation. The pooling operation can be any value. For example, in some embodiments, the pooling operation can be a 2×2 pooling operation with a stride of 2.

In some embodiments, each pooling operation can optionally be followed by additional convolution layers and pooling operations. For example, first pooling operation 408 can be followed by a second convolution layer 416, which can be followed by a third convolution layer 418, and a fourth convolution layer 427, with pooling operations between each convolution layer. In some embodiments, the number of feature channels can be doubled with each convolution layer in the contracting path 402. For example, second convolution layer 416 can double the number of feature channels to twice that of the first convolution layer 406, third convolution layer 418 can double the number of feature channels to twice that of the second convolution layer 416, and fourth convolution layer 427 can double the number of feature channels to twice that of the third convolution layer 418. This can provide 2*n feature channels for each feature map produced by each convolution layer in the contracting path 402. For example, the first convolution layer 406 can receive an input image having 1 channel and after performing one or more convolutions, can produce a feature map having 64 channels, the second convolution layer 416 can provide a feature map having 128 channels after performing one or more convolutions, the third convolution layer 418 can provide a feature map having 256 channels after performing one or more convolutions, and the fourth convolution layer 418 can provide a feature map having 512 channels, for example. Dimensions of the image can be reduced at each convolution. For example, the input image can have a resolution of 572×572. The first convolution 410 can provide the feature map 411 with a resolution of 570×570. The second convolution can provide the last feature map 412 with a resolution of 568×568. In some embodiments, each pooling operation between convolution layers can decrease the resolution by ½. For example, the first pooling operation 408 can reduce the last feature map 412 with a resolution of 568×568 to the convolution layer input 414 having a resolution of 284×284.

The U-Net CNN can perform a final pooling operation 422 in the contracting path 402 on the final contracting path convolution layer 427. The U-Net CNN can perform one or more convolutions at a convolution layer 426. In some embodiments, the input to convolution layer 426 can have a resolution of 32×32 with 1024 feature channels. The output from convolution layer 426 can be a feature map having a resolution of 28×28 with 1024 feature channels.

The U-Net CNN can perform up-sampling of the feature map in the expansive path 404. The expansive path 404 can include one or more up-sampling layers, such as up-sampling layer 425. Each up-sampling layer can halve the number of feature channels. For example, up-sampling 424 can halve the number of feature channels for a last feature map from convolution layer 426 to provide feature map 428. The up-sampling can be 2×2 up-convolution, for example. Each up-sampling layer can concatenate a cropped feature map from the contracting path. For example, up-sampling layer 425 can perform a concatenating operation 429 to concatenate cropped feature map 430 from the contracting path 424 to the up-sampled feature map 428. Each up-sampling can double the resolution of the feature map from the previous up-sampling layer. For example, up-sampling 424 can double the feature map resolution from convolution layer 426 to provide feature map 428. As an example, where the last feature map from convolution layer 426 is 28×28, the feature map 428 can be 56×56 after up-sampling 424. Each up-sampling layer can also perform one or more convolutions, each of which can be followed by an activation function such as ReLU, or any other activation function known in the art. The convolutions within each up-sampling layer can be 3×3 convolutions, for example. The U-Net CNN can perform a 1×1 convolution as the last convolution in the final up-sampling layer. For example, final up-sampling layer 432 can include last convolution 434 that can provide output segment map 435 for example in some embodiments. In some embodiments, the output segmentation map 435 can have a resolution of 388×388 and include 2 channels, for example.

Figure 4B:
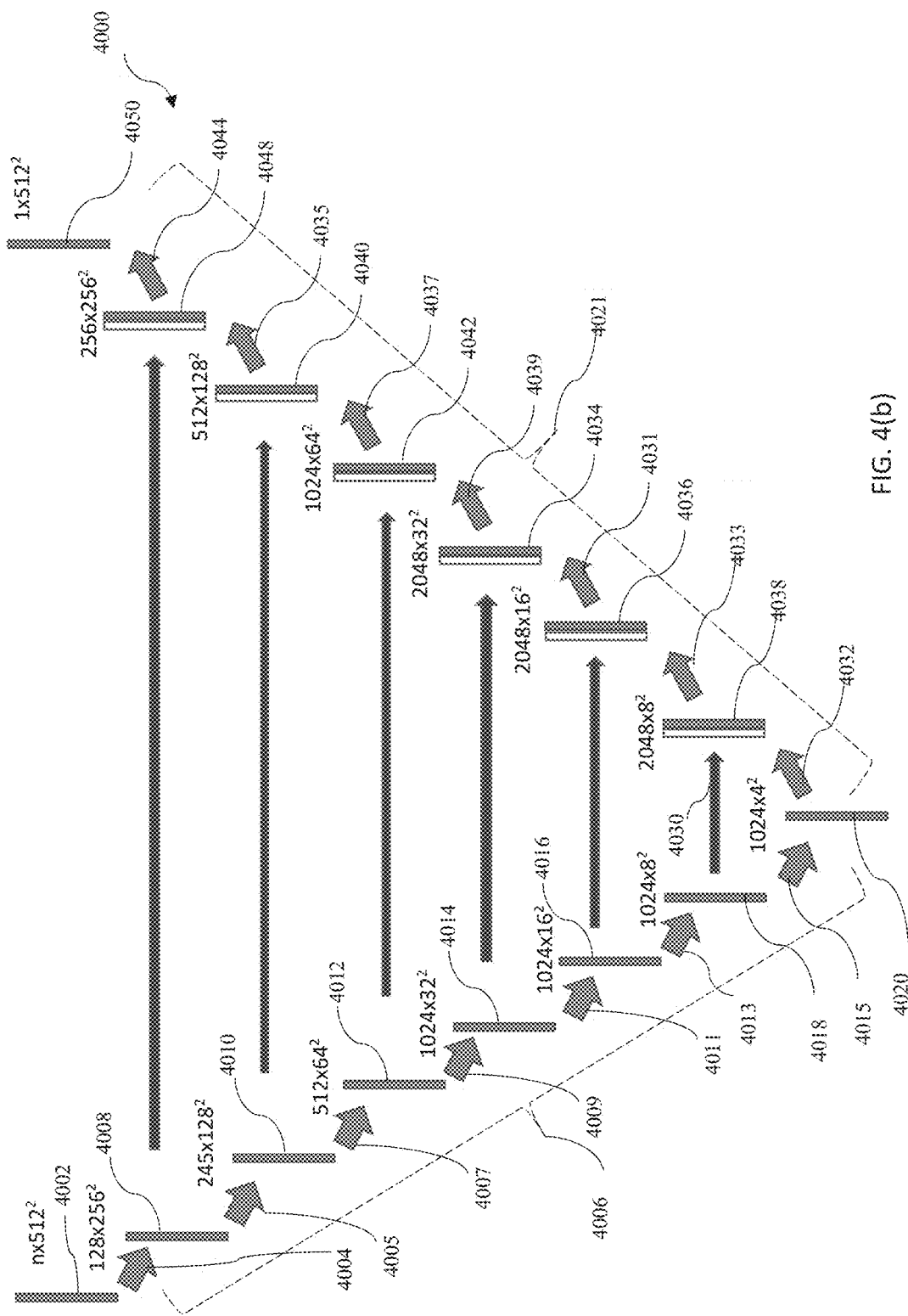

FIG. 4(b) illustrates another embodiment of a U-net neural network 4000. The U-Net neural network 4000 can receive an input image such as input image 4002 and perform one or more convolutions in one or more convolution layers. In some embodiments, the U-net neural network can include a contracting path such as contracting path 4006 and an expanding path such as expanding path 4021. An input image can be of any resolution and can include any number of channels. For example, in the figure, an input image 4002 can have an input image resolution of 512×512 with n-channels ("N×512×512"). In some embodiments, each downward pointing arrow in the figure such as convolution layer 4004 in the contracting path 4006 can include a 4×4 convolution (stride 2×2) with a LeakyReLU activation function and normalization such as InstanceNorm known in the art. In some embodiments, the convolution layer can also include pooling. In some embodiments, each upward pointing arrow such as up-convolution layer 4032 in the expanding path 4021 can include a 4×4 up-convolution (stride 2×2, padding 3×3) with a ReLU activation function and normalization such as InstanceNorm known in the art. In some embodiments, the convolution layer can also include up-sampling.

In some embodiments, each convolution layer in the contracting path 4006 can halve the resolution of its input image. For example, the first convolution layer 4004 can receive the input image 4002 and output a first feature map 4008 which can have a resolution of 128×256×256 (128 channels with 256×256 image resolution). In some embodiments, an output feature map after each convolution layer can be input to another convolution layer. For example, the first feature map 4008 output from the first convolution layer 4002 can be input to a second convolution layer 4005, which can provide a second feature map 4010 having a resolution of 245×128×128. The second feature map 4010 can be input to a third convolution layer 4007, which can output third feature map 4012 having a resolution of 512×64'64. The third feature map 4012 can be input to a fourth convolution layer 4009, which can output a fourth feature map 4014 having a resolution of 1024×32×32. The fourth feature map 4014 can be input to a fifth convolution layer 4011, which can output a fifth feature map 4016 having a resolution of 1024×16×16. The fifth feature map 4016 can be input to a sixth convolution layer 4013, which can output a sixth feature map 4018 having a resolution of 1024×8×8. The sixth feature map 4018 can be input to a seventh convolution layer 4015, which can output a seventh feature map 4020 having a resolution of 1024×4×4.

In some embodiments, each up-convolution layer in an expanding path 4021 can double the resolution of its input image. In some embodiments, one or more up-convolution layers can concatenate a cropped feature map from the contracting path after the up-convolution. In some embodiments, an output feature map after each up-convolution layer can be input to another up-convolution layer.

For example, the first up-convolution layer 4032 can receive the feature map 4020, perform the up-convolution, concatenate 4030 sixth feature map 4018, and output a first up-convolved up-convolved feature map 4038 which can have a resolution of 2048×8×8 (2048 channels with 8×8 image resolution). A second up-convolution layer 4033 can receive the first up-convolved feature map 4038, perform the up-convolution, concatenate the fifth feature map 4016, and output a second up-convolved feature map 4036 having a resolution of 2048×16×16. A third up-convolution layer 4031, can receive the second up-convolved feature map 4036, perform the up-convolution, concatenate the fourth feature map 4014, and output a third up-convolved feature map 4034 having a resolution of 2048×32×32. A fourth up-convolution layer 4039 can receive the third up-convolved feature map 4034, perform the up-convolution, concatenate the fifth feature map 4012, and can output a fourth up-convolved feature map 4042 having a resolution of 1024×64×64. A fifth up-convolution layer 4037 can receive the fourth up-convolved feature map 4042, perform the up-convolution, concatenate the fifth feature map 4010, and can output a fifth up-convolved feature map 4040 having a resolution of 512×128×128. A sixth up-convolution layer 4035 can receive the fifth up-convolved feature map 4040, perform the up-convolution, concatenate the fifth feature map 4008, and can output a sixth up-convolved feature map 4048 having a resolution of 256×256×256. A seventh up-convolution layer 4044 can receive the sixth up-convolved feature map 4048, can perform convolution, and can output a seventh up-convolved feature map 4050 having a resolution of 1×512×512.

In some embodiments, each up-convolution layer can be preceded by up-sampling.

In some embodiments, U-Net CNN training can determine the energy function by soft-max per pixel over the feature map combining it with the cross entropy loss function, where soft-max is:

$$p_k(x)=\exp(a_k(x))/(\Sigma_{k'=1}^{K}\exp(a_{k'}(x)))$$

where $a_k(x)$ is the activation in feature channel k at pixel position x, K is the number of classes, and $p_k(x)$ is the approximated maximum-function. The cross-entropy can penalize deviation at each position of $p_{l(x)}(x)$ from 1 by:

$$E=\Sigma_{x\in\Omega}w(x)\log p_{l(x)}(x)$$

where l: $\Omega \rightarrow \{1, \ldots, K\}$ and w: $\Omega \rightarrow R$ is a weight map. A separation border between touching cells can be determined by operations that are morphological. The weight map can be determined as follows:

$$w(x)=w_c(x)+w_0*\exp(-(d_1(x)+d_2(x))^2/2\sigma^2)$$

where $w_c$: $\Omega \rightarrow R$ is the weight map that balances class frequencies, $d_1$: $\Omega \rightarrow R$ is the distance to the nearest cell border, and d2: $\Omega \rightarrow R$ is the distance to the $2^{nd}$ nearest cell. Initial weights are ideally chosen so the feature map has close to unit variance. Initial weights can be obtained from a Gaussian distribution having a standard deviation of $\sqrt{2/N}$, where N is the number of incoming nodes of one neuron.

In some embodiments, the semantic segmentation network can be a Pyramid Attention Network ("PAN"). One example of a PAN is described in *Pyramid Attention Network for Semantic Segmentation* by Hanchao Li, Rengfei Xiong, Jie An and Lingxue Wang, arXiv:1805.10180v3, submitted Nov. 25, 2018, the entirety of which is hereby incorporated by reference. Other PANs architectures can be used. A PAN can include an encoder and a decoder along with a Feature Pyramid Attention ("FPA") feature and a Global Attention Upsample ("GAU") feature to increase receptive field and recover pixel localization details effectively. In some embodiments, the GAU can be part of a decoder branch of the PAN to select the discriminative multi-resolution feature representations, for example.

Figure 5A:
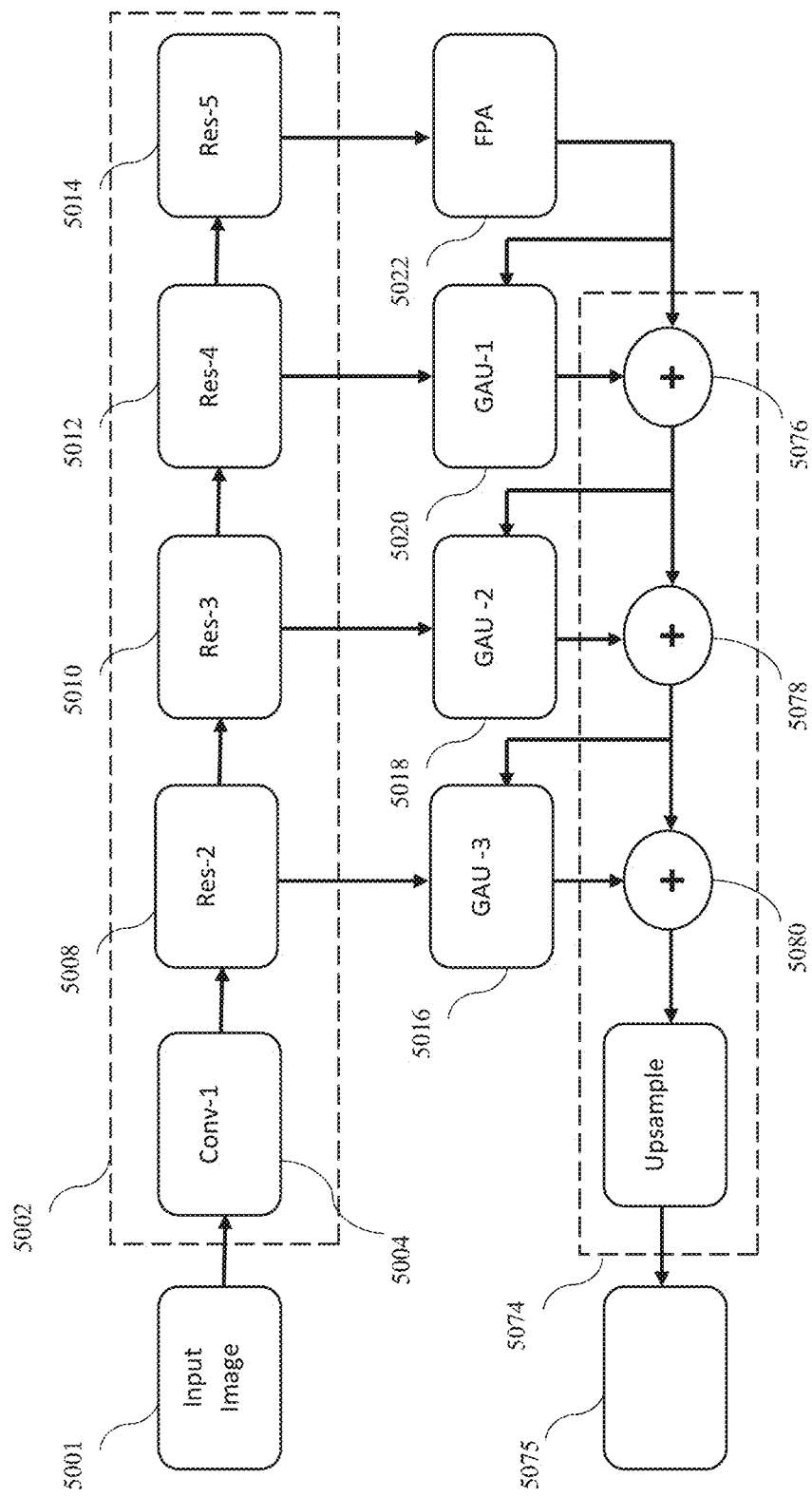
FIG. 5(a) is a diagram of an example of a pyramid attention network.
Figure 5B:
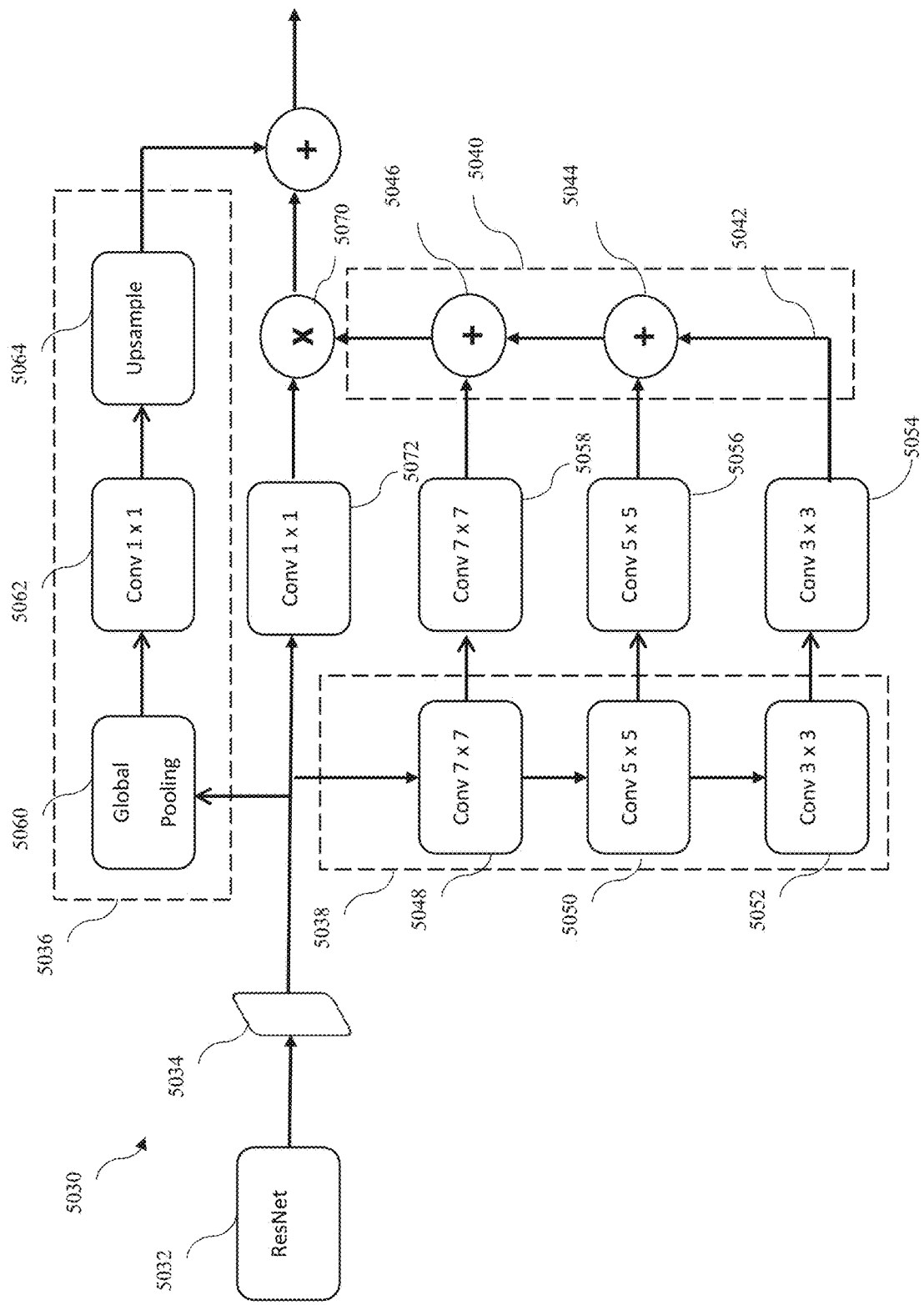
FIG. 5(b) is a diagram of an example of a pyramid attention feature.
Figure 5C:
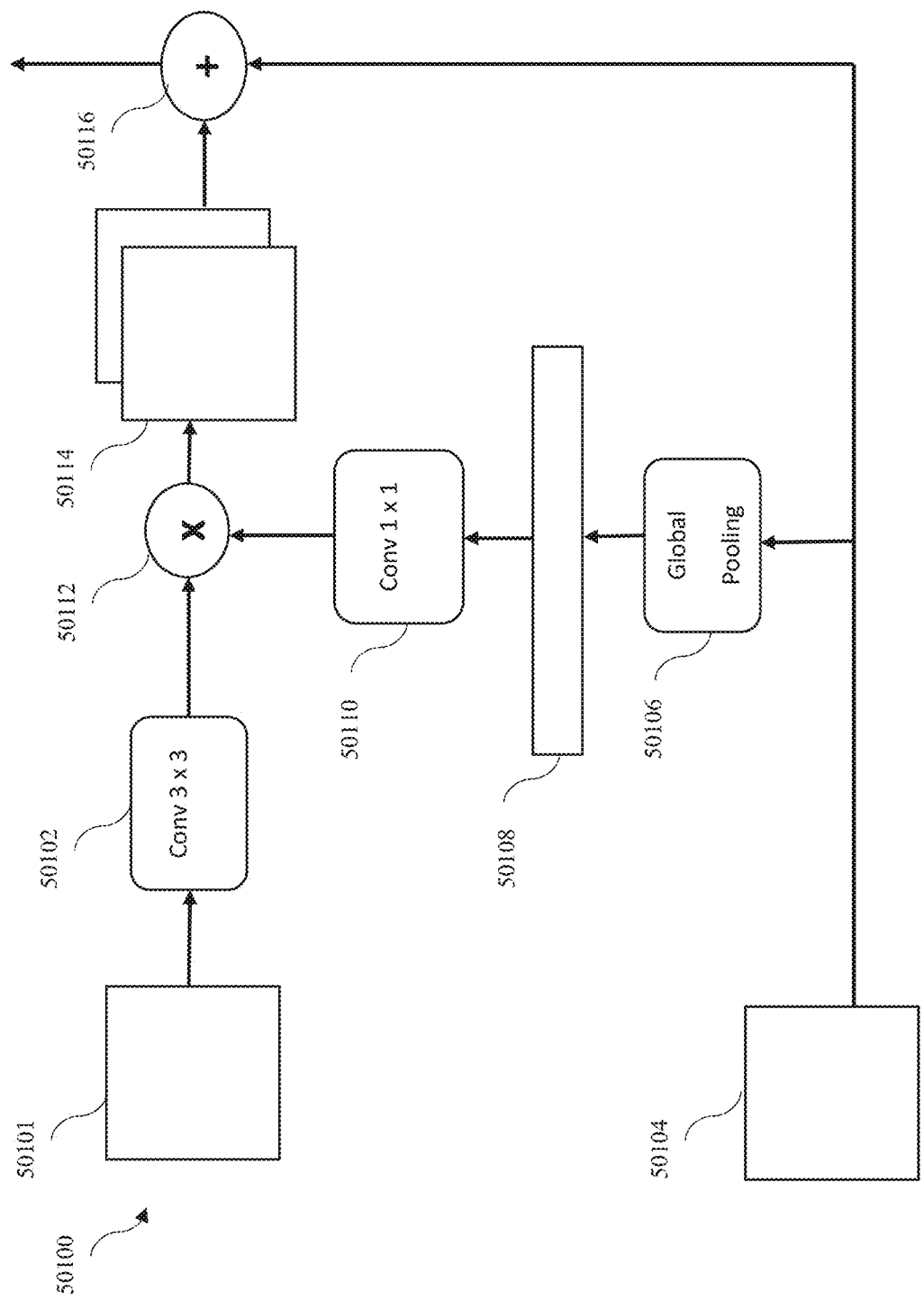
FIG. 5(c) is a diagram of an example of a global attention upsample feature.

FIG. 5(*a*) illustrates one example of a PAN in some embodiments. The PAN can include an encoder such as encoder 5002. In some embodiments, the encoder can receive an input image such as input image 5001. The encoder can include one or more stages, and each stage can be a layer combination that can perform a down-sampling operation on input data, for example. During encoding, each stage can produce an array (tensor) of features that make up the feature map of different levels. Each stage can provide one or more output feature maps corresponding to feature layers. In some embodiments, the FPA feature can be between the encoder and the decoder. In some embodiments, the decoder can include 32 channels, for example.

In some embodiments, the encoder can be any type of ResNet architecture. One example of ResNet architecture is described in ResNets, by Pablo Ruiz—Harvard University, August 2018, the entirety of which is hereby incorporated by reference. In some embodiments, the encoder can be a ResNet-101 encoder. In some embodiments the ResNet-101 encoder's different stages can output a specific number of channel feature maps. For example, in ResNet-101, the Conv-1 5004 can output a 64 channel feature map, Res-2 5008 can output a 256 channel feature map, Res-3 5010 can output a 512 channel feature map, Res-4 5012 can output a 1024 channel feature map, and Res-5 5014 can output a 2048 channel feature map, for example.

In a preferred embodiment, the encoder can be a ResNet-34 encoder. In some embodiments, the ResNet-34 encoder can include one or more stages, such as a convolution stage Conv-1 5004 followed by one or more stages such as Res-2 5008, Res-3 5010, Res-4 5012, and Res-5 5014. The ResNet-34 encoder, Conv-1 5004 can output a 64 channel feature map, Res-2 5008 can output a 64 channel feature map, Res-3 5010 can output a 128 channel feature map, Res-4 5012 can output a 256 channel feature map, and Res-5 5014 can output a 512 channel feature map, for example.

Figure 6A:
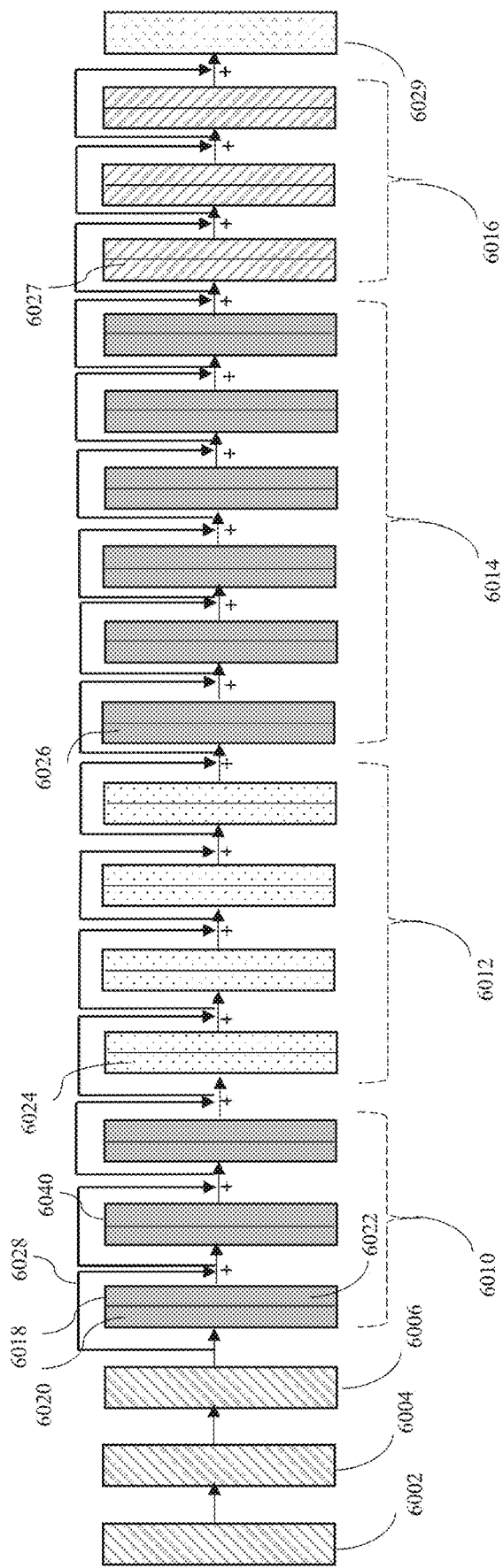
FIG. 6(a) is a diagram of an example of a ResNet neural network.

FIG. 6(*a*) illustrates one example of a ResNet-34 neural network. An input image 6002 can be provided to a first ResNet convolution layer Conv-1 6004. In some embodiments, the first ResNet convolution layer can be a 7×7 convolution with 64 channels and a stride of 2. In some embodiments, this can be followed by a pooling step 6006 with a stride of 2. Some embodiments of the ResNet neural network can include, for example, four additional ResNet stages, or layers, that can each perform one or more 3×3 convolutions, bypassing the input every two convolutions. The height and width dimensions (i.e. image resolution) as well as the number of channels (feature map dimension) can remain the same within each stage.

FIG. 6(*a*) illustrates an example of a ResNet-34 neural network that can include five stages: Conv-1 6004, Res-2 6010, Res-3 6012, Res-4 6014, and Res-5 6016. Each block in the Res-2 6010, Res-3 6012, Res-4 6014, and Res-5 6016 stages represents a pair of 3×3 convolutions performed in series (i.e. the output of the first convolution is the input of the second convolution within each box). For example, a first block 6018 can include a first Res-2 convolution 6020 and a second Res-2 convolution 6022 performed in series. In some embodiments, the first convolution in a first block of one or more ResNet stages can increase the stride from 1 to 2. For example, a first Res-3 convolution 6024 in stage Res-3 6012, a first Res-4 convolution 6026 in stage Res-4 6014, and a first Res-5 convolution 6027 in stage Res-5 6016 can each use a stride of 2, with the remaining convolutions using a stride of 1. In some embodiments, the ResNet stages can perform bypassing. In bypassing, the input of a first block is added to the output of the first block and the sum is provided as input to the next block. For example, as illustrated in FIG. 6(*a*), input to first block 6018 bypasses via bypass 6028 the first block and is added to an output of the first block 6018. This sum is then provided as input to a next block 6040.

FIG. 6(*b*) illustrates an example of bypassing in more detail. A first block 6050 can receive a first block input feature map 6052. The input image 6052 can undergo a first convolution 6054 such as a 3×3 convolution, for example, and provide a first convolution output 6056 which can undergo a second convolution 6058 to provide a first block output 6060. The ResNet neural network can, via bypass 6062, sum the first block input feature map 6052 with the first block output 6060 and provide the sum as a second block input feature map 6064 to a second block 6066. This pattern can be repeated throughout the ResNet stages as illustrated in FIG. 6(*a*).

Referring to FIG. 6(*a*), the Conv-1 6004 stage can output an image size of 112×112 after performing a 7×7, 64 channel, stride 2 convolution. The Res-2 6010 stage can include 3 blocks, with each block performing two 3×3, 64 channel convolutions, and output an image size of 56×56. The Res-3 6012 stage can include 4 blocks, with each block performing two 3×3, 128 channel convolutions, and output an image size of 28×28. The Res-4 6014 stage can include 6 blocks, with each block performing two 3×3, 256 channel convolutions, and output an image size of 14×14. The Res-5 6016 stage can include 3 blocks, with each block performing two 3×3, 512 channel convolutions, and output an image size of 7×7. Finally, the pooling stage 6029 can perform average pooling in some embodiments, 1000-d fc, softmax to output a 1×1 image size.

As illustrated in FIG. 5(*a*), the output of a ResNet stage in some embodiments can be input to the next stage of the encoder. Additionally, the output of certain stages can also be inputs to a GAU. For example, the output of Res-2 5008 can be input to Res-3 5010 as well as input to GAU-3 5016, the output of Res-3 5010 can be input to Res-4 5012 as well as input to GAU-2 5018, the output of Res-4 5012 can be input to Res-5 5014 as well as to GAU-1 5020. In some embodiments, the output feature map(s) of the last stage of the encoder can be input to the FPA. For example, the output feature map(s) of Res-5 5014 can be input to the FPA 5022.

In some embodiments, the FPA can combine features from three pyramid scales by using a U-shaped structure. In some embodiments, the FPA can embed different scale context features in a fully convolutional network ("FCN") based pixel prediction framework. FIG. 5(*b*) illustrates an example of a FPA in some embodiments. The FPA 5030 can receive a feature map 5034 from an encoder network such as Resnet 5032, for example. The resolution of the feature map can be, in some embodiments, 3233 32, for example. In some embodiments, the FPA can include down sampling followed by up sampling. For example, the FPA 5030 can include a down sampling branch 5038 and an up sampling branch 5040. In some embodiments, the down sampling branch 5038 can include one or more convolution layers such as first down-sample convolution 5048, which can perform a 7×7 convolution, second down-sample convolution 5050, which can perform a 5×5 convolution, and third down-sample convolution 5052, which can perform a 333 3 convolution. Because high-level feature maps have smaller resolution, a large kernel size does not add to the computation complexity. In some embodiments, the pyramid structure can integrate differently scaled information step-by-step, allowing it to incorporate neighbor scales of context features more precisely, for example. The output of each down-sample convolution can be fed to another convolutional layer with the same filter size. For example, the output of the third down-sample convolution 5052 can be input to a 3×3 convolution 5054, the output of the second down-sample convolution 5050 can be input to a 5×5 convolution 5056, and the output of the first down-sample convolution 5048 can be input to a 7×7 convolution 5058. In some embodiments, the up sampling branch can include increasing feature map resolutions. For example, in some embodiments, the resolution at first up-sample branch stage 5042 can be 4×4, at second up-sample branch stage 5044 can be 8×8, and at the third up-sample branch stage 5046 can be 32×32. Each up-sampling branch can include concatenation in some embodiments as illustrated in the figure, for example. The origin features from the convolution networks can be multiplied pixel-wise at, for example at pixel-wise multiplier 5070 after passing through a convolution layer such as convolution layer 5072, which can perform a 1×1 convolution, for example. One or more advantages of the pyramid structure can include, for example, at least fusing different scale context information and producing pixel-level attention for high-level feature maps.

In some embodiments, the FPA can include a global pooling branch such as global pooling branch 5036, which can include global pooling 5060, a 1×1 convolution 5062, and upsampling 5064.

The filter and resolution sizes provided are examples only. The filter and resolution sizes can be any suitable value. The down sampling and up sampling branches can include more or fewer stages in some embodiments. In some embodiments, all convolution layers are followed by batch normalization.

In some embodiments, the FPA can provide input to a decoder, such as decoder 5074 illustrated in FIG. 5(*a*). As shown in the figure, in some embodiments, the decoder can also receive input from one or more GAUs, such as, for example, GAU-1 5020, GAU-2 5018, and GAU-3 5016. In some embodiments, FPA 5022 can provide its output as input to the decoder 5074 as well as to GAU-1 5020. GAU-1 5020 can also receive input from a ResNet layer such as Res-4 5012. In some embodiments, GAU-2 5018 can receive input from a corresponding ResNet layer such as Res-3 5010 and from a first decoder stage such as first decoder stage 5076, for example. In some embodiments, GAU-3 can receive input from Res-2 5008 as described previously, as well as from a second decoder stage 5078. In some embodiments, a third decoder stage 5080 can sum the output of GAU-3 5016 with the output from the second decoder stage 5078. In some embodiments, each decoder stage can perform a summation of its inputs.

In some embodiments, each GAU can include performing global average pooling that can, for example, provide global context of low-level features that can help selecting category localization details. FIG. 5(*c*) illustrates one example of a GAU, such as GAU 50100. In some embodiments, the GAU can perform a convolution such as, for example convolution 50102 on one or more low-level features such as low level features 50101. In some embodiments, the convolution layer 50102 can be a 3×3 convolution that can, for example, reduce channels of feature maps from CNNs, for example. In some embodiments, the global context from high-level features such as high level features 50104 can be pooled at global pooling 50106, which can provide, for example, one or more feature maps such as feature map(s) 50108. In some embodiments, the feature map(s) 50108 can have a resolution of C×1×1, for example, where C can denote the number of channels. In some embodiments, the GAU can generate a global context from high-level features through a convolution with batch normalization and ReLU non-linearity which can be multiplied by low-level features. For example, in some embodiments, convolution layer 50110 can provide a 1×1 convolution with batch normalization and ReLU non-linearity, which can be multiplied at multiplier 50112 with the low-level features from the convolution layer 50102 to provide one or more weighted low level features such as weighted low level features 50114, for example. In some embodiments, the high-level features can be added to the weighted low level features. For example, in some embodiments, the high-level features 50104 can be added to the weighted low-level features 50114 at summation 50116. One or more advantages of such a GAU can include, for example, deploying different scale feature maps and using high-level features to provide guidance information to low-level feature maps. In some embodiments, the PAN can provide a segmented image 5075.

In some embodiments, ResNet can be pretrained, for example, on ImageNet using a dilated convolution strategy that extracts the feature map. For example, in some embodiments, the dilated convolution rate of 2 is applied to res5*b* blocks. This can produce feature maps whose output sizes from ResNet are 1/16 of the input image, for example. In the case of ResNet-101 and ResNet-34 implementations, the 7×7 convolution layers can be replaced, for example, by three 3×3 convolution layers. In some embodiments, training can include a poly learning rate known in the art. For example, the initial rate can be multiplied by (1-iter/max_iter)$^{power}$, where power is 0.9 and the initial rate is 4e-3. In some embodiments, the network can be trained using mini-batch stochastic gradient descent ("SGD") with batch size 16, momentum 0.9, and weight decay 0.0001. In some embodiments, a cross-entropy error at each pixel over categories can be applied as a loss function, for example. During training, random left-right flipping and random scaling between 0.5 and 2 for all datasets can be used, for example. In some embodiments, average pooling may be preferred over max pooling, particularly 3×3 kernel sized convolutions. In some embodiments, the stride can be 16, for example. One or more advantages of using a PAN can include, for example, improved performance.

In some embodiments, the computer-implemented method can implement, include, and/or perform one or more features of one or more neural networks. In some embodiments, the computer-implemented method can train one or more neural networks. Although certain values are discussed for one or more features in the one or more neural networks, the values are provided as examples only. Other suitable values and variations can also be used.

Panoramic Image

Figure 7:
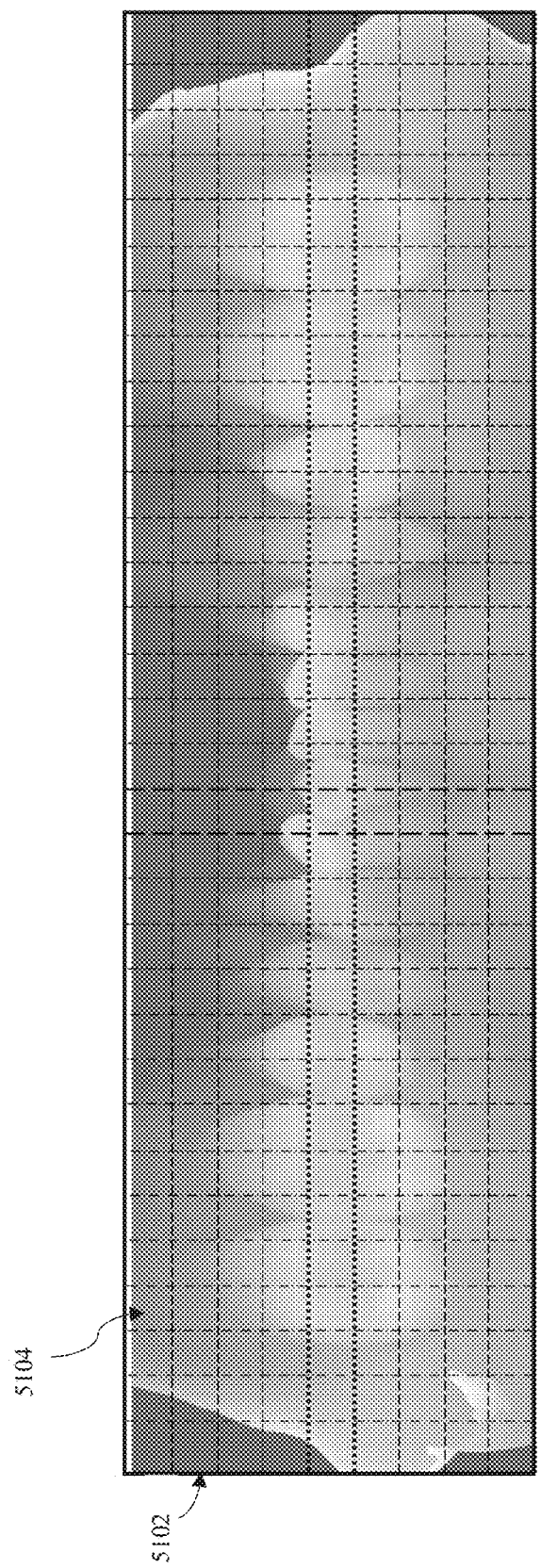
FIG. 7 shows an example of a panoramic image with an overlaid illustration showing columns and rows in some embodiments.

In some embodiments, the computer-implemented method can use a trained neural network to generate a panoramic image from the 3D digital model. The panoramic image can be a 2D raster image that includes, for example, one or more columns and one or more rows. In some embodiments, the computer-implemented method can generate each column and row in the 2D panoramic image. A panoramic image can advantageously, for example, show more digital teeth in the digital model from more sides. The panoramic image can advantageously, for example, be a single image depicting both lingual and buccal gum-crown margins of all teeth. FIG. 7 illustrates an example of a panoramic image with an overlaid illustration of columns and rows, such as row 5102 and column 5104. The number of columns and rows shown in FIG. 7 is for illustrative purposes only. In some embodiments, the number of columns and rows desired can be set in a configuration file or through a graphical user interface element such as an input filed for both values. In some embodiments, the computer-implemented method can load the desired number of columns and rows from the configuration file, for example. A higher number of columns and rows can increase the resolution of the panoramic image. As an example, if the number of columns is set to, for example 2048, and the number of rows is set to 320, for example, then the panoramic image can be 2048×320 (width by height). This can mean that the computer-implemented method takes 2048 samples on the spline. Smaller dimensions can be faster to process, while larger dimensions can provide better spatial resolution. One advantage can include being able to select between speed and spatial resolution.

In some embodiments, the neural network can be trained by providing a 2D depth map training dataset that can include one or more 2D depth maps of at least a portion of a digital dental arch having one or more digital teeth, with each digital tooth marked with a marked digital tooth bounding region, such as a rectangular shaped boundary, for example. Other shapes for the marked digital tooth bounding region can also be used. Some embodiments of the computer-implemented method can optionally include generating a 2D image from the 3D digital model. In some embodiments, the 2D image can be a 2D depth map. The 2D depth map can include a 2D image that contains in each pixel a distance from an orthographic camera to an object along a line passing through the pixel. The object can be, for example, a digital jaw model surface, in some embodiments, for example. In some embodiments, an input can include, for example, an object such as a 3D digital model of patient's dentition ("digital model"), such as a jaw, and a camera orientation. In some embodiments, the camera orientation can be determined based on an occlusion direction. The occlusal direction is a normal to an occlusal plane and the occlusal plane can be determined for the digital model using any technique known in the art. For example, one technique is described in AN AUTOMATIC AND ROBUST ALGORITHM OF REESTABLISHMENT OF DIGITAL DENTAL OCCLUSION, by Yu-Bing Chang, James J. Xia, Jaime Gateno, Zixiang Xiong, Fellow, IEEE, Xiaobo Zhou, and Stephen T. C. Wong in IEEE TRANSACTIONS ON MEDICAL IMAGING, VOL. 29, NO. 9, September 2010, the entirety of which is incorporated by reference herein. Alternatively, in some embodiments, the occlusal direction can be specified by a user using an input device such as a mouse or touch screen to manipulate the digital model on a display, for example, as described herein. In some embodiments, the occlusal direction can be determined, for example, using the Occlusion Axis techniques described in PROCESSING DIGITAL DENTAL IMPRESSION U.S. patent application Ser. No. 16/451,968, of Nikolskiy et al., the entirety of which is incorporated by reference herein.

Figure 8:
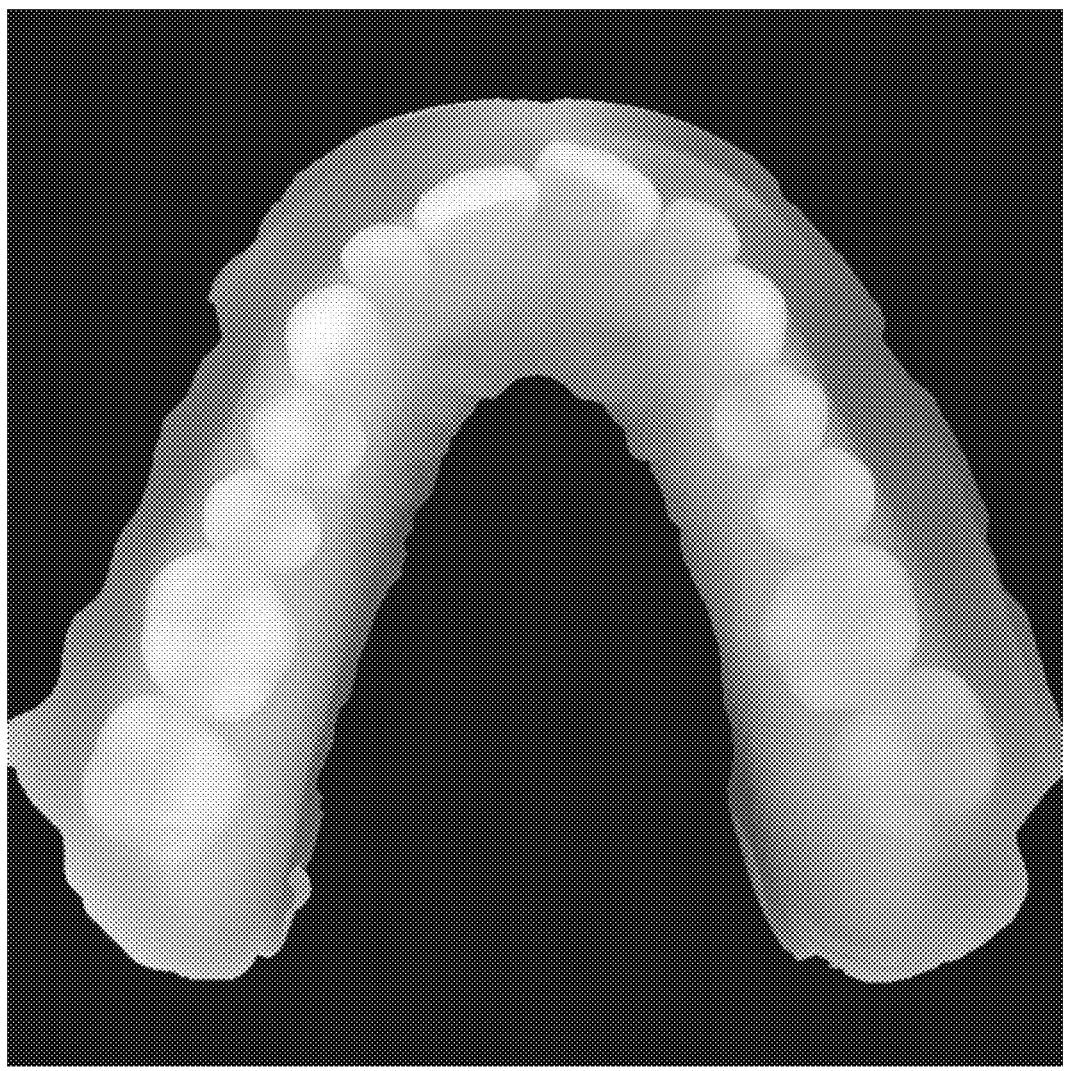
FIG. 8 shows an image of an example of a 2D depth map.

The 2D depth map can be generated using any technique known in the art, including, for example z-buffer or ray tracing. For example, in some embodiments, the computer-implemented method can initialize the depth of each pixel (j, k) to a maximum length and a pixel color to a background color, for example. The computer-implemented method can for each pixel in a polygon's projection onto a digital surface such as a 3D digital model determine a depth, z of the polygon at (x, y) corresponding to pixel (j, k). If z<depth of pixel (j, k), then set the depth of the pixel to the depth, z. "Z" can refer to a convention that the central axis of view of a camera is in the direction of the camera's z-axis, and not necessarily to the absolute z axis of a scene. In some embodiments, the computer-implemented method can also set a pixel color to something other than a background color for example. In some embodiments, the polygon can be a digital triangle, for example. In some embodiments, the depth in the map can be per pixel. FIG. 8 illustrates an example of a 2D depth map of a digital model in some embodiments.

Figure 9:
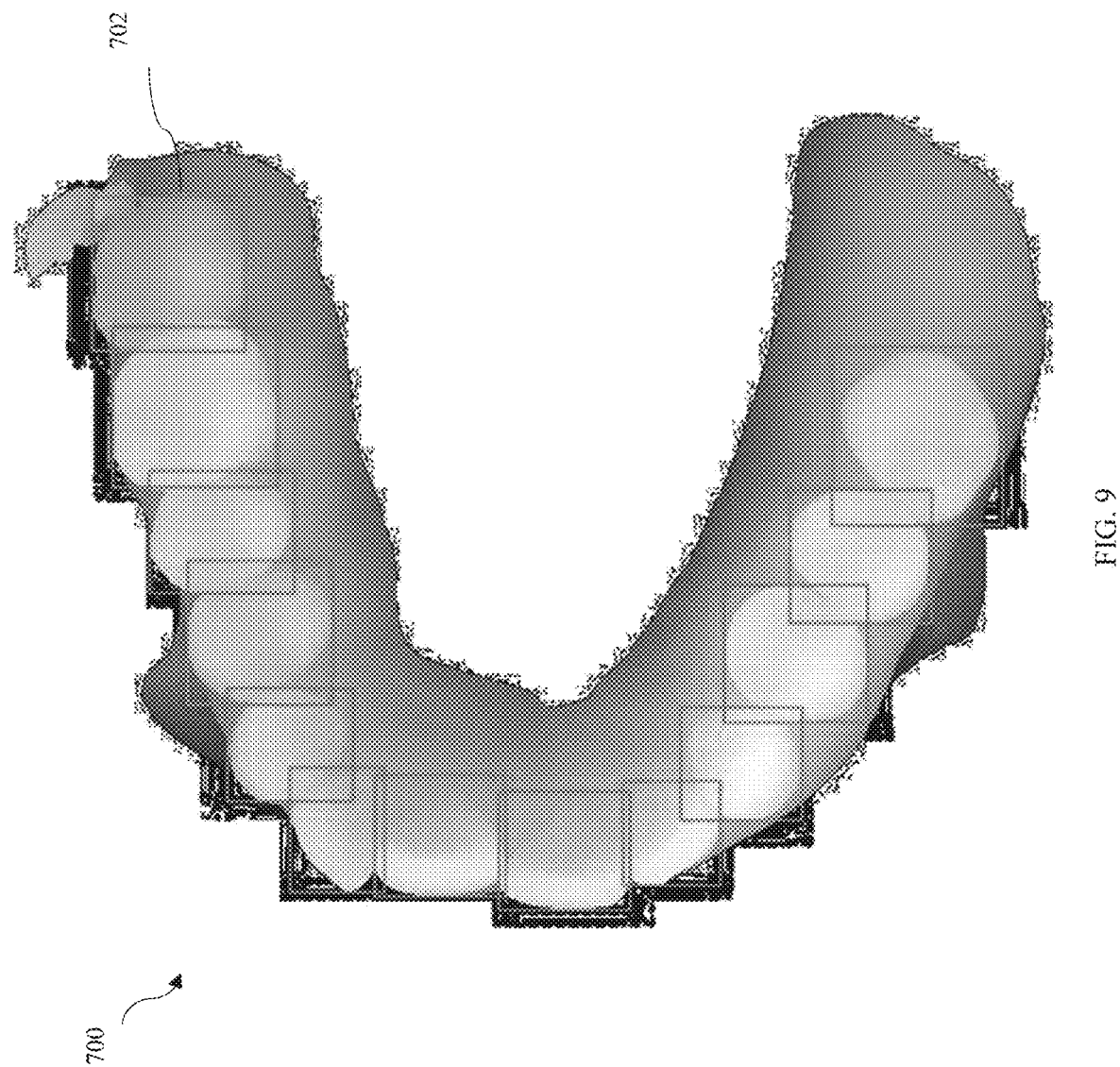
FIG. 9 shows an image of an example of a marked 2D depth map.

To generate the training dataset, each digital tooth in each 2D depth map in the training dataset can be marked by a digital tooth bounding region. FIG. 9 illustrates an example of a 2D depth map 700 with a marked digital tooth bounding region 702. The marked digital tooth bounding region for each digital tooth in the 2D depth map can be marked manually by a user or technician, for example, or by an automatic process in some embodiments. In some embodiments, the computer-implemented method can provide the 2D depth map training set to a neural network to provide a 2D depth map trained neural network. The 2D depth map trained neural network can, in some embodiments, receive one or more 2D depth maps and generate a digital tooth bounding region for each digital tooth in the 2D depth map automatically. In some embodiments, the computer-implemented method can train a YOLO network with one or more 2D depth maps, each with marked digital tooth bounding regions shaped as rectangles or boxes. In some embodiments, the computer-implemented method can train a semantic segmentation network with one or more 2D depth maps, each with marked digital tooth bounding regions shaped to follow the general shape each digital tooth as it appears in the 2D depth map. For example, in some embodiments, the computer-implemented method can train a CNN, U-Net CNN, or a PAN neural network. In some embodiments, the training dataset can include 10,000 2D depth map images, for example. Other suitable numbers of 2D depth map images can be used as the training dataset in some embodiments, for example.

Figure 10A:
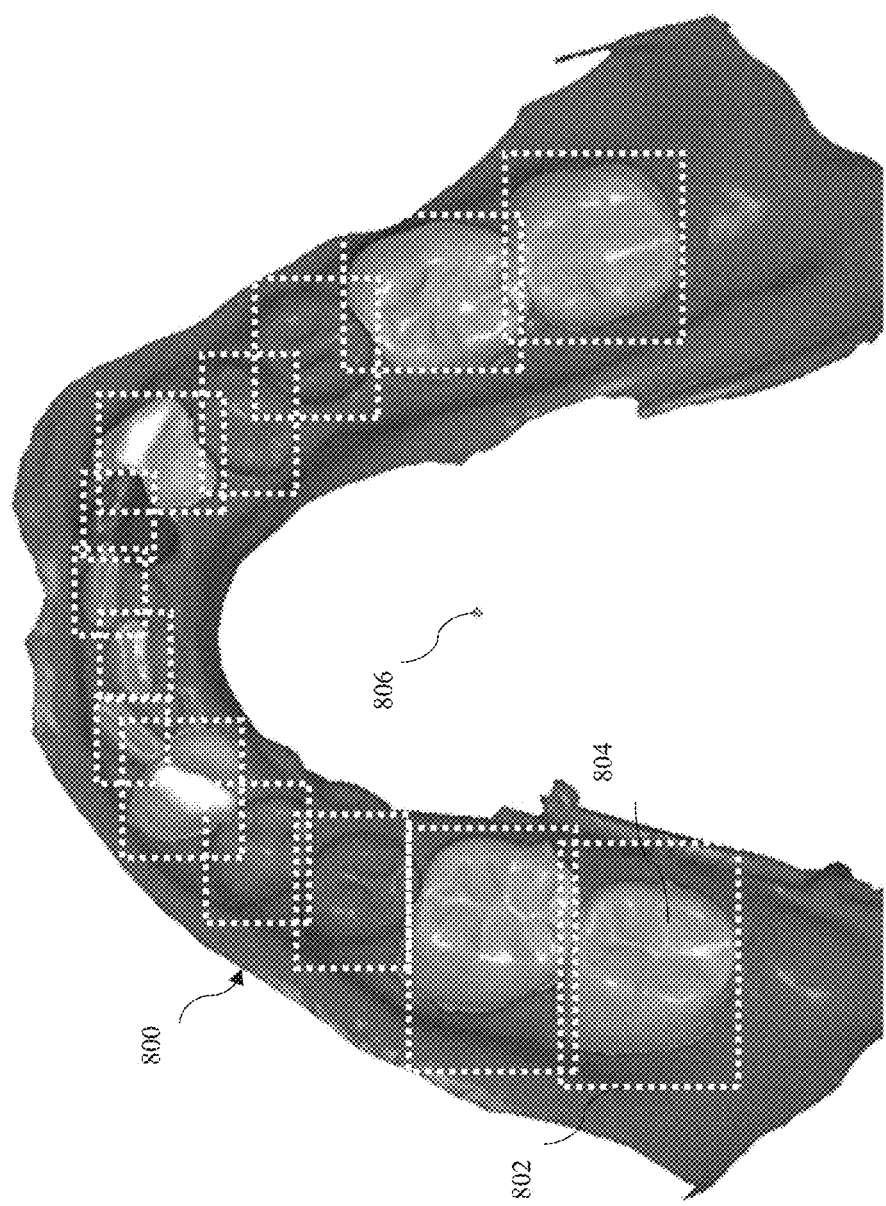
FIG. 10(a) shows an image of a digital dental arch with one or more digital teeth with illustrated bounding regions.

After training, in some embodiments, the 2D depth map trained neural network can receive one or more unmarked 2D depth maps each having a digital dental arch and provide a digital tooth bounding region for each digital tooth in at least a portion of each digital dental arch. In some embodiments, the computer-implemented method can use the trained neural network to roughly define a digital tooth bounding region around each digital tooth, for example. Each digital tooth bounding region can provide a rough approximation of the position of each tooth when viewed from an occlusal direction. FIG. 10(a) illustrates an example of a digital model 800 having a digital dental arch with one or more digital tooth that includes digital tooth bounding regions around each digital tooth. In the example, the digital tooth bounding region is a digital bounding box 802 which bounds digital tooth 804 when viewed from the occlusal direction 806. Although a bounding box 802 is shown, each digital tooth bounding region can be of any suitable shape and/or size to bound the particular digital tooth in some embodiments.

In some embodiments, the 2D depth map trained neural network is a 2D depth map trained convolutional neural network as described previously. In some embodiments, the 2D depth map trained CNN can be a 2D depth map trained YOLO network as described previously. The trained 2D depth map YOLO network can receive a 2D depth map and can provide a digital tooth bounding region for each digital tooth in at least a portion of the 2D depth map. The computer-implemented method can label all pixels bounded by a digital tooth bounding region with a unique label in some embodiments for example. The digital tooth bounding regions provided by a trained 2D depth map YOLO network can be digital tooth bounding boxes, for example.

In some embodiments, the 2D depth map trained neural network is a 2D depth map trained semantic segmentation network. In some embodiments, the 2D depth map trained semantic segmentation network can be a 2D depth map trained U-Net as described previously. In some embodiments, the 2D depth map trained semantic segmentation network is a PAN network as described previously. The trained 2D depth map semantic segmentation network can receive a 2D depth map and can provide a digital tooth bounding region for each digital tooth in at least a portion of the 2D depth map. The computer-implemented method can label all pixels bounded by a digital tooth bounding region with a single label in some embodiments for example. The digital tooth bounding regions provided by the trained 2D depth map semantic segmentation network can generally be shaped to follow the shape of the corresponding digital tooth in the 2D depth map, for example. The trained 2D depth map semantic segmentation network can thus provide per pixel segmenting/labeling.

The labels can distinguish each tooth from another and/or each tooth from surrounding gingiva and gums, for example. A YOLO network can be faster to train and apply, for example, but may not provide the per pixel labeling a semantic segmentation network can provide. A 2D depth map trained YOLO network can thus be suitable to generate the panoramic image in some embodiments. However, a 2D depth map trained semantic segmentation network can also be used to generate the panoramic image in some embodiments, for example. In some embodiments, each digital tooth can be identified based on its size and location in the digital dental arch.

Figure 10B:
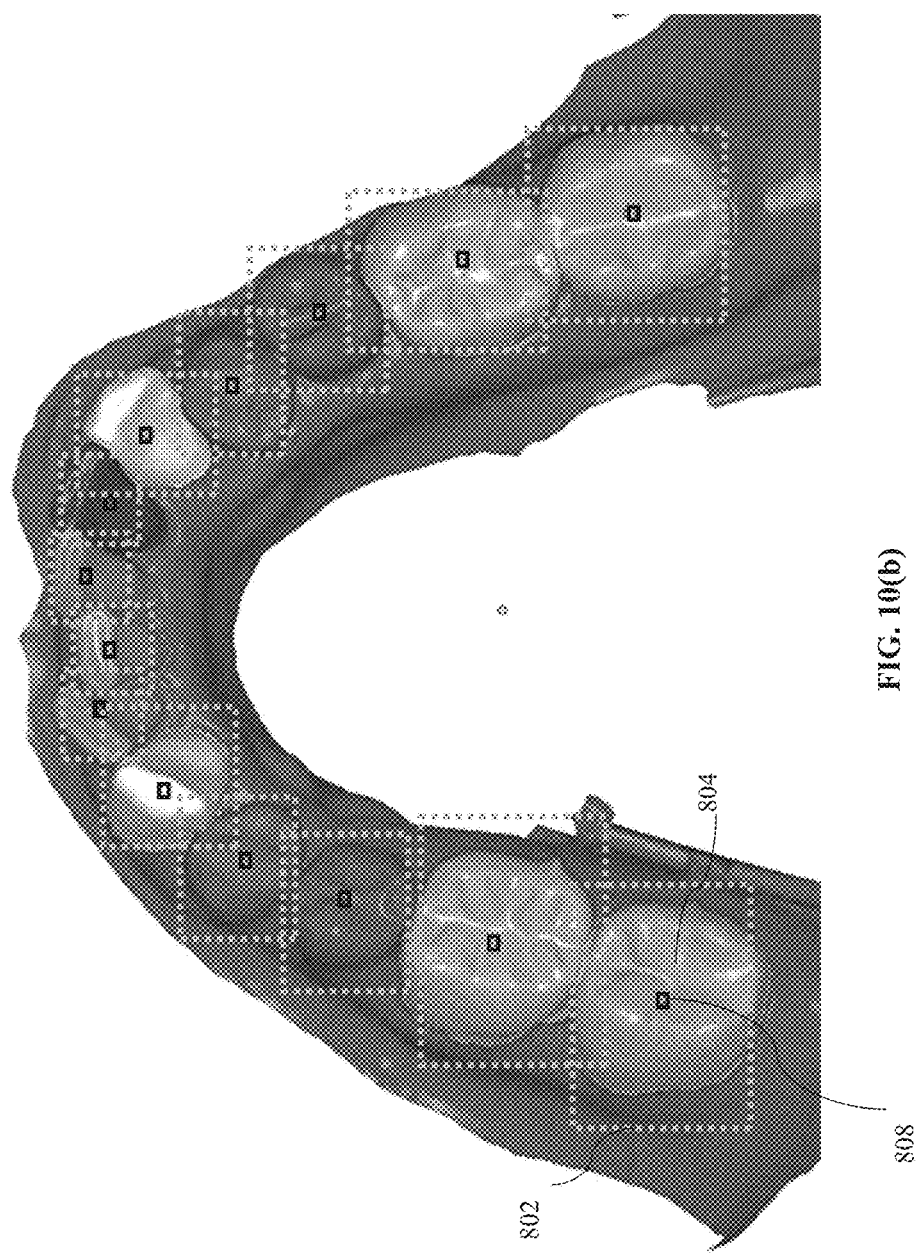
FIG. 10(b) shows an image of a digital dental arch with one or more digital teeth with illustrated bounding regions and digital bounding box centers.
Figure 10C:
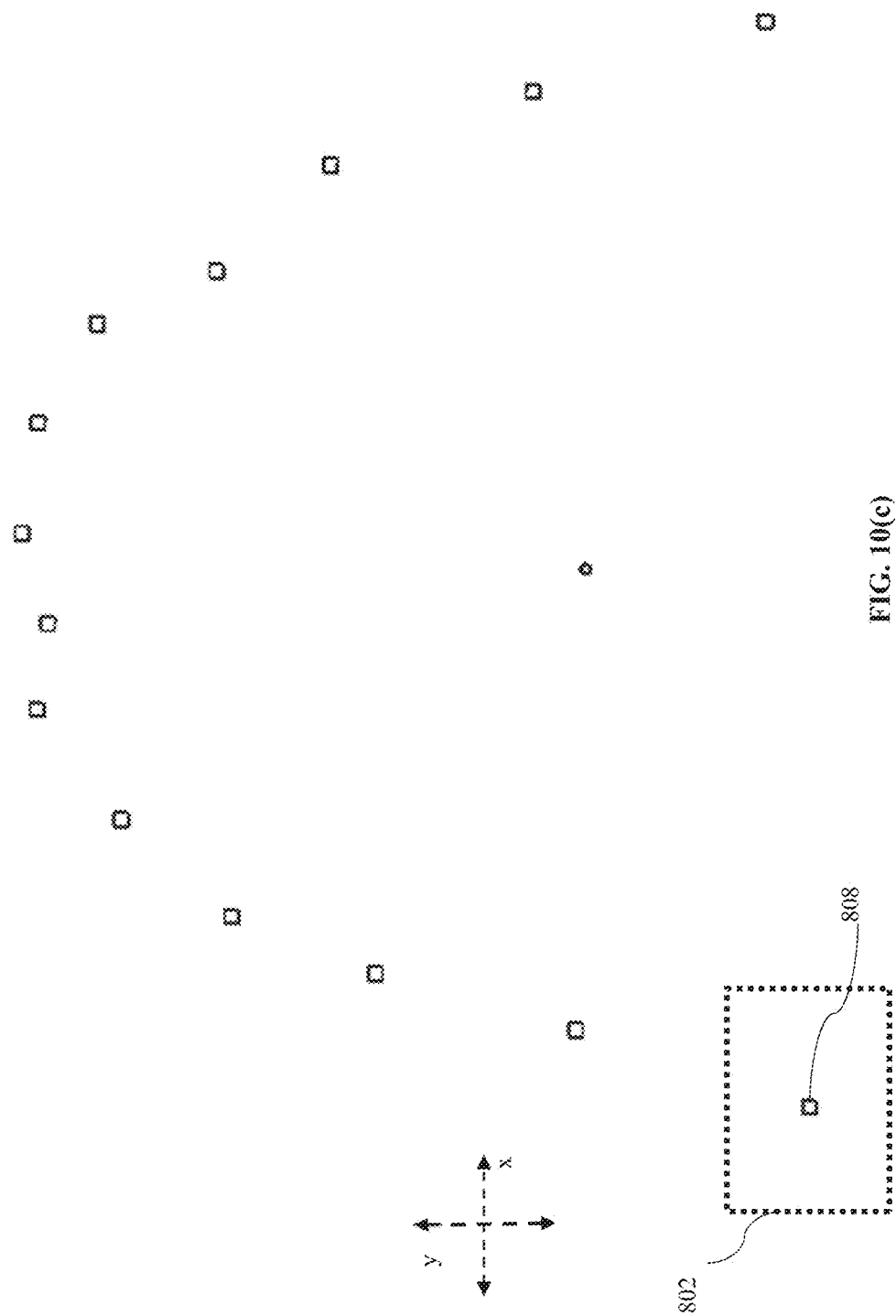
FIG. 10(c) shows digital bounding box centers.

In some embodiments, the computer-implemented method can connect one or more of the digital tooth bounding regions together. In some embodiments, the computer-implemented method can connect one or more of the bounding region centers together. In some embodiments, the computer-implemented method can determine a center of each digital tooth bounding region. The digital tooth bounding region center can be a geometric center of the digital tooth bounding region in some embodiments, for example. FIG. 10(b) illustrates an example where the digital tooth bounding region is a digital bounding box 802 for digital tooth 804. The computer-implemented method can determine a digital bounding box center 808. The digital bounding box center 808 can be a geometric center of the digital bounding box 802 in some embodiments, for example. FIG. 10(c) illustrates an example of digital bounding box centers of digital model 800 from FIG. 10(a) such as digital bounding box center 808 of digital bounding box 802.

In some embodiments, the computer-implemented method can connect neighboring digital tooth bounding region centers by passing a spline through one or more digital tooth bounding region centers. In some embodiments, the computer-implemented method can select the one or more digital tooth bounding region centers to pass the spline through such that the spline forms a smooth convex hull. In some embodiments, the computer-implemented method can pass the spline through all of the digital tooth bounding region centers. In some embodiments, the spline can be a smooth spline. In some embodiments, the neighboring digital tooth bounding regions are adjacent to one another. This can be because the digital tooth bounding regions are of neighboring or adjacent teeth. The spline between two digital tooth bounding region centers can be determined using any technique known in the art. For example, a suitable spline between two digital tooth bounding region centers can include a cubic hermite spline. The cubic hermite spline can include the positions of adjacent digital tooth bounding region centers and first derivatives at each of the two digital tooth bounding region centers in some embodiments, for example. The computer-implemented method can thus provide one or more splines connected together to form a continuous spline through two or more of the digital tooth bounding region centers. The computer-implemented method can determine the spline using any technique known in the art. For example, in some embodiments, splines can be determined by determining tangents in every center point and then constructing the spline in between every two digital tooth bounding region centers as a Bezier curve. In some embodiments, where a digital tooth bounding region center has only one adjacent neighboring digital tooth bounding region center, the computer-implemented method can extend a straight line smoothly continuing the spline on the side without the adjacent neighboring digital tooth bounding region center.

Figure 10D:
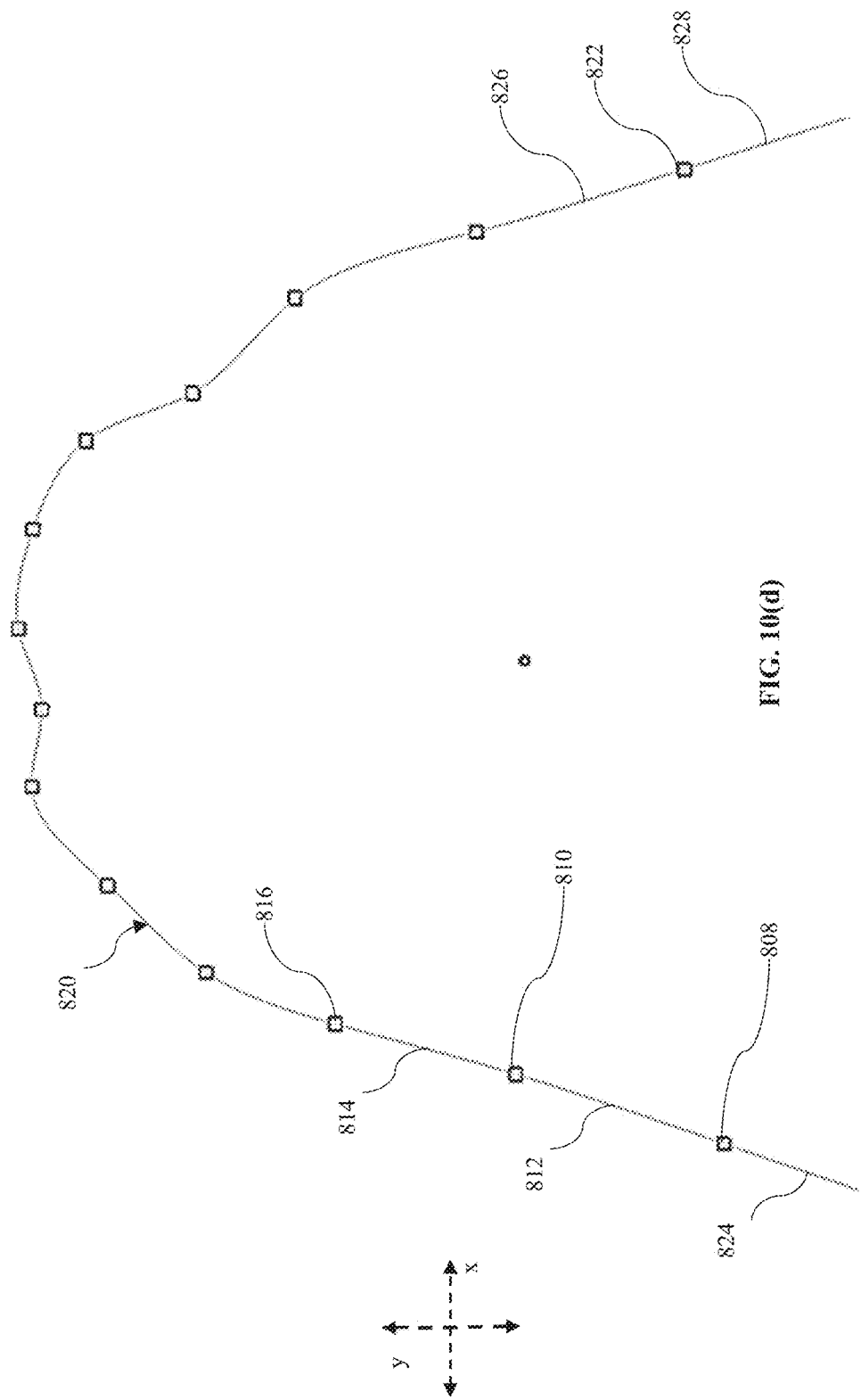
FIG. 10(d) shows one or more digital tooth bounding region centers connected together by a spline.

FIG. 10(d) illustrates an example of one or more digital tooth bounding region centers such as a first bounding box center 808 and a second bounding box center 810 connected together by a first spline 812. The figure also illustrates a second spline 814 connecting the second digital bounding box center 810 with a third digital bounding box center 816. In the case of the first bounding box center 808, which lacks one adjacent neighbor, the computer-implemented method can extend the first spline 812 in a straight line 824. Similarly, in the case of last bounding box center 822, which lacks one adjacent neighbor, the computer-implemented method can extend last spline 826 in a straight line 828. The computer-implemented method can, in this manner, connect neighboring digital bounding box centers into a continuous spline 820. As discussed previously, the spline can be a continuous smooth spline.

Figure 11:
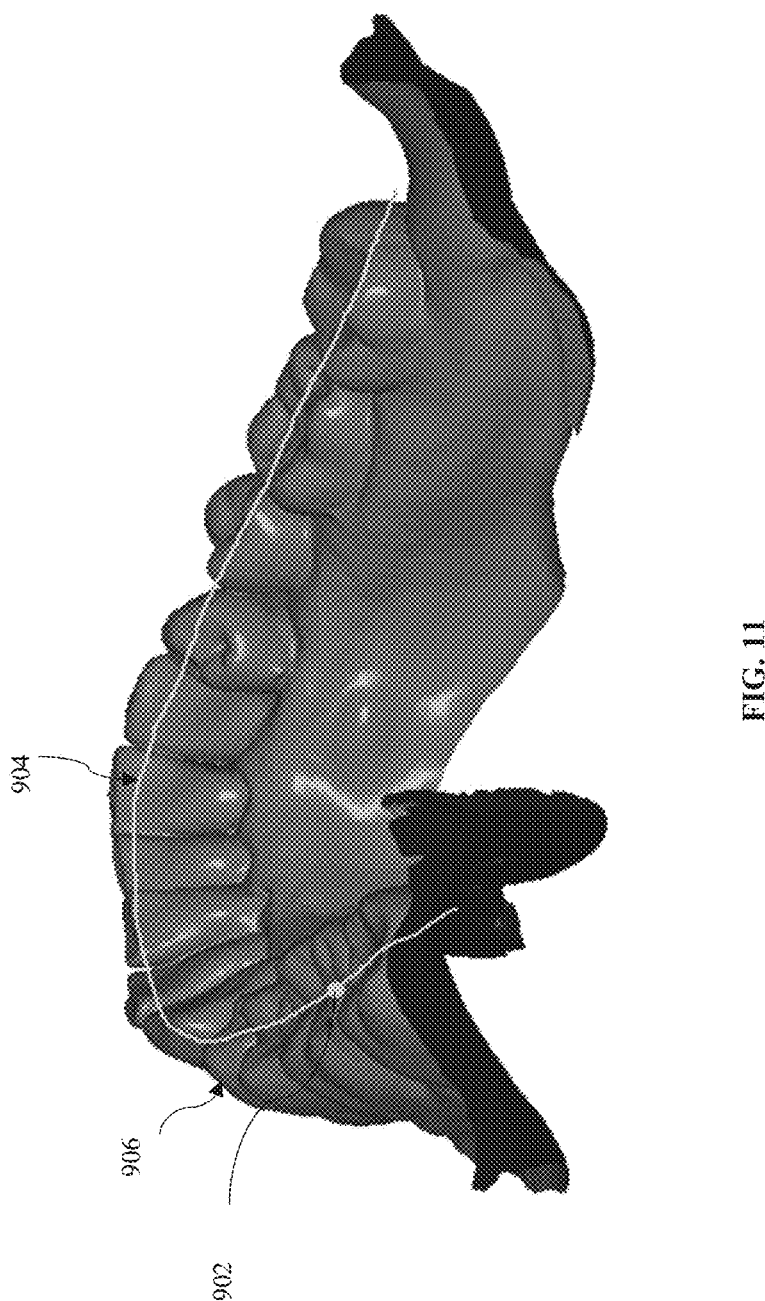
FIG. 11 shows an example of digital model with a sampled point on a spline.

In some embodiments, the computer-implemented method can sample one or more points on the spline. In some embodiments, the computer-implemented method can determine the number of points to sample based on the number of desired columns in the panoramic image. For example, in some embodiments, the number of sample points can be the same as the number of columns in some embodiments. The computer-implemented method can sample a user configurable number of sample points in some embodiments. The number of samples can be set and loaded from a configuration file in some embodiments, or set by a user entering the value into an input field of a GUI with an input device. The number of samples can be any suitable value, with a higher sampling number corresponding to a higher resolution panoramic image and a lower sampling number corresponding to a lower resolution panoramic but that is generated more rapidly. As an example, the number of sampling points can be 2048. FIG. 11 illustrates an example of a sampled point 902 on a continuous smooth spline 904 projected onto digital model 906.

Figure 12A:
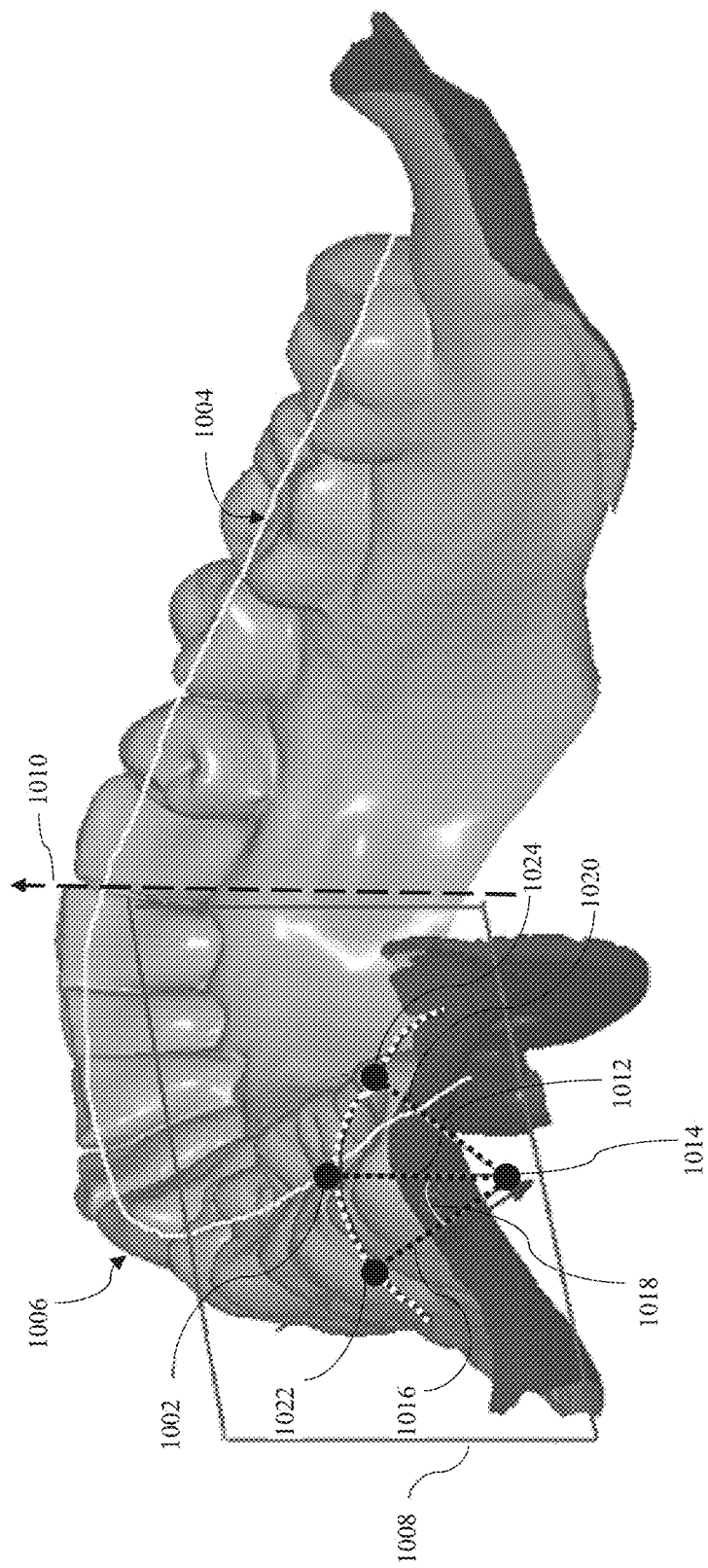
FIG. 12(a) shows an example of a digital model with a sample digital surface point that corresponds to a sampled point on a continuous smooth spline.

In some embodiments, the computer-implemented method can determine a sampled digital surface point that corresponds to the sampled point on the spline. In some embodiments, the computer-implemented method can determine the sampled digital surface point by projecting the sampled point onto the 3D digital model. FIG. 12(a) illustrates an example of a sample digital surface point 1002 that corresponds to a sampled point on continuous smooth spline 1004 for 3D digital model 1006. In some embodiments, the computer-implemented method can determine the sampled digital surface point corresponding to the sampled point on the spline by determining a sample plane orthogonal to the spline at the sampled point on the spline and parallel to the occlusal direction in the digital model and determining an intersection of the plane with the digital surface at the sampled point on the spline. For example, as illustrated in FIG. 12(a), the computer-implemented method can determine the sample plane 1008 that is orthogonal to the continuous smooth spline 1004 at the sampled digital surface point 1002 and parallel to the occlusion direction 1010.

In some embodiments, the computer-implemented method can determine one or more digital surface points associated with the sampled digital surface point. In some embodiments, the computer-implemented method can, for each sampled digital surface point, determine or use the determined sample plane orthogonal to the continuous smooth spline at the sampled digital surface point and parallel to the occlusal direction in the digital model.

In some embodiments, the computer-implemented method can move the sampled digital surface point down along the occlusion direction by a sampled digital surface point depth to a sample depth point along a sampled digital surface point depth ray. For example, the computer-implemented method can move the sampled digital surface point 1002 along a sample point depth ray 1012 down along the occlusion direction 1010 in some embodiments to the sample depth point 1014 along the sample point depth ray 1012. The sample point depth ray can be parallel to the occlusal direction in some embodiments. In some embodiments, the computer-implemented method can move the sampled digital surface point within the sample plane. For example, the sampled digital surface point 1002 can be moved within the sample plane 1008. In some embodiments, the sample point depth can be, for example 15 mm along the occlusal direction from the sampled digital surface point. Other suitable sample point depths can be used.

In some embodiments, the computer-implemented method can determine one or more rays from the sample depth point to the digital surface to determine the one or more digital surface points associated with the sampled digital surface point. In some embodiments, the computer-implemented method can determine the one or more rays by extending rays at different angles with respect to the sample point depth ray from the sample depth point to the digital surface of the 3D digital model in the sample plane. In some embodiments, the computer-implemented method can form the inclination angles within an inclination angle range. In some embodiments, the inclination angle range can be −45 degrees to +45 degrees with respect to the sample point depth ray. The inclination angle range can be a user-configurable value that can be set in a configuration file which the computer-implemented method can read, for example, and/or input by a user using an input device through the use of a GUI, for example. In some embodiments, the computer-implemented method can determine the number of rays from the sample depth point to generate based on the number of desired rows in the panoramic image. In some embodiments, the computer-implemented method can set the number of rays from the sample depth point to the number of desired rows in the panoramic image. In some embodiments, the computer-implemented method can determine an inclination angle increment for the one or more rays from the sample depth point. In some embodiments, the inclination angle increment can be determined as (total inclination angle range)/(number of columns desired). For example, if the number of columns desired is set to 320 and the total inclination angle range is set to −45 degrees to +45 degrees, then then inclination angle-increment would be (90 degrees)/(320) which would be 0.28 degrees.

In some embodiments, the computer-implemented method can from the sample point depth ray and determine one or more inclination angles on both sides of the sample point depth ray as multiples of the inclination angle increment to determine one or more rays extending from the sample depth point to at least the digital surface of the 3D digital model. In the example, the computer-implemented method would determine one or more rays as multiples of 0.28 degrees on either side of the sample point depth ray. The one or more rays can be in the sample plane in some embodiments, for example. The computer-implemented method can determine digital surface points associated with the sampled digital surface point as digital surface points intersecting with the rays. The computer-implemented method can determine one or more rays and their corresponding intersecting digital surface points until the end of range is reached on either side of the sample point depth ray.

Figure 12B:
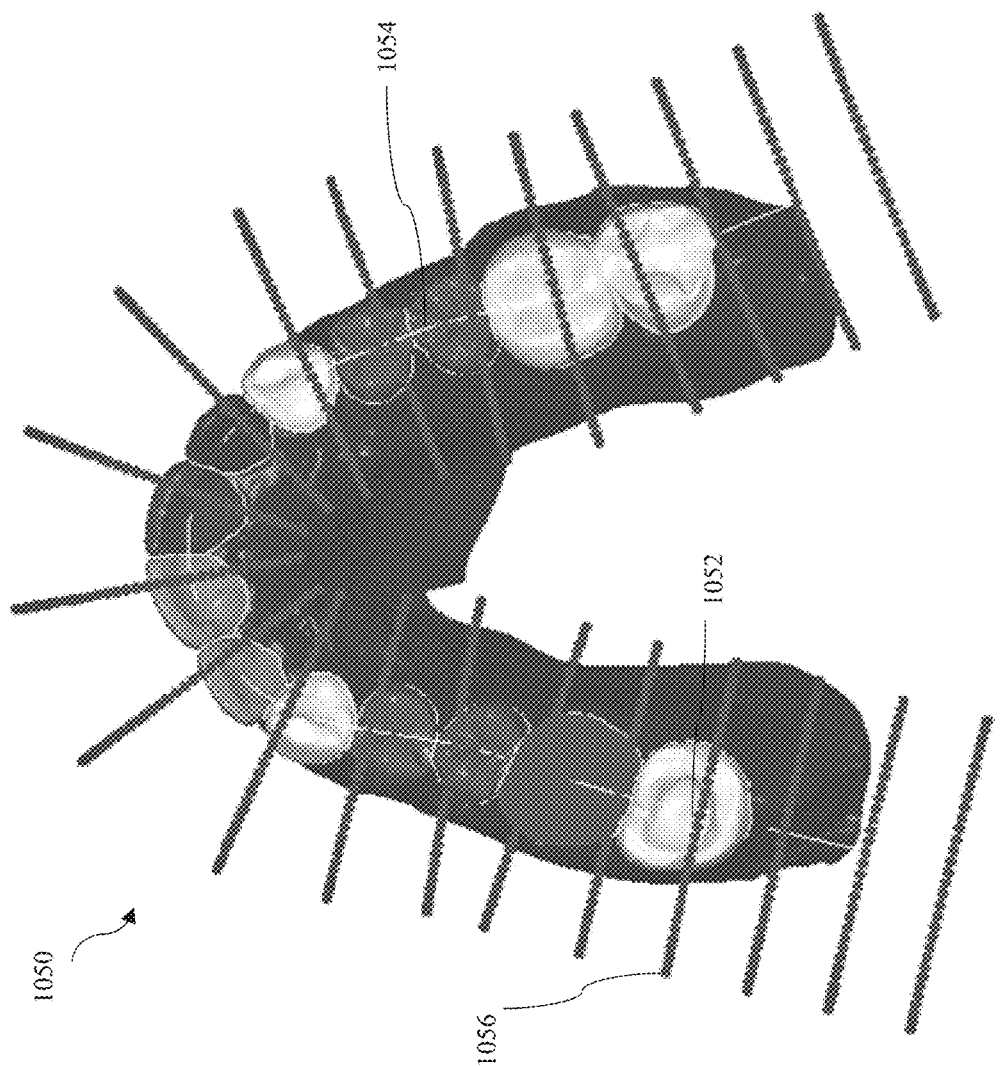
FIG. 12(b) shows an example of a digital model with additional sample points.
Figure 12C:
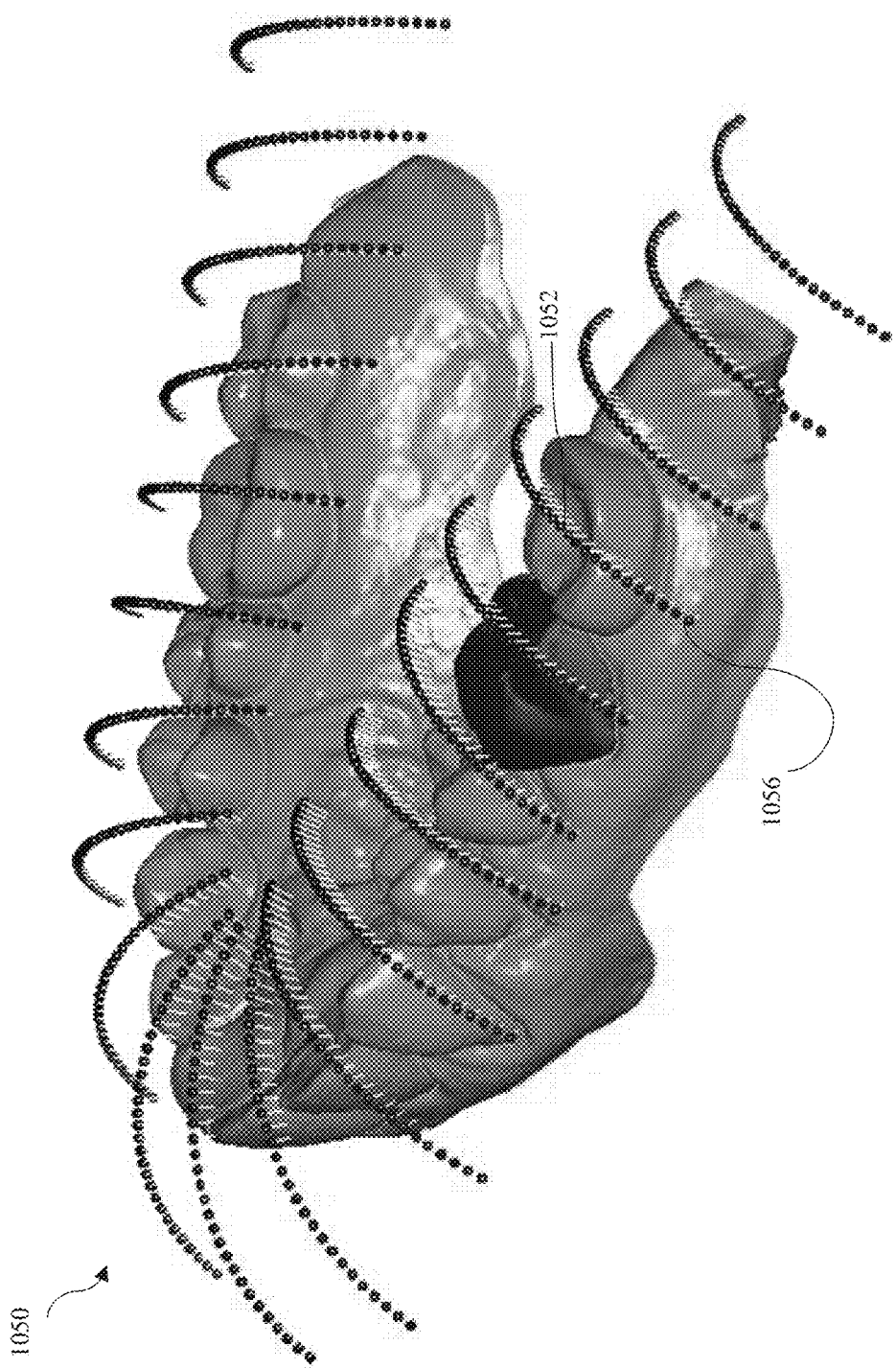
FIG. 12(c) shows an example of a digital model with multiple rays extending from a sample depth point.

For example, as illustrated in FIG. 12(a), the computer-implemented method can determine a first positive inclination angle ray 1016 at a first positive inclination angle 1018 from the sample point depth ray 1012 and a first negative inclination angle ray 1020 at a first negative inclination angle from the sample point depth ray 1012. The first positive inclination angle 1018 and the first negative inclination angle can be the inclination angle increment value since they are both the first inclination angle from which rays are extended. Second positive and negative inclination angle rays would be at an angle of plus/minus 2*(inclination angle increment) from the sample point depth ray 1012, third positive and negative inclination angle rays would be at an angle of plus/minus 3*(inclination angle increment) from the sample point depth ray 1012, etc. The computer-implemented method can determine a first digital surface point 1022 at the intersection of the first positive inclination angle ray 1016 and the digital surface of the digital model 1006 and can determine a second digital surface point 1024 at the intersection of the first negative inclination angle ray 1020 and the digital surface of the digital model 1006. The first digital surface point 1022 and the second digital surface point 1024 can be associated with the sampled digital surface point 1002. Only a single sample point and two rays are shown for illustration; many more rays at different angles are possible. In some embodiments, the number of sample points on the spline can be 2100, for example, and the number of rays can be 320, for example. For example, FIG. 12(b) illustrates a digital model 1050 with additional sample points such as sample point 1052 sampled on spline 1054. Sample point 1052 can have one or more rays such as ray 1056 extending from a depth point corresponding to the sample point 1052. FIG. 12(c) illustrates multiple rays such as ray 1056 extending from a sample depth point for the sample point 1052.

In some embodiments, a central row of a panoramic image can include the sampled digital surface points. In some embodiments, each sampled digital surface point and its associated digital surface points can be a column in the panoramic image. In some embodiments, the rows on one side of the central row can include digital surface points corresponding to positive inclination angled rays and rows on the other side of the central row can include digital surface points corresponding to negative inclination angled rays. In some embodiments, the same inclination angle increment value can be used to construct rays for all sampled digital surface points. In some embodiments, the depth of each sampled digital surface point's sample depth point is the same. In some embodiments, the central row corresponds to rays at a zero inclination angle with respect to the sample point depth ray.

Figure 13:
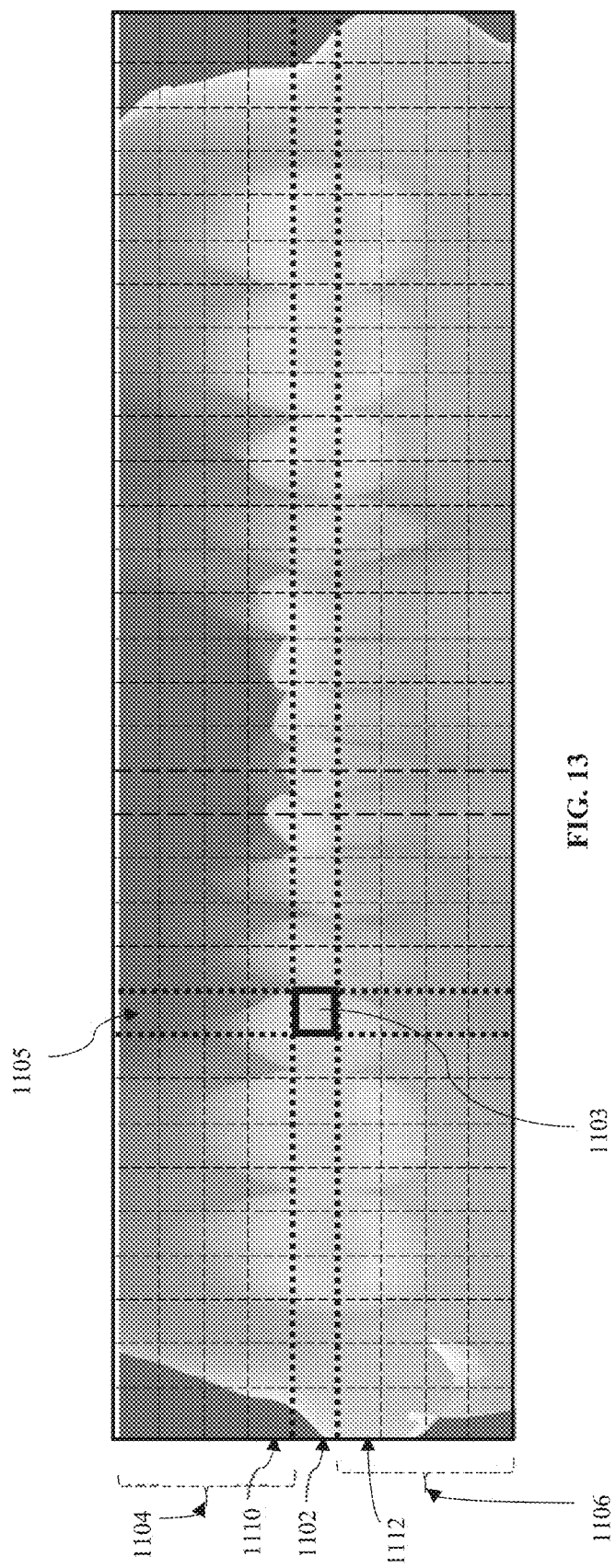
FIG. 13 shows an example of a panoramic image with illustrated rows and columns.

FIG. 13 illustrates an example of a panoramic image shown for illustration purposes only. Central row 1102 can include the sampled digital surface points, such as, for example, sampled digital surface point 1103. Digital surface points in column 1105 are digital surface points associated with the sampled digital surface point 1103. The computer-implemented method can determine the digital surface points in column 1105 from rays extending from a sample depth point of the sampled digital surface point 1103 at different multiples of the inclination angle increment. In some embodiments, for example, the digital surface points in rows 1104 can be those determined from positive inclination angle rays and the digital surface points in rows 1106 can be digital surface points determined from negative inclination angle rays. For example, first positive row 1110 can include digital surface points intersecting a first positive ray having an inclination angle=1*(inclination angle increment)

with respect to the sample point depth ray. For example, first negative row 1112 can include digital surface points intersecting a first negative ray having an inclination angle=−1*(inclination angle increment)

with respect to the sample point depth ray. In some embodiments, the inclination angle increment can be specified in a configuration file or through an input field editable by a user using a GUI, for example. The computer-implemented method can determine the number of rows from the set inclination angle-increment in some embodiments, for example.

Figure 14:
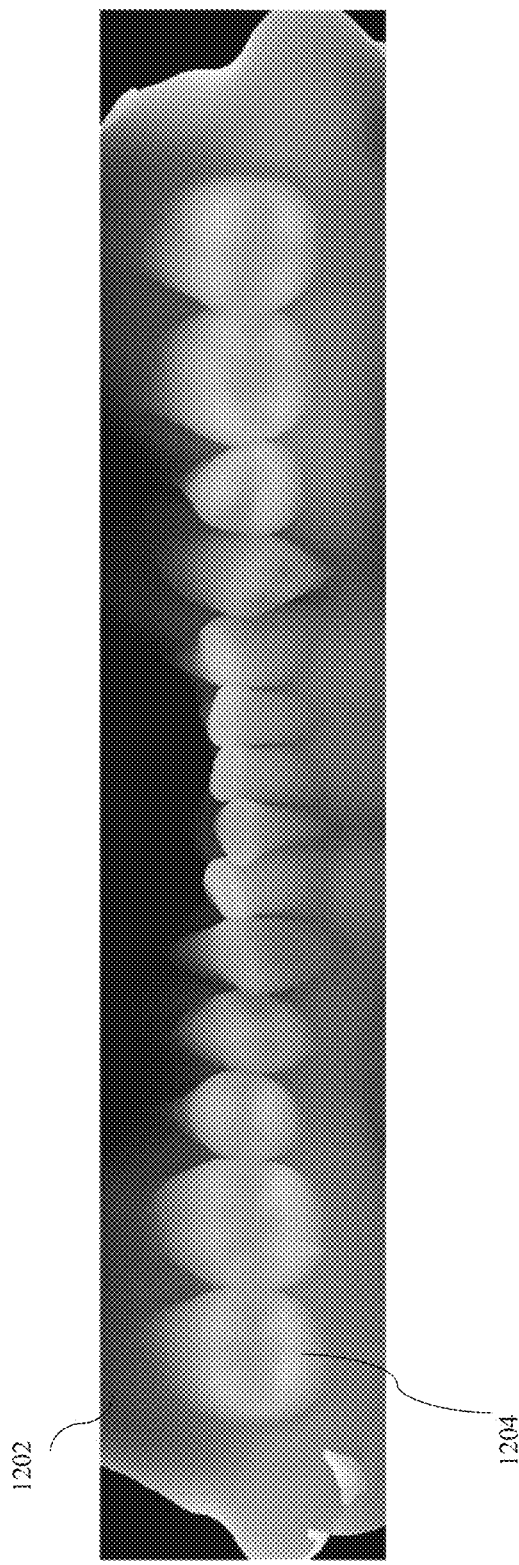
FIG. 14 shows an example of a panoramic image with depth information.

The panoramic image can contain depth information for each sampled digital surface point and its associated digital surface points. In some embodiments, the computer-implemented method can determine the depth of a digital surface point as the length of its corresponding ray from the digital surface point to the sample depth point. In some embodiments, the computer-implemented method can determine the depth of a sampled/associated digital surface point as the length of the sample point depth ray extending from the sampled/associated digital surface point to the sample depth point. In some embodiments, the computer-implemented method can store the depth of each pixel of the panoramic image. In some embodiments, the computer-implemented method can store depth information as luminance. For example, in some embodiments, lighter colored pixels representing digital surface regions closer to the camera view and darker colored pixels representing digital surface regions farther from the camera view. FIG. 14 illustrates an example of a panoramic image with depth information. For example, darker region 1202 are farther from the camera than lighter regions such as lighter region 1204. Alternatively, in some embodiments, lighter colored pixels can represent digital surface regions farther from the camera view, and darker colored pixels can represent digital surface regions closer to the camera.

It is noted that designation of positive and negative inclination angles is used to distinguish rays on one side of the sample point depth ray from rays on the other side; the designation can be switched. For example, in some embodiments, the digital surface points in rows 1104 can be those determined from negative inclination angle rays and the digital surface points in rows 1106 can be digital surface points determined from positive inclination angle rays.

At least one advantage of using a panoramic image can include, for example, improved tooth-gum boundary visibility since the rays converge toward the root of each tooth instead of being parallel like in orthographic views and divergent like in perspective views, for example. This can improve the precision of the boundaries of teeth as well as other regions, such as the gums.

Labeling

Some embodiments of the computer-implemented method can include labeling, using a trained neural network, one or more regions of an input image to provide a labeled image.

In some embodiments, the trained neural network can be any type of neural network. In some embodiments, the neural network can be a CNN as described previously, for example. In some embodiments, the neural network can be a YOLO neural network as described previously, for example. In some embodiments, the neural network can be a semantic segmentation network, for example. In some embodiments, the semantic segmentation network can be a U-Net neural network as described previously, for example. In some embodiments, the semantic segmentation can be a PAN neural network as described previously, for example.

In some embodiments, the neural network can be trained by providing a training dataset that can include one or more images of at least a portion of digital dentition that can include one or more digital teeth, with each digital tooth marked with a marked digital tooth bounding region, for example. In some embodiments, the training dataset can include one or more panoramic images with each digital tooth marked with a marked digital tooth bounding region. A neural network trained with panoramic training datasets can be a panoramic image trained neural network.

Figure 15:
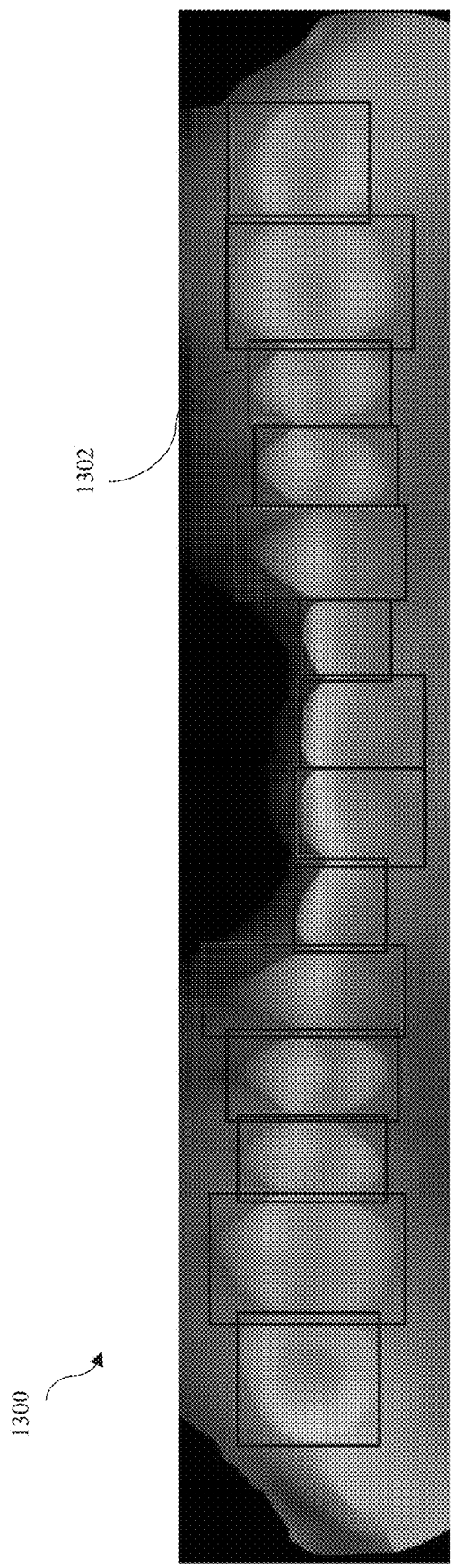
FIG. 15 shows an example of a panoramic image with a marked digital tooth bounding region.

In some embodiments, the marked digital tooth bounding region can be, for example, a rectangular shaped boundary. However, other shapes can be used as the marked digital tooth bounding region. Each digital tooth in each image in the training dataset is marked with a digital tooth bounding region. FIG. 15 illustrates an example of a panoramic image 1300 with a marked digital tooth bounding region 1302. The marked digital tooth bounding region for each digital tooth in the panoramic image can be marked manually, or by an automatic process in some embodiments. In some embodiments, the training dataset can include 10,000 images, such as panoramic images, for example. Other suitable numbers of panoramic images can be used as the training dataset in some embodiments, for example. Training of any neural network can be supervised or unsupervised.

In some embodiments, a YOLO network can be trained by providing it with marked digital tooth bounding regions that are shaped as rectangles or boxes. In some embodiments, the a semantic segmentation network such as U-Net or a PAN neural network can be trained by providing them with marked digital tooth bounding regions that are marked to follow the shape of each digital tooth in the panoramic image.

In some embodiments, the trained neural network can be panoramic image trained CNN as described previously, for example. In some embodiments, the trained neural network can be panoramic image trained YOLO neural network as described previously, for example. In some embodiments, the trained neural network can be a panoramic image trained semantic segmentation network, for example. In some embodiments, the trained semantic segmentation network can be a panoramic image trained U-Net neural network as described previously, for example. In some embodiments, the trained semantic segmentation can be a panoramic image trained PAN neural network as described previously, for example. Alternatively, in some embodiments, the trained neural network can be a 2D depth map trained neural network.

Although panoramic images are described as examples, in some embodiments, the training dataset can alternatively include one or more 2D depth maps with each digital tooth marked with a marked digital tooth bounding region. A neural network trained with 2D depth map training datasets can be a 2D depth map trained neural network, and can be trained in same way as discussed with respect to panoramic images, for example, except the training dataset includes one or more 2D depth maps, for example.

In some embodiments, the computer-implemented method can use the trained neural network to label one or more regions of the input image to provide a labeled image.

For example, in some embodiments, the computer-implemented method can receive an input image and, using one or more trained neural networks, label one or more regions of the input image to provide a labeled image. In some embodiments, the trained neural network can be a panoramic image trained neural network. In some embodiments, the computer-implemented method can receive a panoramic image and using one or more panoramic trained neural networks, label one or more regions of the panoramic image to provide the labeled panoramic image.

Alternatively, in some embodiments, the computer-implemented method can receive a 2D depth map and, using one or more 2D depth map trained neural networks, label one or more regions of the 2D depth map to provide the labeled 2D depth map.

In some embodiment, the trained neural network can receive one or more images and generate a digital tooth bounding region for each digital tooth in the image. The computer-implemented method can label all pixels bounded by a digital tooth bounding region with a unique label in some embodiments for example. For example, in some embodiments, a panoramic image trained neural network can receive one or more panoramic images and generate a digital tooth bounding region for each digital tooth automatically in the panoramic image.

Figure 16A:
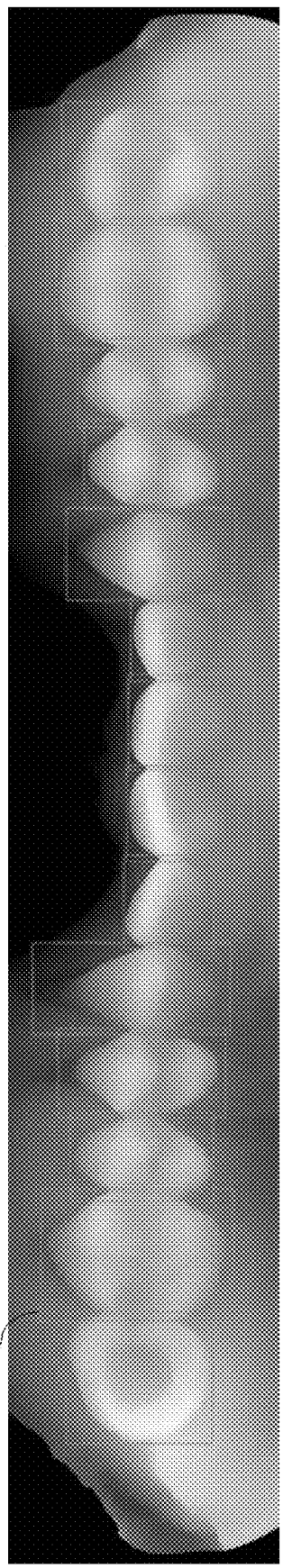
FIG. 16(a) and FIG. 16(b) show examples of panoramic images that can include one or more digital bounding regions.

For example, in some embodiments, a panoramic image trained YOLO network can receive a panoramic image and can provide a digital tooth bounding region for each digital tooth in at least a portion of the panoramic image. The computer-implemented method can label all pixels bounded by a digital tooth bounding region with a unique label in some embodiments for example. The digital tooth bounding regions provided by a panoramic image trained YOLO network can be digital tooth bounding boxes, for example. For example, the panoramic image trained YOLO network can receive the panoramic image illustrated in FIG. 14 and output a labeled panoramic image as illustrated in FIG. 16(a) that can include one or more digital bounding regions, such as a digital bounding region 1402. The computer-implemented method can label all pixels bounded by a digital tooth bounding region with a unique label in some embodiments for example to provide per pixel labeling. This can also be referred to as neural network segmenting, or rough segmenting.

Figure 16B:
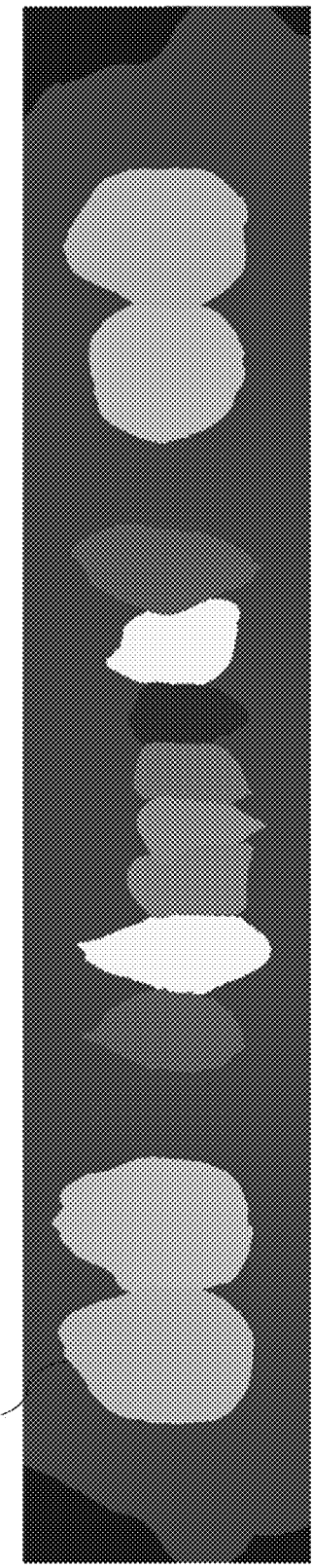

In some embodiments, a panoramic image trained semantic segmentation network such as a U-Net neural network or a PAN neural network can receive a panoramic image and can provide a digital tooth bounding region for each digital tooth in at least a portion of the panoramic image. For example, the panoramic image trained semantic segmentation network such as U-Net or PAN can receive the panoramic image illustrated in FIG. 14 and output a labeled panoramic image as illustrated in FIG. 16(b) such as a digital tooth bounding region 1404. The computer-implemented method can label all pixels bounded by a digital tooth bounding region with a unique label in some embodiments for example to provide per pixel labeling. This can also be referred to as neural network segmenting, or rough segmenting.

In some embodiments, a 2D depth map trained neural network (e.g. CNN, YOLO, semantic segmentation, or any other type of neural network) can receive a 2D depth map image and can provide a digital tooth bounding region for each digital tooth in at least a portion of the panoramic image as discussed with respect to panoramic image trained neural networks. The computer-implemented method can label all pixels bounded by a digital tooth bounding region with a unique label in some embodiments for example.

In some embodiments, the 2D label map with labels can be of the same dimension as the 2D depth map.

In some embodiments, the computer-implemented method can include mapping one or more regions of the labeled panoramic image to one or more corresponding coarse digital surface polygon labels in the 3D digital model to provide a labeled 3D digital model. In some embodiments, the computer-implemented method can pass an imaginary ray through each pixel of the 2D label map and label the digital surface polygon through which the ray travels the same label as the pixel label. In some embodiments, the computer-implemented method can pass an imaginary ray through every digital surface polygon, and label each digital surface polygon based on the label of the pixel it passes through. In some embodiments, the computer-implemented method can project all labeled regions from the 2D image to the 3D digital model mesh, including any uncertainty region. In some embodiments, the computer-implemented method can label the one or more unlabeled digital surface polygons with the same label as a closest digital surface polygon. In some embodiments, the digital surface polygon can be a digital surface triangle, for example.

In some embodiments, this mapping can include, for example, projecting the labeled panoramic image digital tooth boundary regions onto a 3D digital model. In some embodiments, the computer-implemented method can project digital tooth bounding box as a prism. Because the panoramic image was generated from the 3D digital model using rays, the computer-implemented method can use the same rays to map the digital tooth bounding box back to the 3D digital model. In some embodiments, the computer-implemented method can determine the four corners of each digital tooth bounding box. For each corner, the computer-implemented method can, in some embodiments, determine the ray passing through the corner. In some embodiments, the computer-implemented method can connect each set of rays in a plane to their corresponding depth point in some embodiments. In some embodiments, the computer-implemented method can label every digital surface falling within the constructed prism to be coarsely labeled as belonging to a single tooth, for example. In some embodiments, the computer-implemented method can label every digital surface polygon (that can be, in some embodiments, a digital surface triangle) falling within the constructed prism with the same label. In some embodiments, the computer-implemented method can label each constructed prism with a different label. In some embodiments, the computer-implemented method can label digital surface intersecting every ray within the box individually.

Figure 17:
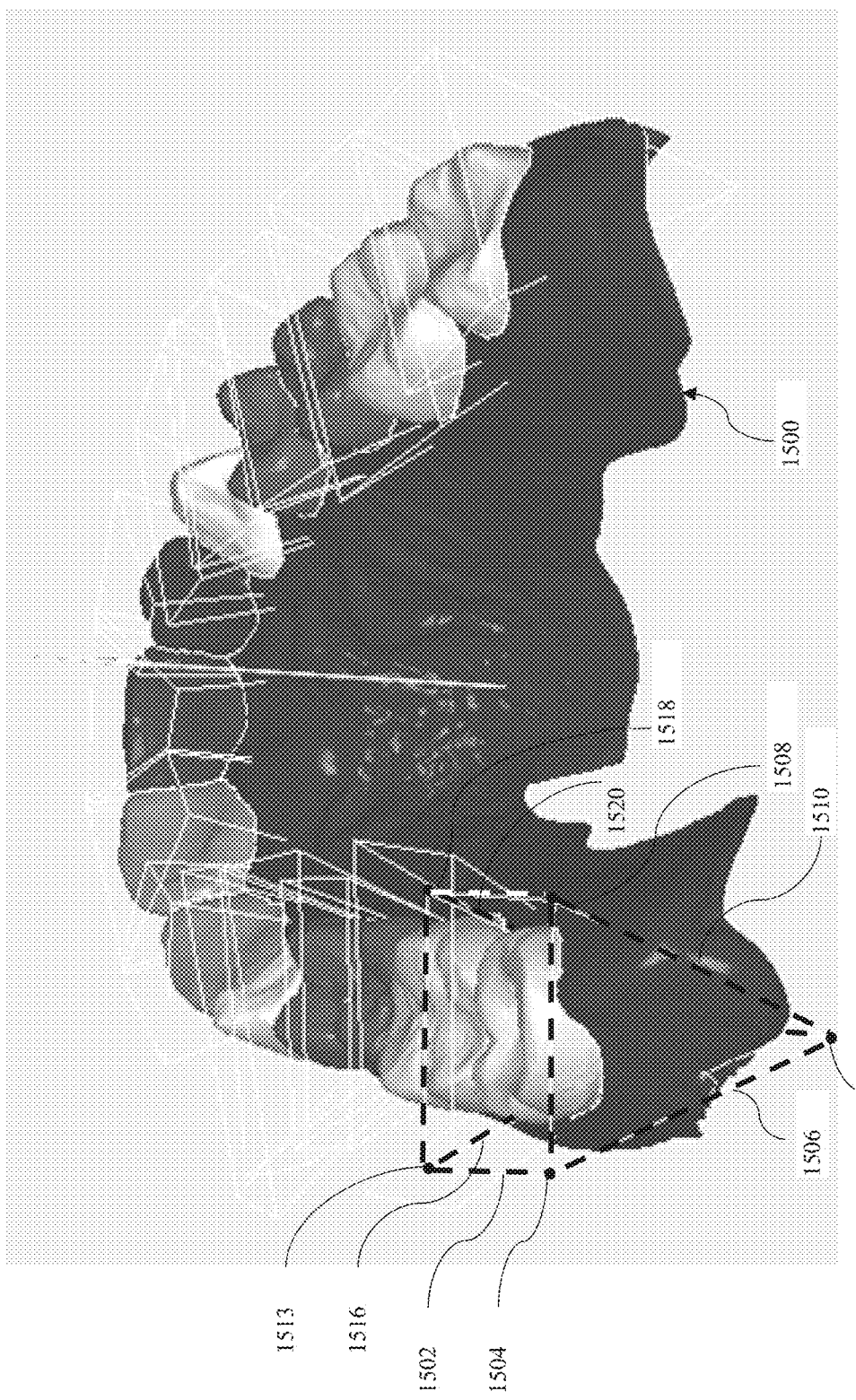
FIG. 17 shows an example in some embodiments of mapping to a 3D digital model.

FIG. 17 illustrates an example in some embodiments of mapping. As illustrated in the figure, the mapping can include, for example, projecting the labeled panoramic image digital tooth boundary regions such as digital tooth bounding box 1502 for example onto a 3D digital model, such as, for example, the 3D digital model 1500. The computer-implemented method can determine a first digital tooth bounding box corner 1504 of the digital tooth bounding box 1502. The computer-implemented method can determine a first ray 1506 as the ray extending to and/or through the first digital tooth bounding box corner 1504. Similarly, the computer-implemented method can determine a second digital tooth bounding box corner 1508. The computer-implemented method can determine a second ray 1510 as the ray extending to and/or through the second digital tooth bounding box corner 1508. By construction, the first ray 1506 and the second ray 1510 are in the same plane as described in the section of the disclosure related to generating the panoramic image. In the panoramic image, for example, the first ray 1506 and the second ray 1510 are in the same column. Accordingly, the first ray 1506 and the second ray 1510 meet at depth point 1512. The computer-implemented method can similarly determine a third digital tooth bounding box corner 1513 with corresponding third ray 1516 and fourth digital tooth bounding box corner 1518 with corresponding fourth ray 1520. The third ray 1516 and the fourth ray 1520 are by construction in the same plane, and therefore meet at their own corresponding depth point. In some embodiments, the computer-implemented method can label every digital surface point falling within the prism with the same label, for example. In some embodiments, the computer-implemented method can label every ray within the digital tooth bounding box individually. In some embodiments, the computer-implemented method can label rays via an inner part of the box.

In some embodiments, the computer-implemented method can determine one or more uncertainty regions. Uncertainty regions can arise where the neural network does not provide enough information to label one or more regions, or where the neural network generates unreliable information. This can occur, for example, at the edges of the digital tooth bounding regions. In some embodiments, the computer-implemented method can, for a panoramic image or a 2D depth map, for example, determine all digital surface points within a user-configurable uncertainty region buffer distance from any boundary of surface points within a digital tooth bounding region as part of one or more uncertainty regions. In the case of a YOLO network, for example, the digital tooth bounding region can be a digital tooth bounding box. The distance is along the digital surface in some embodiments. In some embodiments, the uncertainty region buffer distance can be 6 mm, for example. Other suitable distances can be used, and the uncertainty region buffer distance can be a user configurable value that can be, for example, stored and loaded from a configuration file or input by a user using an input device into a Graphical User Interface ("GUI") in some embodiments, for example.

Figure 18A:
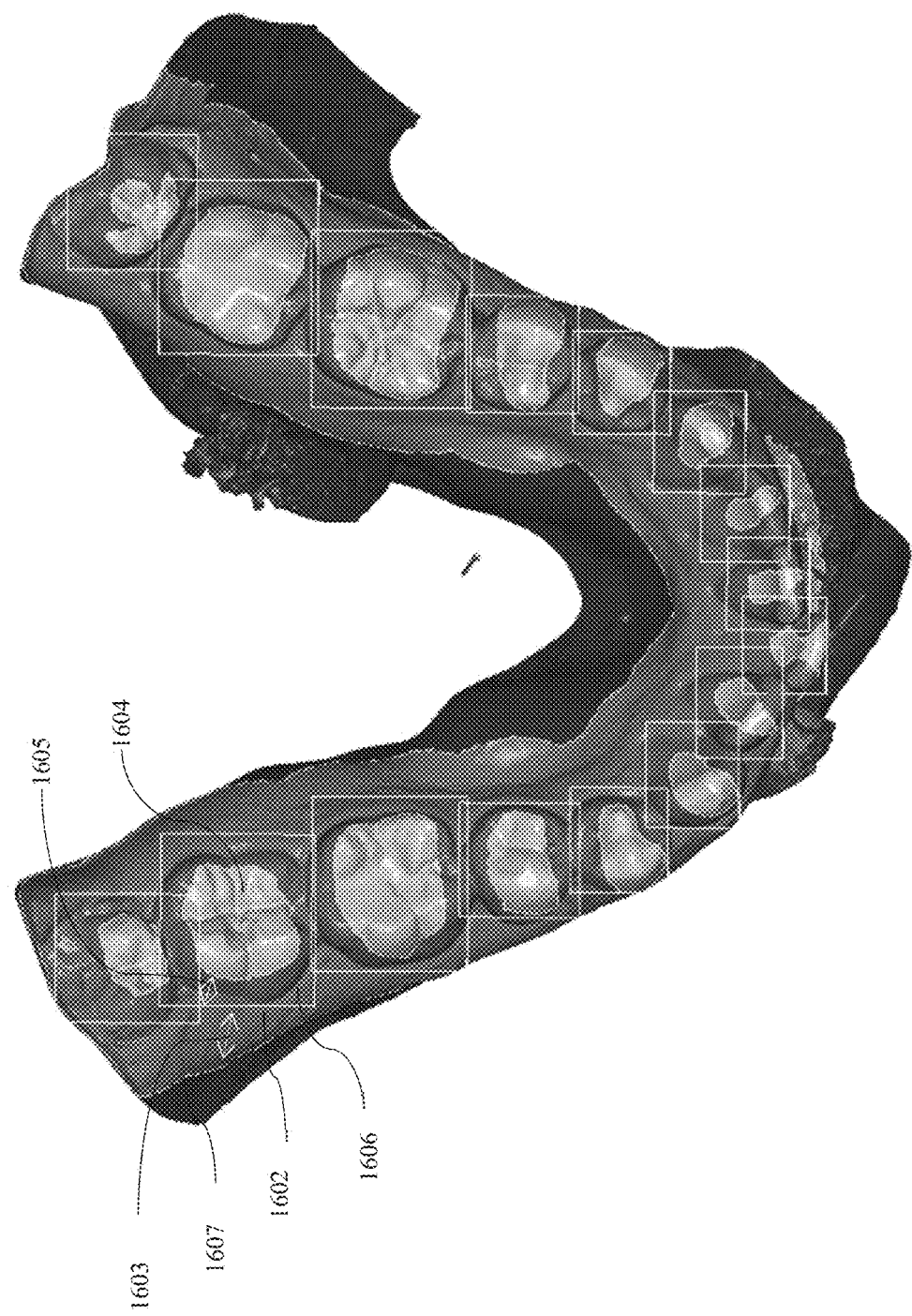
FIG. 18(a) and FIG. 18(b) show examples of identifying uncertainty regions.
Figure 18B:
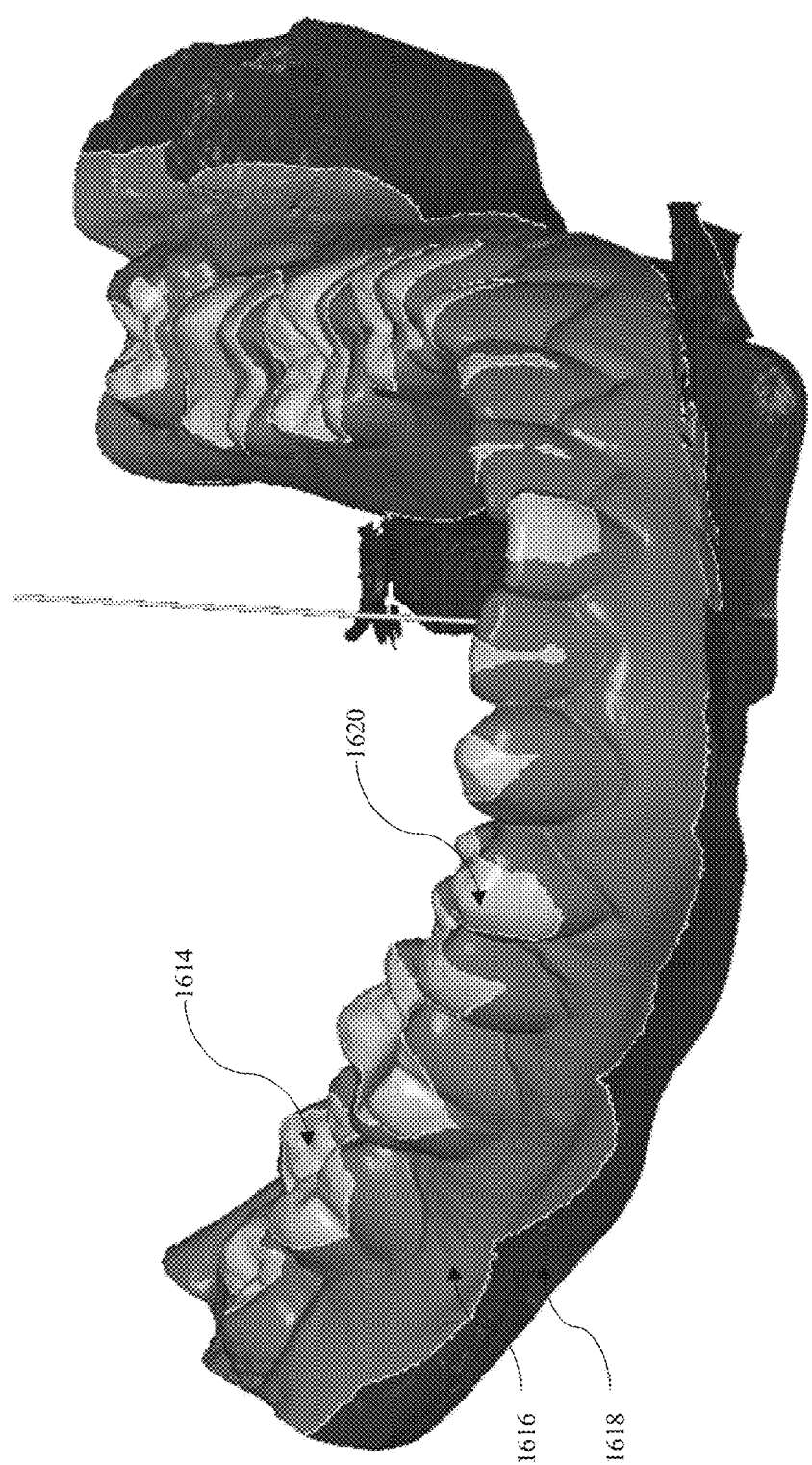

Uncertainty regions can also arise, for example, for all digital surface polygons (digital surface triangles, for example) that are not visible on an image that is given to the neural network. As discussed previously, the computer-implemented method can, in some embodiments, account for uncertainty regions. For example, in some embodiments, the computer-implemented method can leave uncertainty regions unlabeled, or label them to be uncertain regions. FIG. 18(a) illustrates an example of the computer-implemented method identifying uncertainty regions. In the figure, the trained neural network can determine digital tooth boundary regions such as digital tooth boundary region 1602. The computer-implemented method can label a certainty region within the digital tooth boundary region 1602, such as certainty region 1604, where the polygons are all visible, for example. The computer-implemented method can determine an uncertainty region, such as uncertainty region 1606 based on a distance 1605 and an uncertainty region 1607 based on a distance 1603 and indicate the regions as uncertain, by, for exampling, leaving the uncertainty region as unlabeled, or labeling it as uncertain. 16(b) illustrates mapping the 2D image to a labeled 3D digital model. In the labeled 3D digital model, the computer-implemented method can determine a first labeled digital surface region 1614, an unlabeled (or labeled as uncertain)

region 1616, and a second labeled digital surface region 1618. Additional labeled regions can also be present, such as a third labeled digital surface region 1620, etc. for example. The uncertainty regions can be converted into labeled regions during segmentation, in some embodiments. For example, the computer-implemented method can label the uncertainty regions during geometric segmentation in some embodiments.

In some embodiments, the computer-implemented method can segment the labeled 3D digital model to provide a segmented 3D digital model. In some embodiments, the computer-implemented method can segment 3D digital model after the neural network generates a labeled panoramic image/2D label map from the panoramic image/2D depth map. In some embodiments, the computer-implemented method can use any type of segmentation technique known in the art to generate the segmented 3D digital model from the labeled 3D digital model. In some embodiments, the computer-implemented method can perform, for example, curvature-based segmentation.

In some embodiments, the computer-implemented method can apply a morphological erode operation to one or more labeled regions. The one or more labeled regions can include a labeled gum region in some embodiments. In some embodiments, the computer-implemented method can perform morphological erode operation on either the 2D label map or the labeled 3D digital model. In some embodiments, the computer-implemented method can perform the morphological erode operation on the 2D label map as follows: for a pixel of the 2D label map, evaluate one or more nearby pixels within a user-configurable radius (for example 5 pixels); if the one or more nearby pixels do not have the same label, then the computer-implemented can assign a particular pixel and its surrounding pixels as unlabeled. In some embodiments, the computer-implemented method can repeat this process for one or more pixels of the 2D label map. In some embodiments, the computer-implemented method can perform the morphological erode operation on the labeled 3D digital model as follows: for a particular polygon (such as a digital triangle, for example) of the labeled 3D digital model, evaluate one or more nearby polygons (such as digital triangles, for example) within a user-configurable radius (for example 5 mm) of the particular polygon (digital triangle, for example); if the one or more nearby polygons do not have the same label, then the computer-implemented can assign a particular polygon and its surrounding polygons as unlabeled. In some embodiments, the computer-implemented method can repeat this process for one or more polygons of the labeled 3D digital model. In some embodiments, the computer-implemented method can apply the morphological erode operation to every labeled region, including a gum region.

In some embodiments, one or more unlabeled digital surface polygons can remain. The one or more unlabeled digital surface polygons can be caused where a total number of digital surface polygons is more than the number of pixels. The one or more unlabeled digital surface polygons can be caused by one or more occluded digital surface polygons whose label could not be determined. The one or more unlabeled digital surface polygons can be caused by morphological erosion.

Curvature-Based Segmentation

In some embodiments, curvature-based segmentation can include curvature determination of digital surface regions in the digital model. In some embodiments, the computer-implemented method can receive a digital model and determine curvatures of digital surface regions. The computer-implemented method can determine curvature of digital surface regions using any technique. In some embodiments, curvature determination can be performed by the computer-implemented method automatically.

In some embodiments, the digital surface regions include triangles. The curvature of a triangle can be determined by taking an average of the curvature of the triangle's edges, or an average of the curvature of the triangle's vertices.

Figure 19:
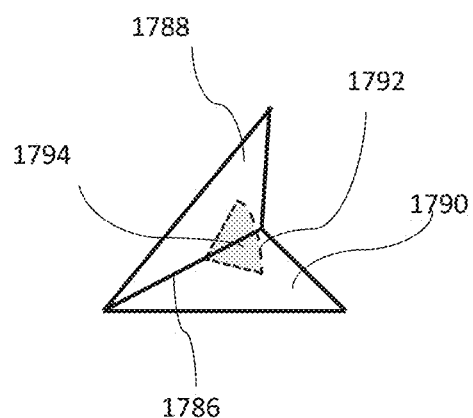
FIG. 19 shows one example of determining curvature at an edge connecting two triangles.

In some embodiments, the computer-implemented method can determine the curvature of the triangle by taking an average of the curvature of its edges. FIG. 19 illustrates one example of determining curvature at an edge 1786 connecting two triangles 1788 and 1790. In some embodiments, the computer-implemented method can determine the curvature at edge 1786 based on a dihedral angle 1792 formed at the edge 1786 between a particular triangle 1790 and its adjacent neighborhood triangle 1788 in the digital surface mesh as illustrated. The dihedral angle 1792 can be determined by the computer-implemented method as an angle formed between the two adjacent triangles 1788 and 1790 in a third plane 1794 that is perpendicular to the edge 1786 formed by the two adjacent triangles 1790 and 1788. For example, in some embodiments, the computer-implemented method can take the sin ($\varphi$), where $\varphi$ is a dihedral angle 1792 between two adjacent triangles 1790 and 1788. The computer-implemented method can repeat this curvature function at all triangle edges.

Alternatively, in some embodiments, the computer-implemented method can determine the curvature of the triangle by taking an average of the curvature of the triangle's vertices. For example, in some embodiments, the computer-implemented method can determine curvature at each vertex P by selecting a neighborhood of vertices (size N) around P, optionally using connection information to decrease the search space. The computer implemented method can fit a quadric patch $F(x,y,z)=0$ onto the neighborhood of points. The computer implemented method can determine a projection $P_0$ of P onto the patch, such that $F(P_0)=0$. The computer-implemented method can determine the curvature properties of F at $P_0$ and assign the curvature properties to P.

In some embodiments, the computer-implemented method can, for example, use quadric form $ax^2+by^2+cz^2+2exy+2fyz+2gzx+2lx+2my+2nz+d=0$ since each datum (x,y,z) will not lie perfectly on the surface of F. The computer-implemented method can determine the coefficients of the patch surface (a, b, c, e, f, g, l, m, n, d), from a 10×10 real symmetric eigenproblem of the form $A=D^TD$, where $D_i$ is the N×10 design matrix, each row of which is built up by $[x_i^2\ y_i^2\ z_i^2\ x_iy_i\ y_iz_i\ x_iz_i\ x_i\ y_i\ z_i\ 1]$, where i=1, ..., N. The matrix can have 10 real eigenvalues and 10 corresponding eigenvectors. The coefficients of the eigenvector corresponding to the smallest eigenvalue $\lambda_1$ are the coefficients a, b, c, e, f, g, l, m, n, d of the quadric surface that best approximates the point cloud locally around P. The computer-implemented method uses a, b, c, e, f, g, l, m, n to determine values E, F, G, L, M, N by letting $F(x,y,z)=ax^2+by^2cz^2+exy+fyz+gxz+lx+my+nz+d=0$, an implicit quadric surface in $R^3$, so that first order partial derivatives are $F_x=2ax+ey+gz+l$, $F_y=2by+ex+fz+m$, and $F_z=2cz+fy+gx+n$. The coefficients E, F, G are determined as $E=1+F_x^2/F_z^2$, $F=F_xF_y/F_z^2$, and $G=1+F_y^2/F_z^2$. Since second order partial derivatives are $F_{xx}=2a$, $F_{yy}=2b$, $F_{zz}=2c$, $F_{xy}=F_{yx}=e$, $F_{yz}=F_{zy}=f$, and $F_{xz}=F_{zx}=g$ and the magnitude of the gradient is $|\nabla F|=\sqrt{F_x^2+F_y^2+F_z^2}$, then coefficients L, M, N of the Second Fundamental Form are:

$$L = \frac{1}{F_z^2|\nabla F|}\begin{vmatrix} F_{xx} & F_{xz} & F_x \\ F_{zx} & F_{zz} & F_z \\ F_x & F_z & 0 \end{vmatrix}, M = \frac{1}{F_z^2|\nabla F|}\begin{vmatrix} F_{xy} & F_{yz} & F_y \\ F_{zx} & F_{zz} & F_z \\ F_x & F_z & 0 \end{vmatrix},$$

$$N = \frac{1}{F_z^2|\nabla F|}\begin{vmatrix} F_{yy} & F_{yz} & F_y \\ F_{zy} & F_{zz} & F_z \\ F_y & F_z & 0 \end{vmatrix}$$

The computer-implemented method then determines matrices A and B from E, F, G, L, M, N as:

$$A = \begin{bmatrix} L & M \\ M & N \end{bmatrix} \text{ and } B = \begin{bmatrix} E & F \\ F & G \end{bmatrix}$$

and determines principle curvatures $k_1$ and $k_2$ as the eigenvalues of the matrix $B^{-1}*A$.

The computer-implemented method can apply a selected scalar function to the principal curvatures $k_1$ and $k_2$ to determine the selected curvature function ("SCF"). For example, for principle curvatures $k_1$ and $k_2$, the computer-implemented method can determine Gaussian curvature (K) as $K=k_1k_2$ or mean curvature (H) as $H=1/2(k_1+k_2)$.

The radius of either method of determining curvature can be up to and including 60 digital vertices on average in the neighborhood of the vertex being evaluated and can be a user selectable value. A selection of a smaller number of points and smaller radius can lead to faster computations, while selecting a larger number of points and larger radius can provide a more precise curvature estimation. The computer-implemented method can be repeated for all vertices of the digital surface mesh, for example.

In some embodiments, the computer-implemented method can segment the entire digital dental impression surface into one or more digital segments. In some embodiments, the computer-implemented method can segment the digital dental impression surface in three dimensions (3D) using curvaturebased segmentation. This can include, for example, watershed segmentation. Segmentation can be performed by the computer-implemented method automatically in some embodiments.

In some embodiments, the digital dental impression surface can include one or more triangles that connect at edges and vertices to form the digital surface mesh. In some embodiments, the computer-implemented method determines the curvature of every triangle in the digital surface mesh. The computer-implemented method can determine the curvature of each particular triangle by either determining the average curvature of the particular triangle's vertices or the average curvature of the particular triangle's edges as described previously.

Figure 20A:
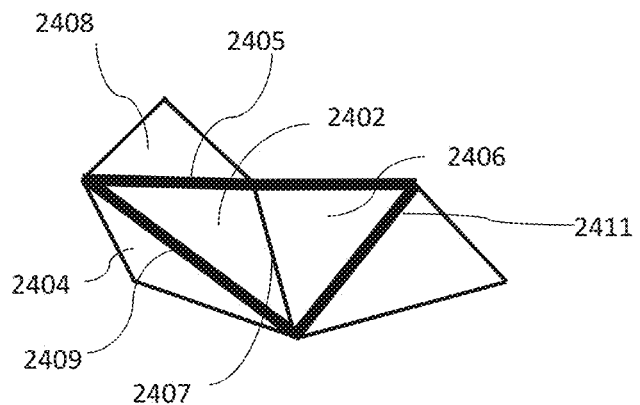
FIG. 20(a) shows an example in some embodiments of determining an average of the edge curvatures.

In one embodiment, the computer-implemented method can determine the curvature of a particular triangle by determining a curvature at each of the edge of the particular triangle and calculating an average of the edge curvatures as discussed earlier of the present disclosure. FIG. 20(a) illustrates an example in some embodiments of determining an average of the edge curvatures in which a particular triangle 2402 includes a first edge 2405, a second edge 2407, and a third edge at 2409. The computer-implemented method can determine the curvature at the first edge 2405 based on the dihedral angle between the particular triangle 2402 and adjacent triangle 2408. The computer-implemented method can determine the curvature at the second edge 2407 based on the dihedral angle as described in this disclosure between the particular triangle 2402 and adjacent triangle 2406. The computer-implemented method can determine the curvature at the third edge 2409 based on the dihedral angle between the particular triangle 2402 and adjacent triangle 2404. The computer-implemented method can then determine the average of the curvatures of the first edge 2405, the second edge 2407, and the third edge at 2409 to determine the curvature of the particular triangle 2402. The computer-implemented method can in some embodiments store the curvature of the particular triangle 2402 in a look-up table, for example. The computer-implemented method can repeat this process with every triangle in the digital surface mesh and determine the curvature at each triangle in the digital surface mesh.

In some embodiments, the computer-implemented method can assign a user-selectable positive or negative sign to each triangle's curvature. For example, if the curvature is set to the most convex edges, then any concave regions are assigned a negative sign, and any convex regions are assigned a positive sign. If the curvature is set to the most concave edges, then any convex regions are assigned a negative sign, and any concave regions are assigned positive signs. The concavity/convexity can be defined with respect to a digital surface normal. For surface normal directed outside of the digital surface, the computer-implemented method can assign a positive value to convex edges and a negative value to concave edges, for example. For normals directed inside of the digital surface, the computer-implemented method can assign positive values to convex edges and negative values to concave edges, for example. In some embodiments, segment boundaries correspond to maximum curvatures along the digital surface.

After determining each particular triangle's curvature, the computer-implemented method can segment triangles based on 3D curvature-based segmentation. In some embodiments, watershed segmentation is used. For example, in some embodiments, the computer-implemented method determines the curvature for each triangle. The curvature of each triangle can, in some embodiments, be stored in a lookup table. The computer implemented-method can start with a triangle with a minimum curvature as a particular triangle being evaluated. The computer-implemented method can look up the curvatures of triangles in the neighborhood of the particular triangle being evaluated from the look up table, for example. In some embodiments, the computer-implemented method can determine neighboring triangle curvatures from the look-up table. Any neighboring triangles with curvatures greater than the particular triangle being evaluated can be added to a segment to which the particular triangle being evaluated belongs. Any neighboring triangles with curvatures less than the curvature of the particular triangle are not added to the particular triangle's segment. The computer-implemented method then selects a neighborhood triangle as the next particular triangle to be evaluated and repeats the process for every triangle. In some embodiments, if a segment contains a large enough number (for example a majority or any other user configurable value) of triangles attributed to a label, then the computer-implemented method can assign the segment to that label.

Figure 20B:
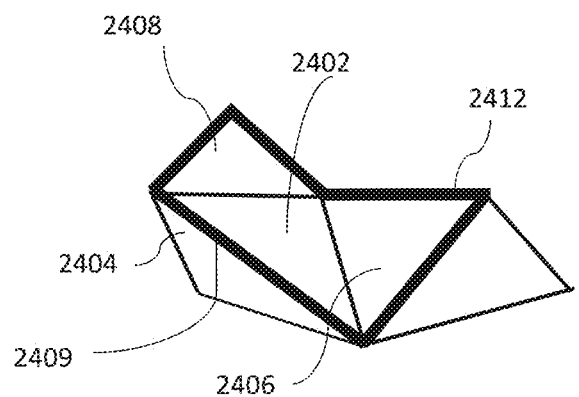
FIG. 20(b) shows an example in some embodiments of a segment after merging a triangle.
Figure 20C:
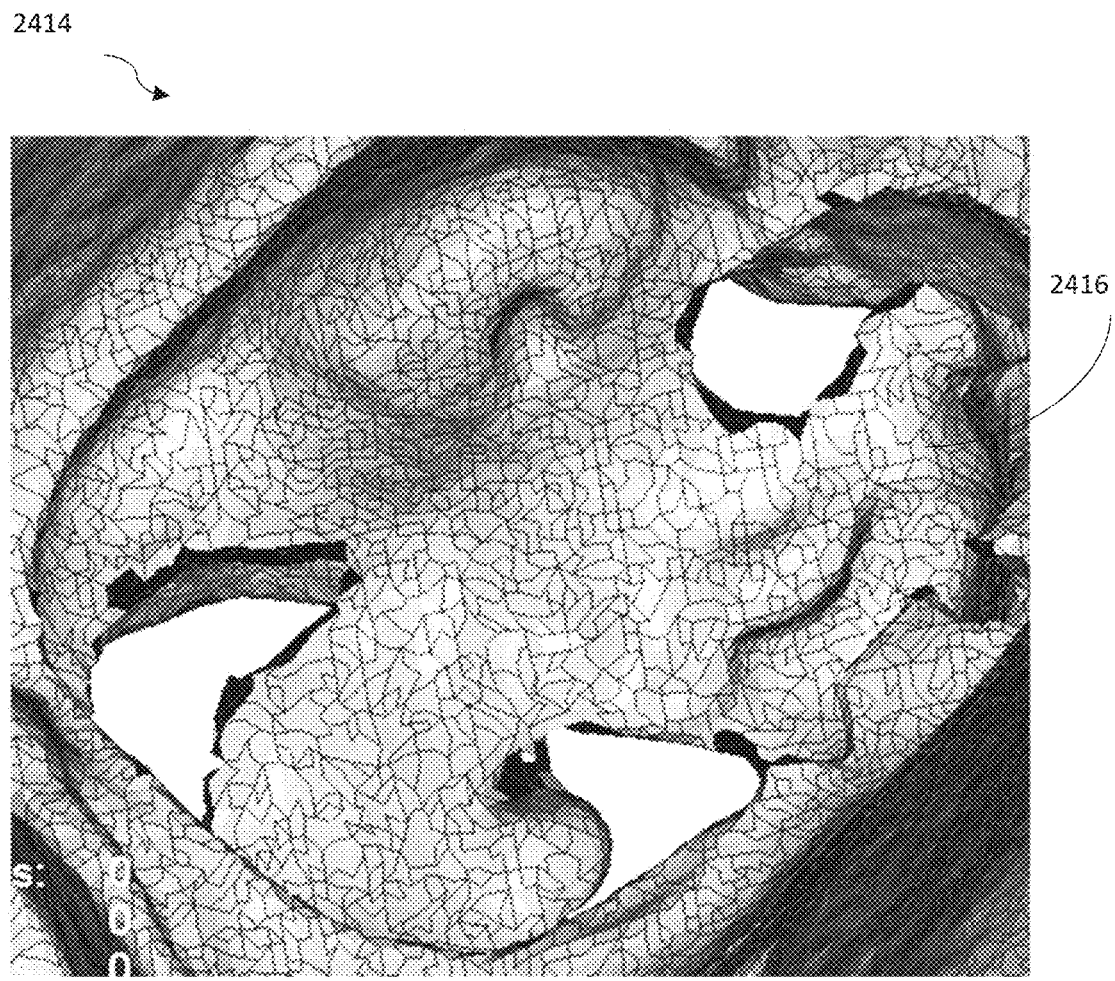
FIG. 20(c) illustrates one example of a segmented digital surface.

FIG. 20(a) illustrates an example in some embodiments of watershed segmentation of triangles. As discussed herein, the computer-implemented method determines the curvature of all of the triangles in the digital surface mesh. In one embodiment, the computer-implemented method stores the curvatures of the triangles in a lookup table. The computer-implemented method identifies the triangle with the minimum curvature, for example, particular triangle 2402. In some embodiments, the computer-implemented method can determine the triangle with the minimum curvature using the look up table. The computer-implemented method determines the curvatures of neighboring triangles 2404, 2408 and 2406. In some embodiments, the computer-implemented method can determine the curvatures of neighboring triangles from the lookup table. In the example, if the neighboring triangle 2406 has a greater curvature compared to the curvature of triangle 2402, then the neighboring triangle 2406 can be considered as part of the same watershed as the particular triangle 2402. The computer-implemented method combines the digital surface triangle 2402 with triangle 2406 into a single segment such as segment 2411 as illustrated in FIG. 20(*a*).

The computer-implemented method next can compare the curvature of neighboring triangle 2404 with the curvature of the particular triangle 2402, for example. If, for example, the curvature of neighboring triangle 2408 is greater than the minimum curvature (i.e. the curvature of 2402), then the triangle 2408 is merged with the segment 2411 containing triangle 2402. As illustrated in FIG. 20(*b*), segment 2412 is formed after merging triangle 2408.

If a neighborhood triangle has a lower curvature than the particular triangle 2402 in question, then the neighborhood triangle is not merged with the segment containing the particular triangle 2402 by the computer-implemented method. For example, if neighboring triangle 2404 has a lower curvature than the triangle 2402, then 2404 is not merged with the segment 2412 to which particular triangle 2402 belongs.

After processing a first particular triangle, the computer-implemented method changes to a new particular triangle which can be a neighboring triangle of the first particular triangle. The computer-implemented method can repeat determining segmentation with the new particular triangle being evaluated and segment the entire digital surface. FIG. 20(*c*) illustrates one example of a segmented digital surface mesh 2414 that includes segment 2416 for example.

Figure 21:
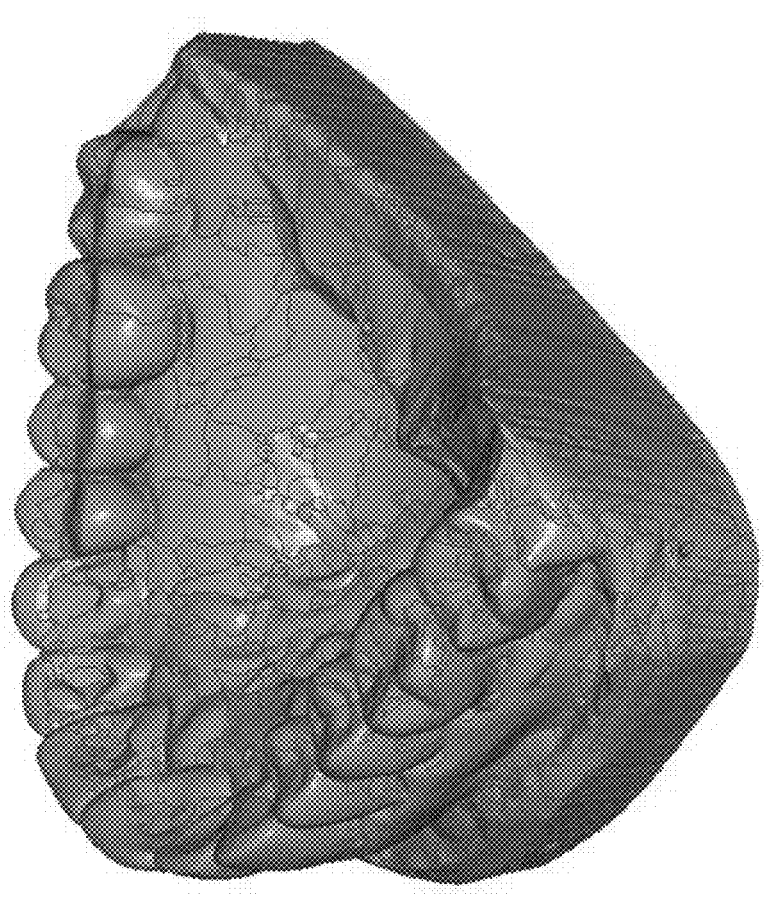
FIG. 21 shows an example in some embodiments of a digital surface mesh containing a large number of segments in some embodiments.

After performing segmentation of triangles, the digital surface mesh can contain a large number of segments as illustrated in FIG. 21. In some embodiments, the number of segments can optionally be reduced by the computer-implemented method by merging two or more segments together. In some embodiments, the computer-implemented method can merge small segments into larger ones based on geometric attributes such as their average curvature, average size, area, perimeter, perimeter to area ratio, and/or other geometric factors. In some embodiments, the computer-implemented method does not merge two segments attributed to distinct labels except for an uncertainty region. In some embodiments, the computer-implemented method can, after each merge, attribute the merged segment to the same label as one of its parts. In some embodiments, the computer-implemented method can label the merged segment as an uncertainty region only if both segments before the merge were uncertainty regions. Merging can be performed automatically by the computer-implemented method in some embodiments.

In some embodiments, the computer-implemented method determines a merge-priority for every two neighboring segments. The computer-implemented method can determine merge-priority of two neighboring segments based on their attributes. If two segments can merge based on their attributes, then in some embodiments the computer-implemented method determines priority based on geometric factors. For example, the computer-implemented method can determine priority based on 1) average curvature inside each segment and on their common boundary (the segments with small difference between the curvature on the boundary and inside the segments merge earlier) and 2) the ratio of the length of the common boundary to the minimal perimeter of the two segments (the segments with larger ratio merge earlier).

In some embodiments, the computer-implemented method can store priorities in a priority-queue. The computer-implemented method can extract the highest priority from the queue, merge the corresponding two segments, and update the priorities between newly formed segments and their neighbors in the queue. The computer-implemented method can repeat this process until no two segments can be merged any more.

In some embodiments, the smaller segments can be merged until there are no segments attributed to the uncertainty region, for example.

In some embodiments, the computer-implemented method can provide a segmented 3D digital model from the labeled 3D digital model, after performing curvature-based segmentation on the labeled 3D digital model.

Two Point Segmentation

In some embodiments, the computer-implemented method can perform two point segmentation. For example, in some embodiments, the computer-implemented method can receive a labeled 3D digital model and perform two point segmentation to provide a segmented 3D digital model. In some embodiments, the labeled 3D digital model is the result of labeling performed by one or more neural networks as described previously. The labels on the labeled 3D digital model can define localized tooth regions. These can help provide rough boundaries of each digital tooth in the labeled 3D digital model. One or more examples of two-point segmentation in some embodiments can be found in SEMI-AUTOMATIC TOOTH SEGMENTATION, U.S. patent application Ser. No. 16/778,406 of Nikolskiy et al., the entirety of which is hereby incorporated by reference.

In some embodiments, the computer-implemented method can receive a labeled 3D digital model of a patient's dentition, determine a center point of one or more labeled regions, construct a best-fit parabola to connect the center points of the one or more labeled regions, construct a plane at each center point such that the plane contains the center point and is orthogonal to the best-fit parabola at the center point, determine, for each plane determine a lingual point and a buccal point where the plane intersects a segment boundary, and construct a first and second path on either side of the plane to connect the lingual point and the buccal point. In some embodiments, the computer-implemented method can, instead of constructing a plane at each center point, use or reuse the sample plane corresponding to each center point (such as sample plane 1008 from FIG. 12(*a*), for example).

FIGS. 20(*a*) through 20(*g*) illustrate an example of two point segmentation. As illustrated in FIG. 22(*a*), the computer-implemented method can receive a labeled 3D digital model 2000 containing one or more labeled regions 2002, for example. The computer-implemented method can determine a center point such as center point 2004 for each labeled region, such as labeled region 2002 when viewed from the occlusion direction 2012. This can provide center points as illustrated in FIG. 22(*b*). The computer implemented method can join the one or more center points by the best fit smooth curve such as a best fit analytical curve such as, for example, a parabola. As illustrated in FIG. 22(*c*), the computer-implemented method can construct a best-fit parabola such as parabola 2010 connecting the center points of the one or more labeled regions when viewed from the occlusion direction 2012. To determine the best fit parabola, the computer-implemented method determines the least-squares plane. For example, in the case of center points, the computer-implemented method projects the center points onto a plane. For example, as illustrated in FIG. 22(*d*), center points 8502 (illustrated as black dots in the figure) are arranged in the least-squares plane. The computer-implemented method generates a first x-axis 8504 in a first direction in the plane and determines a first y-axis 8506 ninety degrees to the x-axis in the plane. The computer implemented method determines coefficients a, b, and c in the formula $y=ax^2+bx+c$ using the Quadratic Least Square Regression known in the art. For example, parabola 8508 can be determined by the computer-implemented method after determining coefficients a, b, and c. The computer-implemented method then determines the discrepancy between the parabola 8508 and the center points 8502, for example. The computer-implemented method repeats the steps for a user-selectable number of x-axis directions. For example, the computer-implemented method can rotate the x-axis 8504 by an x-axis rotation to a new x-axis 8510 with corresponding y-axis 8512 to determine parabola 8514. In some embodiments, the number of x-axis directions can be a user-selectable and/or pre-defined value. In some embodiments, the number of x-axis directions can be 100, for example. The computer-implemented method can select the parabola with the smallest discrepancy where a is not more than 150 meter $^{-1}$, for example, to avoid very sharp parabolas. In some embodiments, the computer-implemented method optionally eliminates center points located farther than a user-selectable and/or pre-defined maximum center point distance, which can be any value. In some embodiments, the maximum center point distance can be, for example, 5 mm. As illustrated in FIG. 22(*c*), the computer-implemented method can join center points by the best fit parabola 2010.

As illustrated in FIG. 22(*e*), the computer-implemented method can construct a plane such as separation region 2020 at each center point such as center point 2004 such that the separation region 2020 contains the center point 2004 and is orthogonal to the best fit parabola 2010 at the center point 2004. In some embodiments, the computer-implemented method can, instead of constructing a plane, use or reuse the sample plane corresponding to each center point such as sample plane 1008 from FIG. 12(*a*), for example.

As illustrated in FIG. 22(*f*), for example, the computer-implemented method can, for each plane such as plane 2030 determine a lingual point 2032 and a buccal point 2034 where the plane 2030 intersects a first segment path 2036 and the second segment path 2072. FIG. 22(*g*) illustrates a digital tooth 2050 having a center point 2051 through which a parabola 2059 traverses. the computer-implemented method constructing a first path 2053 on a first side of a separation region 2057 and a second path 2056 on a second side of the separation region 2057 to connect the lingual point 2052 and the buccal point 2062.

In some embodiments, the first segment path 2053 and second segment path 2056 can be determined using Dijkstra's shortest path algorithm known in the art, using either the facial point 2062 or the lingual point 2052 as the initial digital surface point, for example. In some embodiments, the computer-implemented method can determine the first segment path 2053 using the shortest path algorithm by evaluating only edges between digital surface points on the first side 2054 of the separation region 2057 for example. In some embodiments, the computer-implemented method can determine the second segment path 2056 using the shortest path algorithm by evaluating only edges between digital surface points on the second side 2058 as digital surface points, for example. In some embodiments, the computer-implemented method can perform the following, for example:

1. Set an initial digital surface point. In some embodiments, the initial digital surface point can be the facial point 2062. Alternatively, in some embodiments, the initial digital surface point can be the lingual point 2052.

2. Mark all digital surface points on one side of the separation region 2057 as unvisited. Generate an unvisited set of all unvisited digital surface points. In some embodiments, the one side can be the first side 2054. Alternatively, in some embodiments, the one side can be the second side 2058.

3. Assign every digital surface point on the one side a tentative distance value. The tentative distance value for the initial digital surface point is assigned to zero and the tentative distance value for all other digital surface points on the one side is assigned to infinity or the highest possible value or larger than the sum of all edge lengths, for example. Set the initial digital surface point as the current digital surface point.

4. For the current digital surface point, consider all unvisited neighboring digital surface points on the one side and determine their calculated tentative distances (e.g. edge length between the current digital surface point and the particular unvisited neighboring digital surface point) through the current digital surface point. In some embodiments, the calculated tentative distance can determine an edge length between current digital surface point and the particular unvisited neighboring digital surface point based on digital surface curvature. In some embodiments, the computer-implemented method can include an angle-dependent factor in determining an edge length, for example. For example, in some embodiments, the computer-implemented method can determine the tentative distance as follows:

$$f(e_i)=|e_i|\ \exp(k\cdot\sin\alpha_i),\ \text{or}\ f(e_i)=|e_i|\ \exp(k\cdot\alpha_i)$$

where $f(e_i)$ is the length of edge $e_i$ for the algorithm between the current digital surface point and the particular unvisited neighboring digital surface point, $|e_i|$ is Euclidean distance in 3D between two ends of the edge, k is a constant, such as 1.8 in some embodiments, for example. A greater magnitude of the constant k can lead to preferring paths going through regions of higher curvature. The sign of the constant can define which edges will be preferred by the algorithm: concave or convex, and $\alpha_i$ is dihedral angle of the triangular surface at edge $e_i$, $\sin\alpha_i$ is the sine of that angle that can be, for example, computationally faster to find than $\alpha_i$ itself in some embodiments, for example. In some embodiments, $\alpha_i$ and/or $\sin\alpha_i$ can be the angle-dependent factor, for example. The boundary between the tooth and the gum can have significantly higher curvature than the rest of the surface. With edge length $f(e_i)=|e_i|\exp(k\cdot\sin\alpha_i)$, the length of edges in the digital tooth-gum line boundary region is significantly smaller than in other regions. The computer-implemented method can accordingly determine the shortest path along the digital tooth-gum line junction.

5. Compare the newly calculated tentative distance to the current assigned value and assign the smaller one. For example, if the current digital surface point A is marked with a distance of 6, and the edge connecting it with a neighboring digital surface point B has length 2, then the distance to B through A will be 6+2=8. If B was previously marked with a distance greater than 8 then change it to 8. Otherwise, keep the current value.

6. After considering all of the unvisited neighbors of the current digital surface point, mark the current digital surface point as visited and remove it from the unvisited set. A visited digital surface point will never be checked again.

7. If the destination digital surface point has been marked visited (when planning a route between two specific digital surface points) or if the smallest tentative distance among the digital surface points in the unvisited set is infinity, or the highest possible value, or larger than the sum of all edge lengths for example (when planning a complete traversal; occurs when there is no connection between the initial digital surface point and remaining unvisited digital surface points), then stop. The algorithm has finished.

Otherwise, select the unvisited digital surface point that is marked with the smallest tentative distance, set it as the new "current digital surface point", and go back to step 4.

The algorithm can stop once the destination digital surface point has the smallest tentative distance among all "unvisited" digital surface points (and thus could be selected as the next "current").

The computer-implemented method can repeat the steps on the other side of the separation region 2057 (this can be performed simultaneously or sequentially). In this manner, the computer-implemented method can determine the first segment path 2053 along the first side 2054 and the second segment path 2056 along the second side 2058. The first segment path 2053 and the second segment path 2056 can be digital surface triangle edges in some embodiments for example.

In some embodiments, the first segment path 2053 connects to one side of the facial triangle edge 2066 and one side of the lingual triangle edge 2064. In some embodiments, the second segment path 406 connects to the other side of the facial triangle edge 2066 and the other side of the lingual triangle edge 2064. The connected first segment path 2053, second segment path 2056, facial triangle edge 2066, and the lingual triangle edge 2064 together can form a boundary loop in some embodiments. The boundary loop can be closed in some embodiments, having an enclosed inner loop region 2068, for example.

Figure 22A:
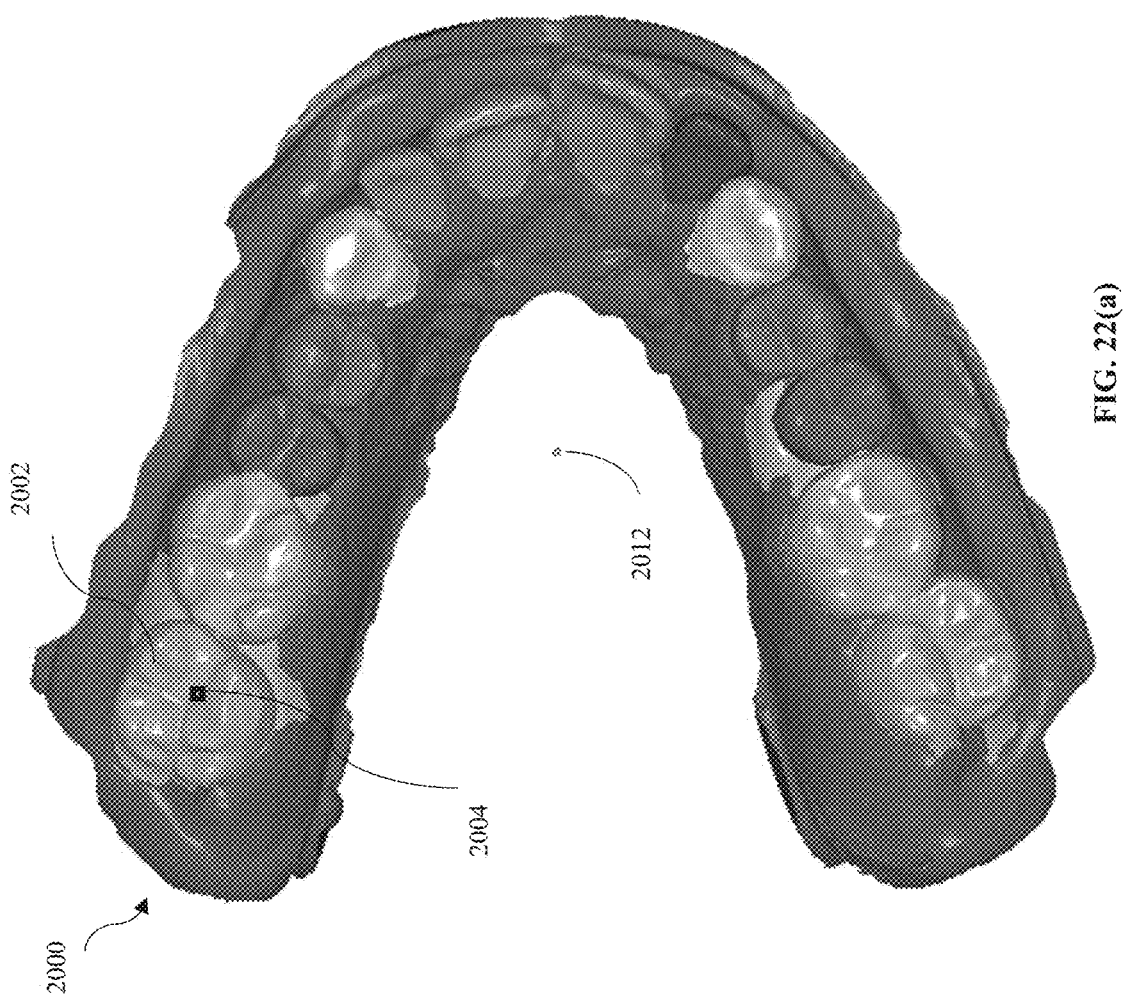
Figure 22C:
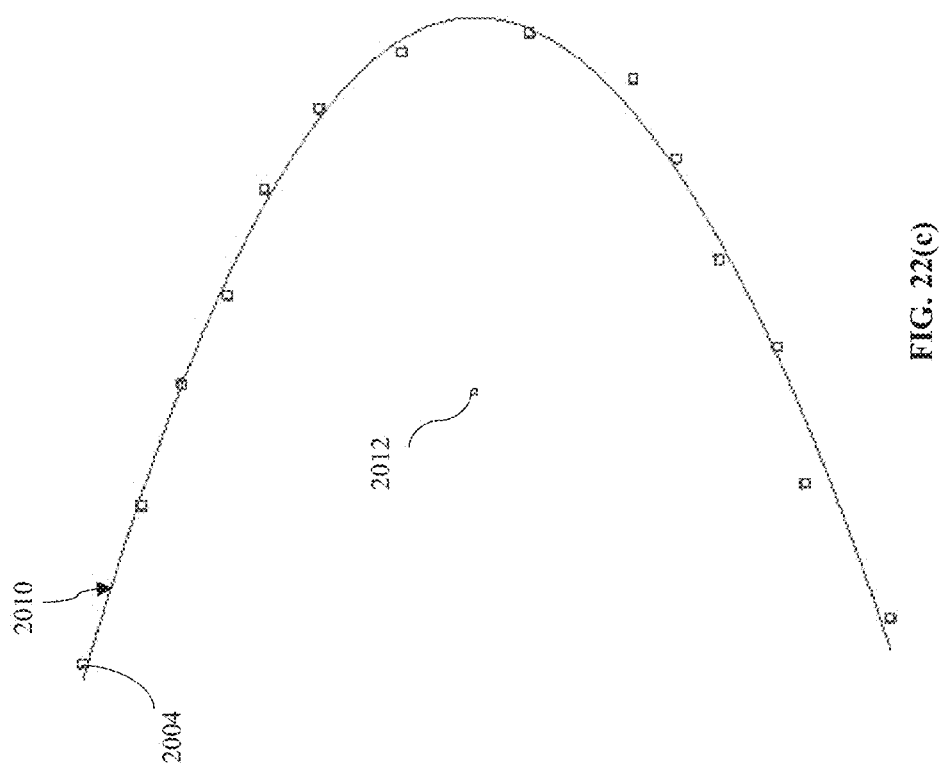
Figure 22D:
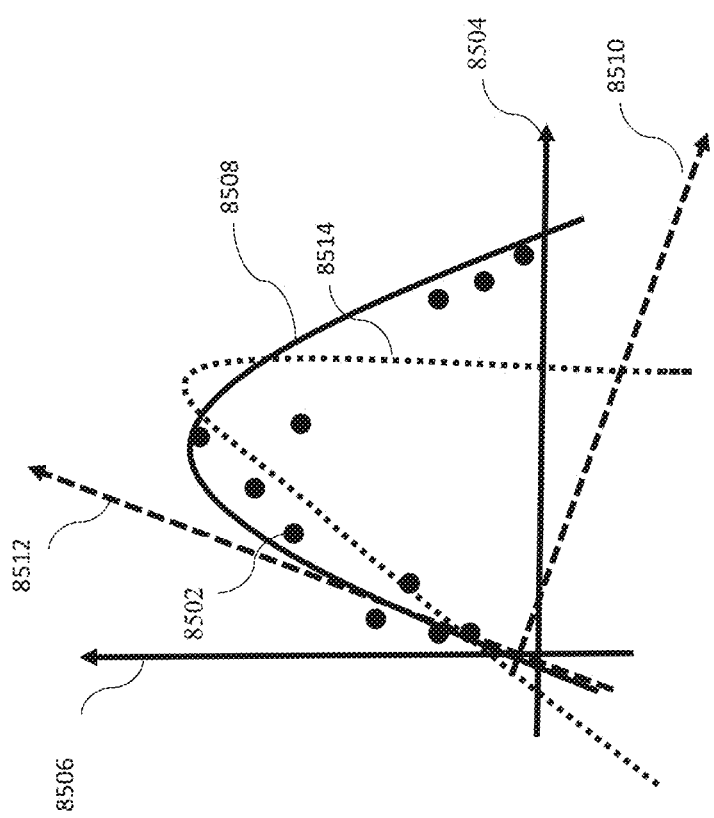
Figure 22E:
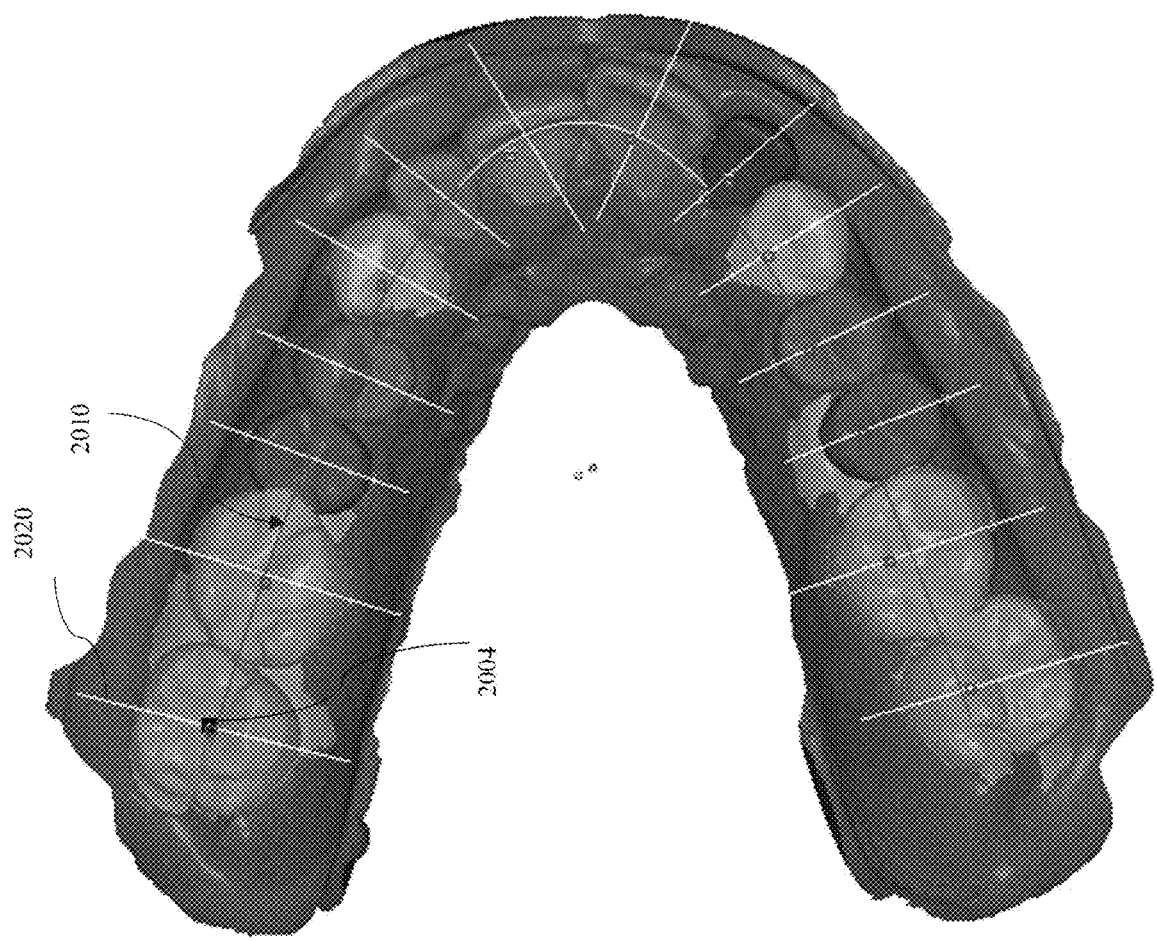
Figure 22F:
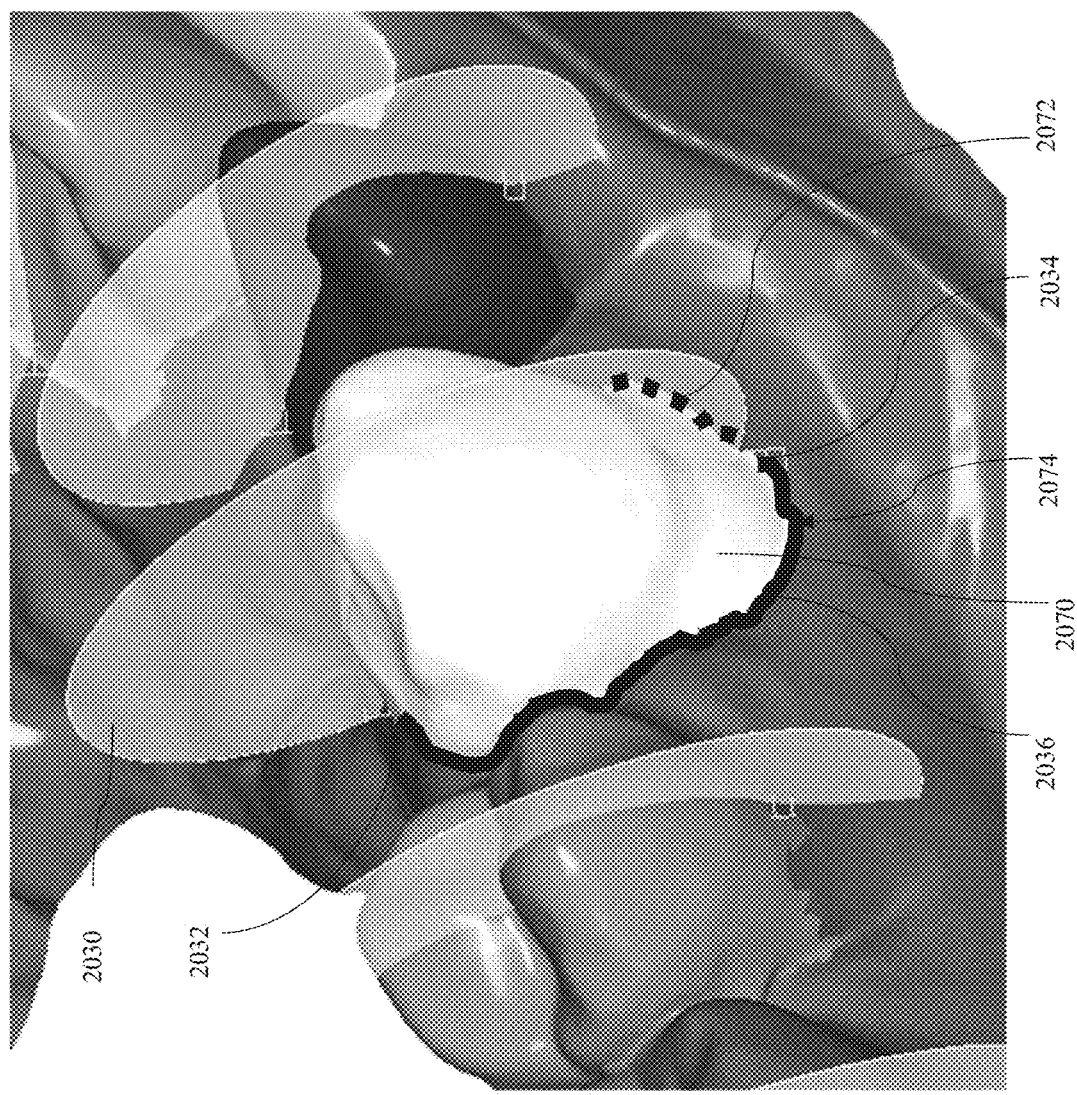
Figure 22G:
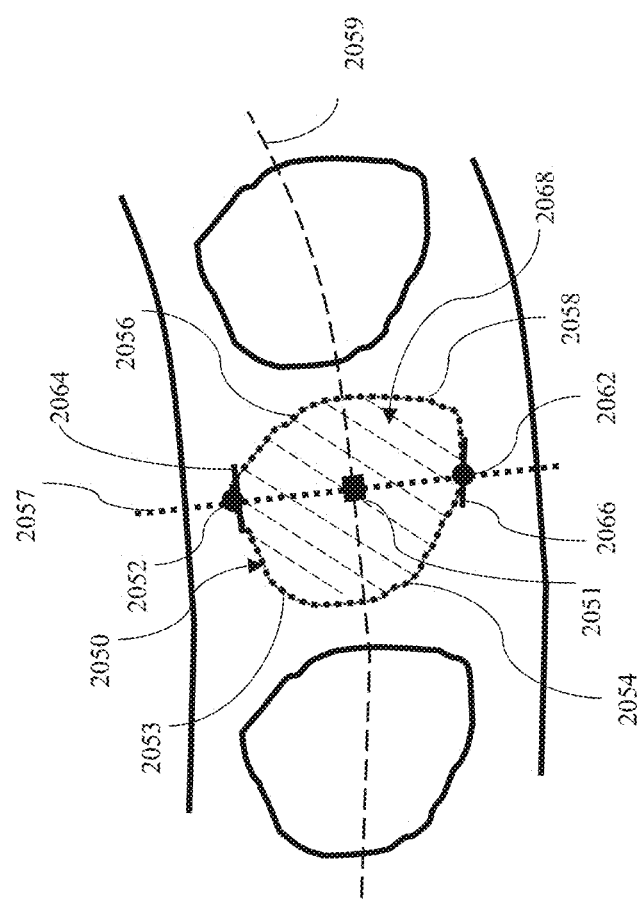

In some embodiments, the computer implemented method can further include providing a segmented digital tooth from the first segment path and the second segment path. As illustrated in FIG. 22(f), the computer implemented method can include providing a segmented digital tooth 2070 from the first segment path 2036 and the second segment path 2072. This can include, for example, providing a digital surface of the digital tooth 2070 by determining digital surface triangles within the boundary loop 2074 formed by the first segment path 2036 and the second segment path 2072, for example.

Figure 23A:
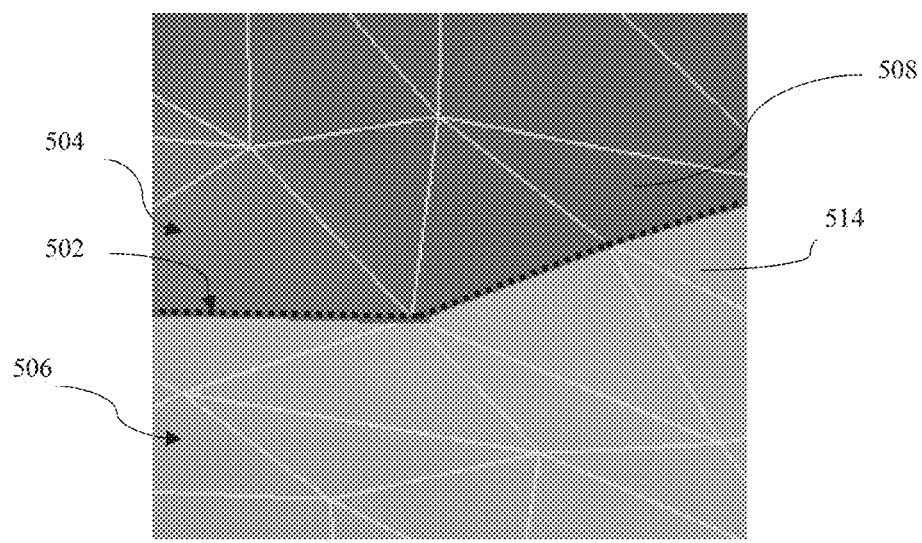
FIG. 23(a) shows an example of an illustration a portion of a boundary loop in some embodiments.

FIG. 23(A) illustrates an example showing a portion of a boundary loop 502 with a digital tooth region 504 within the portion of the boundary loop 502 and a digital non-tooth region 506 outside of the portion of the boundary loop 502. The digital tooth region 504 and the digital non-tooth region 506 can include digital surface triangles such as digital surface triangle 508 and digital surface triangle 514, respectively, for example.

Figure 23B:
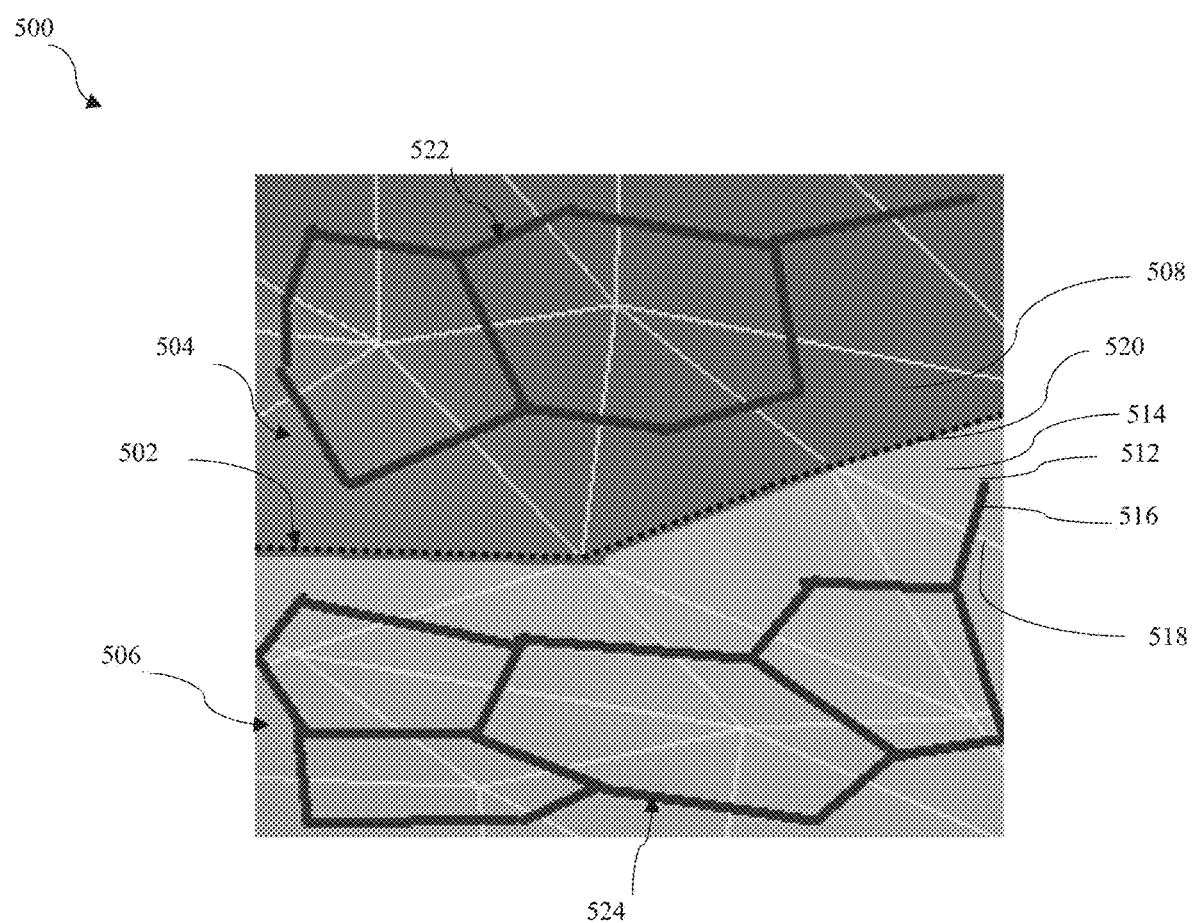
FIG. 23(b) shows an example of an illustration of a dual-graph vertex.

In some embodiments, the computer-implemented method determining the digital surface of the digital tooth can include generating a dual-graph of the original digital surface triangles. The computer-implemented method can generate the dual-graph such that dual-graph vertices correspond to digital surface triangles of the original digital surface and dual-graph edges correspond to shared digital surface triangle edges except where a shared digital surface triangle edge is part of the boundary loop. For example, as illustrated in FIG. 23(B), the computer-implemented method can generate a dual-graph vertex 512 for a digital surface triangle 514 in a portion of a digital model 500. The computer-implemented method can generate a dual-graph edge 516 for shared digital surface triangle edge 518, for example. The computer-implemented method does not generate a dual-graph edge for shared digital surface triangle edge 520 because it is part of the boundary loop 502. The computer-implemented method can repeat this process for every digital surface triangle in the digital model. In this manner, the computer-implemented method can in some embodiments generate a dual-graph for the digital surface of the digital model. In some embodiments, each dual-graph edge can cross every original surface edge, but no dual-graph edge crosses the boundary loop. In some embodiments, the dual-graph can include an inner dual-graph region and an outer dual-graph region that are separated by the boundary loop, for example. The inner dual-graph region can be an interconnected dual-graph region enclosed by the boundary loop, and the outer dual-graph region can be an interconnected dual-graph region outside of the boundary loop. The boundary loop can separate the inner dual-graph region from the outer dual-graph region in some embodiments. For example, as illustrated in FIG. 23(B), the dual-graph can include an inner dual-graph region 522 and an outer dual-graph region 524 separated by the boundary loop 502.

In some embodiments, determining a digital tooth surface can include performing a search on the dual-graph. The computer-implemented method can, for example, determine a digital tooth surface based on interconnections between vertices of the dual-graph. In some embodiments, the search can be, for example, a conventionally known breadth-first search. In the breadth-first search, the computer-implemented method can load the dual-graph and a starting vertex root, for example. In some embodiments, the starting dual-graph root vertex can be any dual-graph vertex. The computer-implemented method can explore all neighboring dual-graph vertices at the current depth before moving to the next depth level and label them as discovered. The computer-implemented method can then advance to the next depth level and repeat the process until there are no more undiscovered dual-graph vertices, for example. The computer-implemented method can in this manner determine the interconnected vertices of the dual-graph to determine a discovered dual-graph. The breadth-first search technique can be applied to a digital tooth without one or more tunnels, for example. In some embodiments, the computer-implemented method can determine conventionally known breadth-first searching as follows:

```
procedure Breadth_First_Search(Dual_Graph, start_vert) is
  let Q be a queue
  label start_vert as discovered
  Q.enqueue(start_ vert)
  while Q is not empty do
    v := Q.dequeue( )
    for all edges from v to y in Dual_Graph.adjacentEdges(v) do
      if y is not labeled as discovered then
        label y as discovered
        y.parent := v
        Q.enqueue(y)
```

In some embodiments, the search can be, for example, a conventionally known depth-first search. In a depth-first search, the computer-implemented method can load the dual-graph and a starting vertex root, for example. In some embodiments, the starting vertex root can be any dual-graph vertex. In some embodiments, the computer-implemented method can perform conventionally known depth-first searching on the dual-graph as follows: The input can be, for example, a graph Dual_Graph, G, and a vertex vert of G and an output can be, for example, every vertex reachable from vert labeled as discovered. The depth-first search technique can be applied to a digital tooth without one or more tunnels, for example. In some embodiments, the computer-implemented method can determine conventionally known depth-first searching as follows:

```
procedure Depth_First_Search (Dual_Graph, vert) is
    label vert as discovered
    for all directed edges from vertex to y that are in
    Dual_Graph.adjacentEdges(vert) do
        if vert y is not labeled as discovered then
            recursively call Depth_First_Search(Dual_Graph, y)
```

In some embodiments, the computer-implemented method can perform depth-first searching on the dual-graph as follows, for example:

```
procedure Depth_First_Search_Iterative(Dual_Graph, vert) is
let S be a stack
S.push(vert)
while S is not empty do
    vert = S.pop( )
    if vert is not labeled as discovered then
        label vert as discovered
        for all edges from vert to y in Dual_graph.adjacentEdges(vert) do
            S.push(y)
```

Figure 24:
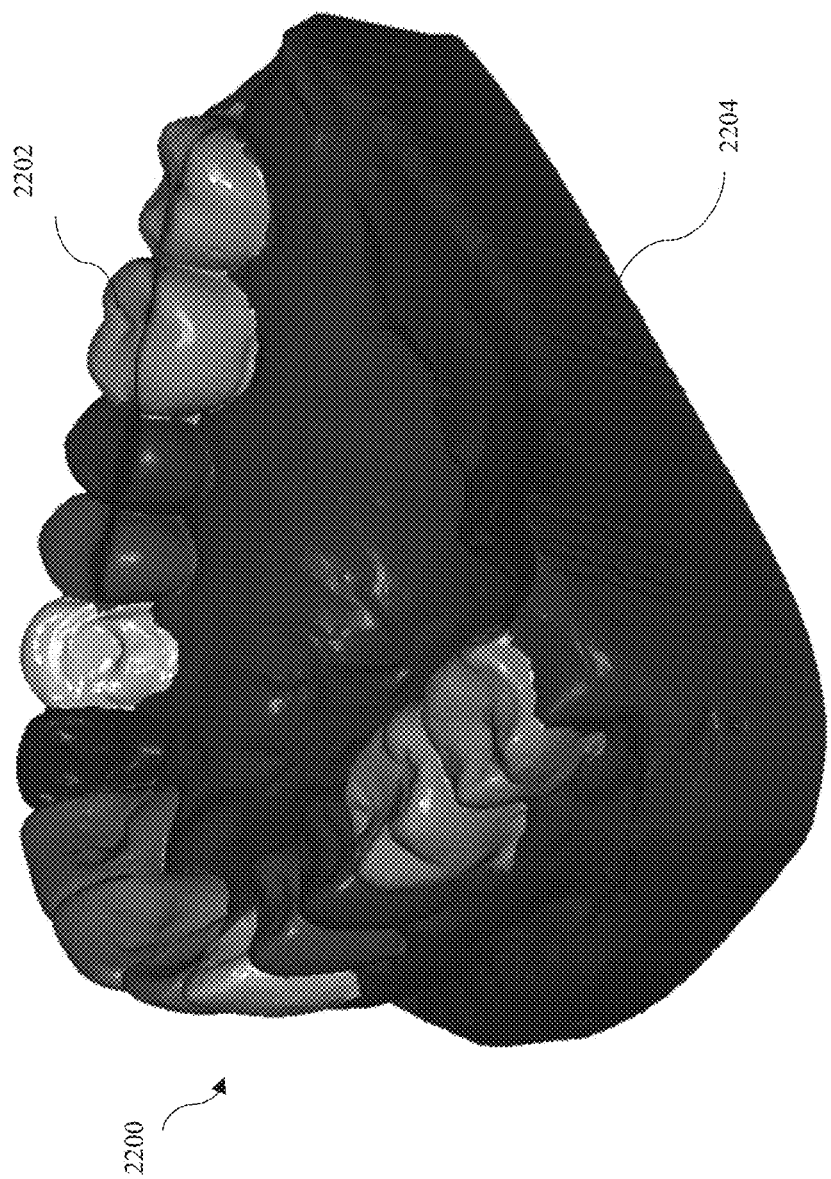
FIG. 24 illustrates an example of a fully segmented and labeled set of digital teeth and gum region.

In some embodiments, if the discovered dual-graph is within the boundary loop and/or if the starting dual-graph root vertex was within the boundary loop, for example, then the computer-implemented method would determine that the discovered dual-graph is an inner dual-graph region and hence belongs to the digital tooth. The computer-implemented method can determine all other dual-graph vertices as belonging to the outer dual-graph, and therefore be of the digital gum and other surrounding digital teeth. In some embodiments, if the discovered dual-graph is outside the boundary loop and/or if the starting dual-graph root vertex was outside the boundary loop, for example, then the computer-implemented method can determine that the discovered dual-graph is an outer dual-graph region and hence belongs to the digital gum and other surrounding digital teeth. The computer-implemented method can determine that all other dual-graph vertices belong to the inner dual-graph region, and therefore be of the digital tooth. The computer-implemented method can, based on the discovered dual-graph vertices, determine the digital surface of the digital tooth in some embodiments, for example, and the digital surface belonging to surrounding teeth and the gum region. The final labels can include, for example, tooth numbers such as tooth 1, tooth 2, tooth 3, etc. and gum in some embodiments. In some embodiments, each tooth can be distinguished from the other teeth and the gum region. FIG. 24 illustrates an example of a fully segmented and labeled set of digital teeth and gum region such as digital tooth 2202 and gum region 2204 in digital model 2200.

In some embodiments, the received labeled 3D digital model can optionally also be a segmented 3D digital model. In some embodiments, the segmented 3D digital model can have been segmented using curvature-based segmentation. In some embodiments, the segmented digital model can be segmented using any technique known in the art.

In some embodiments, curvature-based segmented model can be made more precise by performing two point segmentation in some embodiments, for example. One advantage of two point segmentation can include, for example, improved accuracy.

One or more advantages of one or more features can include, for example, providing a digital model with digital teeth that are both segmented and labeled, along with labeled and segmented non-teeth regions such as the gum. One or more advantages of using a panoramic image can include, for example, more accurate boundaries. One or more advantages of using a panoramic image can include, for example, retaining the features of teeth both from buccal and lingual sides as well as the boundary with the gum, while on standard views such as 2D depth maps for example, buccal side or lingual side or both of them are completely or partially occluded, so neural network is unable to see and segment them. In standard views such as 2D depth maps, for example, the boundary between teeth and gum is not visible for all teeth and not from all sides. This can arise because the teeth occlude (hide) the boundary. And the problem is more general: whatever simple view is taken (either with perspective or with orthographic camera), some boundaries will not be visible One or more advantages of using a panoramic image can include, for example, retaining the features of teeth both from buccal and lingual sides as well as the boundary with the gum.

Figure 25A:
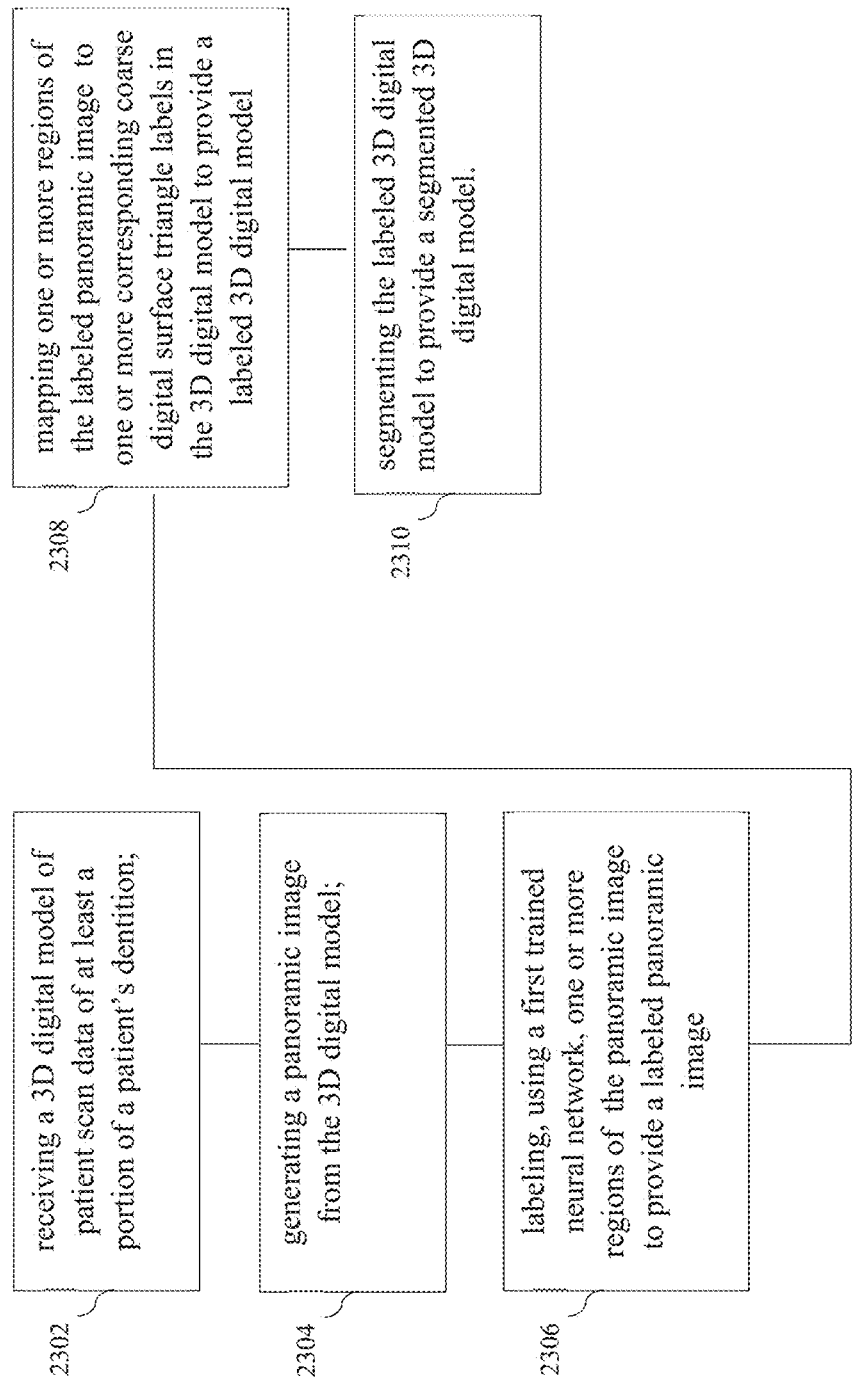
FIG. 25(a) shows a flowchart of an example of a computer-implemented method of digitally segmenting teeth in a digital model in some embodiments.

FIG. 25(*a*) illustrates an example of a computer-implemented method of digitally segmenting teeth in a digital model. The method can include receiving a 3D digital model of patient scan data of at least a portion of a patient's dentition at 2302, generating (or alternatively, receiving) a panoramic image from the 3D digital model at 2304, labeling, using a first trained neural network, one or more regions of the panoramic image to provide a labeled panoramic image at 2306, mapping one or more regions of the labeled panoramic image to one or more corresponding coarse digital surface triangle labels in the 3D digital model to provide a labeled 3D digital model at 2308, and segmenting the labeled 3D digital model to provide a segmented 3D digital model at 2310. In some embodiments, the computer-implemented method can alternatively generate or receive an ordinary 2D depth map image from the 3D digital model at 2304. One example of an ordinary 2D depth map image is shown in FIG. 8.

The computer-implemented method of FIG. 25(*a*) can include one or more of the following features, alone or in combination in various embodiments. The method of claim 1, further comprising training the first neural network to label one or more regions of the panoramic image to provide a labeled panoramic image. The labeled 3D digital model can include one or more uncertainty regions. The segmented 3D digital model can include one or more individual tooth regions and a non-tooth region. The first trained neural network can include a first convolution neural network. The first convolution neural network can include a U-Net neural network. The first convolution neural network can include a YOLO neural network. Segmenting the 3D digital model can include geometrically segmenting the labeled 3D digital model. Geometric segmenting can include curvaturebased segmentation. The geometric segmenting can include two point segmentation. Generating the panoramic image can include: determining, using a second trained neural network, one or more digital tooth bounding regions corresponding to one or more digital teeth; connecting the one or more digital tooth bounding regions by a spline; sampling one or more spline points on the spline; determining one or more sampled digital surface points from the one or more sampled spline points; and determining one or more associated digital surface points corresponding to each sampled digital surface point. The method can further include determining a digital tooth bounding region center of each digital tooth bounding region, wherein connecting the one or more digital tooth bounding regions can include connecting the digital tooth bounding region centers. The second trained neural network can include a YOLO neural network. The second trained neural network can include a U-net convolutional neural network. Each sampled digital surface point and its corresponding associated digital surface points can be a column in the panoramic image. Determining one or more associated digital surface points can include: determining a sample depth point of each sampled digital surface point; and determining one or more digital surface points intersecting with one or more respective rays extending from the sample depth point at an inclination angle from an occlusion direction and within a sample plane, wherein the sample plane is orthogonal to the spline and the occlusion direction. The one or more inclination angles can be within an inclination angle range, and the inclination angle range can be from −45 degrees to +45 degrees.

Figure 25B:
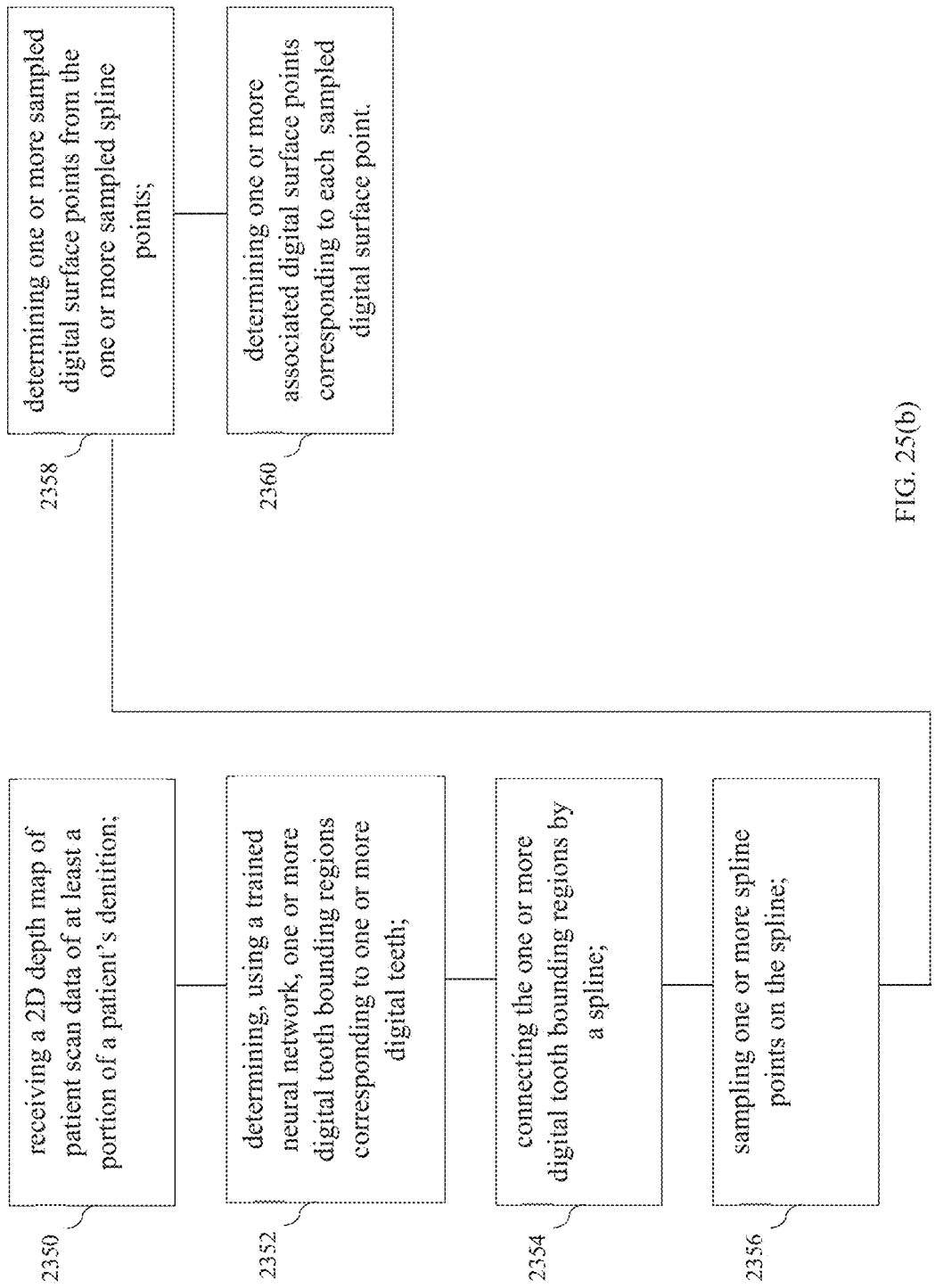
FIG. 25(b) shows a flowchart of an example of a computer-implemented method of generating a panoramic image in some embodiments.

FIG. 25(b) illustrates an example of a computer-implemented method of generating a panoramic image. The method can include receiving a 2D depth map of patient scan data of at least a portion of a patient's dentition at 2350; determining, using a trained neural network, one or more digital tooth bounding regions corresponding to one or more digital teeth at 2352; connecting the one or more digital tooth bounding regions by a spline at 2354; sampling one or more spline points on the spline at 2356; determining one or more sampled digital surface points from the one or more sampled spline points at 2358; and determining one or more associated digital surface points corresponding to each sampled digital surface point at 2360.

The method in FIG. 25(b) can include one or more of the following optional features, either alone or in combination. The method can further include determining a digital tooth bounding region center of each digital tooth bounding region, wherein connecting the one or more digital tooth bounding regions can include connecting the digital tooth bounding region centers. The second trained neural network can include a YOLO neural network. The second trained neural network can include a U-net convolutional neural network. Each sampled digital surface point and its corresponding associated digital surface points can be a column in the panoramic image. Determining one or more associated digital surface points can include: determining a sample depth point of each sampled digital surface point; and determining one or more digital surface points intersecting with one or more respective rays extending from the sample depth point at an inclination angle from an occlusion direction and within a sample plane, wherein the sample plane is orthogonal to the spline and the occlusion direction. The one or more inclination angles can be within an inclination angle range, and the inclination angle range can be from −45 degrees to +45 degrees.

Some embodiments can include a processing system. The processing system can include a processor, a computer-readable storage medium including instructions executable by the processor that can perform steps including: receiving a 3D digital model of patient scan data of at least a portion of a patient's dentition; generating a panoramic image from the 3D digital model; labeling, using a first trained neural network, one or more regions of the panoramic image to provide a labeled panoramic image; mapping one or more regions of the labeled panoramic image to one or more corresponding coarse digital surface triangle labels in the 3D digital model to provide a labeled 3D digital model; and segmenting the labeled 3D digital model to provide a segmented 3D digital model. Alternatively, in some embodiments, the instructions executable by the processor steps can include receiving the panoramic image, labeling, using a first trained neural network, one or more regions of the panoramic image to provide a labeled panoramic image mapping one or more regions of the labeled panoramic image to one or more corresponding coarse digital surface triangle labels in the 3D digital model to provide a labeled 3D digital model, and segmenting the labeled 3D digital model to provide a segmented 3D digital model One or more features described in the present disclosure can be part of and/or performed on the processing system.

Figure 26:
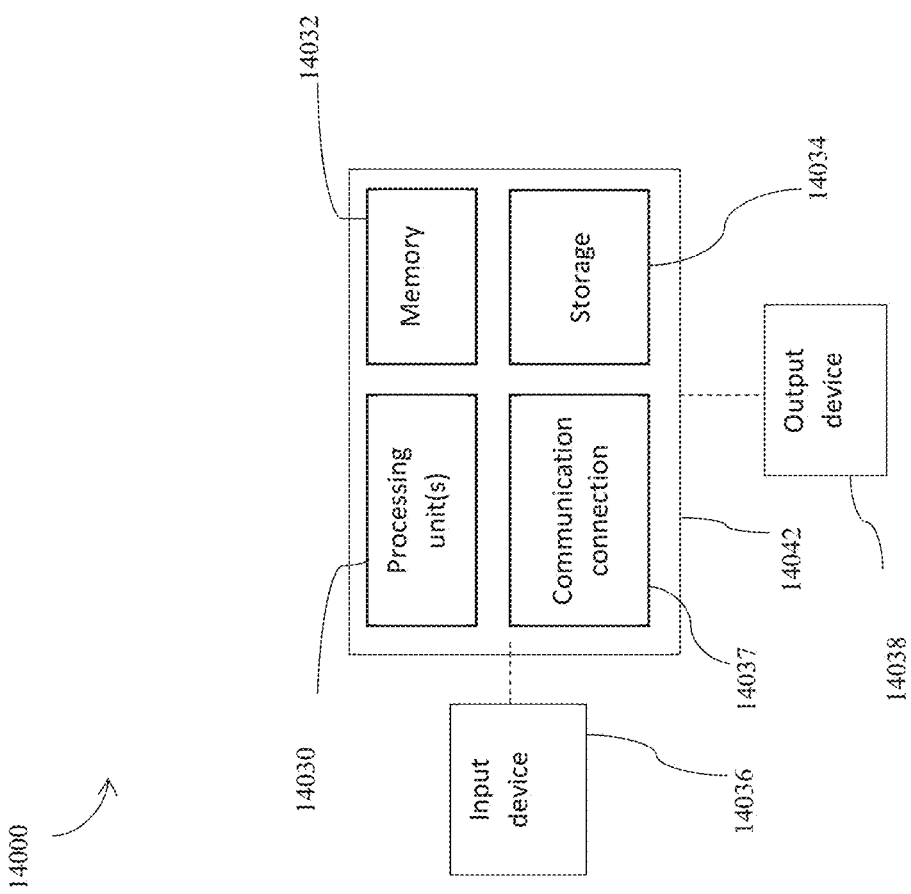
FIG. 26 shows a diagram of an example processing system in some embodiments.

FIG. 26 illustrates a processing system 14000 in some embodiments. The system 14000 can include a processor 14030, computer-readable storage medium 14034 having instructions executable by the processor to perform one or more steps described in the present disclosure.

In some embodiments, one or more steps can be performed by a user, for example. In some embodiments, one or more features can be performed by a user using an input device while viewing the digital model on a display, for example. In some embodiments, the computer-implemented method can allow the input device to manipulate the digital model displayed on the display. For example, in some embodiments, the computer-implemented method can rotate, zoom, move, and/or otherwise manipulate the digital model in any way as is known in the art. In some embodiments, one or more features can be performed by a user using the input device. In some embodiments, one or more steps can be initiated, for example, using techniques known in the art, such as a user selecting another button. In some embodiments, one or more features can be performed automatically, without user intervention.

In some embodiments the computer-implemented method can display a digital model on a display and receive input from an input device such as a mouse or touch screen on the display for example. For example, the computer-implemented method can receive an initiation command. The computer-implemented method can, upon receiving an initiation command, perform one or more steps using one or more features described in the present disclosure. The computer-implemented method can, upon receiving manipulation commands, rotate, zoom, move, and/or otherwise manipulate the digital model in any way as is known in the art.

One or more of the features disclosed herein can be performed and/or attained automatically, without manual or user intervention. One or more of the features disclosed herein can be performed by a computer-implemented method. The features—including but not limited to any methods and systems—disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

For example, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

The invention claimed is:

1. A computer-implemented method of digitally segmenting teeth in a digital model, comprising:
    receiving a 3D digital model of patient scan data of at least a portion of a patient's dentition;

generating a two dimensional (2D) panoramic image from the 3D digital model;

labeling, using a first trained neural network, one or more regions of the 2D panoramic image to provide a labeled 2D panoramic image;

mapping one or more regions of the labeled 2D panoramic image to one or more corresponding coarse digital surface triangle labels in the 3D digital model to provide a labeled 3D digital model; and segmenting the labeled 3D digital model to provide a segmented 3D digital model.

2. The method of claim 1, further comprising training the first trained neural network to label one or more regions of the 2D panoramic image to provide a labeled 2D panoramic image.

3. The method of claim 1, wherein the labeled 3D digital model comprises one or more uncertainty regions.

4. The method of claim 1, wherein the segmented 3D digital model comprises one or more individual tooth regions and a non-tooth region.

5. The method of claim 1, wherein the first trained neural network comprises a first convolution neural network.

6. The method of claim 1, wherein the first trained neural network comprises a semantic segmentation neural network.

7. The method of claim 1, wherein the first trained neural network comprises a YOLO neural network.

8. The method of claim 1, wherein segmenting the 3D digital model comprises geometrically segmenting the labeled 3D digital model.

9. The method of claim 8, wherein the geometrically segmenting comprises curvature based segmentation.

10. The method of claim 8, wherein the geometrically segmenting comprises two point segmentation.

11. The method of claim 1, wherein generating the 2D panoramic image comprises:

determining, using a second trained neural network, one or more digital tooth bounding regions corresponding to one or more digital teeth;

connecting the one or more digital tooth bounding regions by a spline;

sampling one or more spline points on the spline;

determining one or more sampled digital surface points from the one or more sampled spline points; and determining one or more associated digital surface points corresponding to each sampled digital surface point.

12. The method of claim 11, further comprising determining a digital tooth bounding region center of each digital tooth bounding region, wherein connecting the one or more digital tooth bounding regions comprises connecting the digital tooth bounding region centers.

13. The method of claim 11, wherein the second trained neural network comprises a YOLO neural network.

14. The method of claim 11, wherein the second trained neural network comprises a semantic segmentation neural network.

15. The method of claim 11, wherein the each sampled digital surface point and its corresponding associated digital surface points comprise a column in the 2D panoramic image.

16. The method of claim 11, wherein determining one or more associated digital surface points comprises:

determining a sample depth point of each sampled digital surface point; and determining one or more digital surface points intersecting with one or more respective rays extending from the sample depth point at one or more inclination angles from an occlusion direction and within a sample plane, wherein the sample plane is orthogonal to the spline and the occlusion direction.

17. The method of claim 11, wherein the one or more inclination angles are within an inclination angle range, and wherein the inclination angle range is from −45 degrees to +45 degrees.

18. A system to digitally segment teeth in a digital model, comprising:

a processor; and a computer-readable storage medium comprising instructions executable by the processor to perform steps comprising:

receiving a 3D digital model of patient scan data of at least a portion of a patient's dentition;

generating a two dimensional (2D) panoramic image from the 3D digital model;

labeling, using a first trained neural network, one or more regions of the 2D panoramic image to provide a labeled 2D panoramic image;

mapping one or more regions of the labeled 2D panoramic image to one or more corresponding coarse digital surface triangle labels in the 3D digital model to provide a labeled 3D digital model; and segmenting the labeled 3D digital model to provide a segmented 3D digital model.

19. The system of claim 18, wherein generating the 2D panoramic image comprises:

determining, using a second trained neural network, one or more digital tooth bounding regions corresponding to one or more digital teeth;

connecting the one or more digital tooth bounding regions by a spline;

sampling one or more spline points on the spline;

determining one or more sampled digital surface points from the one or more sampled spline points; and determining one or more associated digital surface points corresponding to each sampled digital surface point.

20. A computer-implemented method of generating a two dimensional (2D) panoramic image, comprising:

receiving a 2D depth map of patient scan data of at least a portion of a patient's dentition;

determining, using a trained neural network, one or more digital tooth bounding regions corresponding to one or more digital teeth;

connecting the one or more digital tooth bounding regions by a spline;

sampling one or more spline points on the spline;

determining one or more sampled digital surface points from the one or more sampled spline points; and determining one or more associated digital surface points corresponding to each sampled digital surface point.

21. A non-transitory computer readable medium storing executable computer program instructions to segment a digital model, the computer program instructions comprising:

receiving a 3D digital model of patient scan data of at least a portion of a patient's dentition;

generating a two dimensional (2D) panoramic image from the 3D digital model;

labeling, using a first trained neural network, one or more regions of the 2D panoramic image to provide a labeled 2D panoramic image;

mapping one or more regions of the labeled 2D panoramic image to one or more corresponding coarse digital surface triangle labels in the 3D digital model to provide a labeled 3D digital model; and segmenting the labeled 3D digital model to provide a segmented 3D digital model.

* * * * *